US012237610B2

(12) United States Patent
Dawson et al.

(10) Patent No.: US 12,237,610 B2
(45) Date of Patent: Feb. 25, 2025

(54) CONNECTOR RECORDING SYSTEM WITH READABLE AND RECORDABLE INDICIA

(71) Applicant: Eaton Intelligent Power Limited, Dublin (IE)

(72) Inventors: James Dawson, Carol Stream, IL (US); Jason Degen, Carol Stream, IL (US); Brantley Natter, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/362,071

(22) Filed: Jul. 31, 2023

(65) Prior Publication Data

US 2024/0014591 A1 Jan. 11, 2024

Related U.S. Application Data

(63) Continuation of application No. 17/588,468, filed on Jan. 31, 2022, now Pat. No. 11,721,927, which is a (Continued)

(51) Int. Cl.

*H01R 13/46* (2006.01)
*H01R 13/627* (2006.01)
*H01R 13/641* (2006.01)

(52) U.S. Cl.

CPC ....... *H01R 13/465* (2013.01); *H01R 13/6273* (2013.01); *H01R 13/641* (2013.01)

(58) Field of Classification Search

CPC .............. H01R 13/465; H01R 13/6273; H01R 13/641; G06K 7/10

(Continued)

(56) References Cited

U.S. PATENT DOCUMENTS 4,201,438 A 5/1980 Shea
4,416,504 A 11/1983 Sochor (Continued)

FOREIGN PATENT DOCUMENTS

CN 1722537 A 1/2006
CN 102714369 A 10/2012

(Continued)

OTHER PUBLICATIONS

International Search Report and written Opinion issued in PCT/US2020/049870, dated Dec. 10, 2020, 20 pages.

(Continued)

*Primary Examiner* — Gary F Paumen
(74) *Attorney, Agent, or Firm* — Meunier Carlin & Curfman LLC

(57) ABSTRACT

The invention generally provides a connector recording system or platform that includes a recording system designed to interact with a connector system to read an indicia and then transfer, store, and display information associated with the positioning of the connector system in the installed component or device. The connector system includes a male housing assembly, a female housing assembly coupled to the male housing assembly in a connected state, and a connector position assurance assembly with the indicia and a locking member that is movable between locked and unlocked positions. In the locked position, the locking member secures the male housing assembly to the female housing assembly and the indicia can be read by the scanner to signal that the connector position assurance assembly is in the locked position. In the unlocked position, the indicia is in a state that does not allow the scanner to obtain information from the indicia.

20 Claims, 34 Drawing Sheets

Related U.S. Application Data continuation of application No. 17/351,413, filed on Jun. 18, 2021, now Pat. No. 11,239,597, which is a continuation of application No. PCT/US2020/049870, filed on Sep. 9, 2020.

(60) Provisional application No. 62/897,658, filed on Sep. 9, 2019.

(58) Field of Classification Search
USPC ...... 439/352, 489, 491, 910; 235/462.1, 375
See application file for complete search history.

(56) References Cited

U.S. PATENT DOCUMENTS

| | | | | | |
|---|---|---|---|---|---|
| 4,534,610 | A | | 8/1985 | Takihara | |
| 4,540,235 | A | | 9/1985 | Lolic | |
| 4,583,812 | A | | 4/1986 | Gross, Jr. | |
| 4,593,464 | A | | 6/1986 | Williams | |
| 4,632,483 | A | | 12/1986 | Verin | |
| 4,713,018 | A | | 12/1987 | Sutton | |
| 4,895,531 | A | | 1/1990 | Vignoli | |
| 4,902,244 | A | * | 2/1990 | Endo | H01R 13/465 235/494 |
| 4,932,877 | A | | 6/1990 | Zinn | |
| 4,938,720 | A | | 7/1990 | Romak | |
| 4,975,066 | A | | 12/1990 | Sucheski | |
| 4,983,127 | A | | 1/1991 | Kawai | |
| 5,007,865 | A | | 4/1991 | Jakobeit | |
| 5,035,661 | A | | 7/1991 | Steinhardt | |
| 5,042,433 | A | | 8/1991 | Monnier | |
| 5,062,918 | A | | 11/1991 | Zodrow | |
| 5,094,636 | A | | 3/1992 | Zinn | |
| 5,102,752 | A | | 4/1992 | Hope | |
| 5,120,255 | A | | 6/1992 | Kouda | |
| 5,162,004 | A | | 11/1992 | Kuzuno | |
| 5,169,336 | A | * | 12/1992 | Taguchi | H01R 13/64 439/354 |
| 5,188,545 | A | | 2/1993 | Hass | |
| 5,240,439 | A | | 8/1993 | Egenolf | |
| 5,273,766 | A | | 12/1993 | Long | |
| 5,288,252 | A | | 2/1994 | Steinhardt | |
| 5,295,873 | A | | 3/1994 | Walbrecht | |
| 5,334,058 | A | | 8/1994 | Hotea | |
| 5,338,229 | A | | 8/1994 | Egenolf | |
| 5,361,377 | A | | 11/1994 | Miller | |
| 5,362,262 | A | | 11/1994 | Hotea | |
| 5,391,097 | A | | 2/1995 | Kerul | |
| 5,415,571 | A | | 5/1995 | Lutsch | |
| 5,419,723 | A | | 5/1995 | Villiers | |
| 5,437,566 | A | | 8/1995 | Zinn | |
| 5,486,123 | A | | 1/1996 | Miyazaki | |
| 5,536,184 | A | | 7/1996 | Wright | |
| 5,551,897 | A | | 9/1996 | Alwine | |
| 5,562,506 | A | | 10/1996 | Wright | |
| 5,573,434 | A | | 11/1996 | Ittah | |
| 5,607,328 | A | | 3/1997 | Joly | |
| 5,624,283 | A | | 4/1997 | Hotea | |
| 5,664,972 | A | | 9/1997 | Zinn | |
| 5,716,245 | A | | 2/1998 | Kameyama | |
| 5,810,627 | A | | 9/1998 | Gierut | |
| 5,827,094 | A | | 10/1998 | Aizawa | |
| 5,863,225 | A | | 1/1999 | Liebich | |
| 5,868,590 | A | | 2/1999 | Dobbelaere | |
| 5,938,485 | A | | 8/1999 | Hotea | |
| 5,941,740 | A | | 8/1999 | Neuer | |
| 5,951,338 | A | | 9/1999 | Seko | |
| 5,954,548 | A | | 9/1999 | Stabroth | |
| 5,966,291 | A | | 10/1999 | Baeumel | |
| 5,975,964 | A | | 11/1999 | Seko | |
| 5,980,336 | A | | 11/1999 | Hall | |
| 6,042,433 | A | | 3/2000 | Chen | |
| 6,062,918 | A | | 5/2000 | Myer | |
| 6,095,867 | A | | 8/2000 | Brandt | |
| 6,102,752 | A | | 8/2000 | Bommel | |
| 6,126,495 | A | | 10/2000 | Lolic | |
| 6,186,840 | B1 | | 2/2001 | Geltsch | |
| 6,257,931 | B1 | | 7/2001 | Sakurai | |
| 6,261,116 | B1 | * | 7/2001 | Ceru | H01R 13/6272 439/352 |
| 6,273,766 | B1 | | 8/2001 | Zennamo, Jr. | |
| 6,361,377 | B1 | | 3/2002 | Saka | |
| 6,371,813 | B2 | | 4/2002 | Ramey | |
| 6,390,830 | B1 | | 5/2002 | Onizuka | |
| 6,394,858 | B1 | | 5/2002 | Geltsch | |
| 6,402,571 | B1 | | 6/2002 | Muller | |
| 6,475,040 | B1 | | 11/2002 | Myer | |
| 6,514,098 | B2 | | 2/2003 | Marpoe, Jr. | |
| 6,561,841 | B2 | | 5/2003 | Norwood | |
| 6,565,396 | B2 | | 5/2003 | Saka | |
| 6,679,736 | B2 | | 1/2004 | Saka | |
| 6,695,644 | B2 | | 2/2004 | Zhao | |
| 6,722,926 | B2 | | 4/2004 | Chevassus-More | |
| 6,761,577 | B1 | | 7/2004 | Koehler | |
| 6,814,625 | B2 | | 11/2004 | Richmond | |
| 6,824,170 | B2 | * | 11/2004 | Lee | F16L 37/086 285/314 |
| 6,872,103 | B1 | | 3/2005 | Flieger | |
| 6,921,283 | B2 | | 7/2005 | Zahlit | |
| 6,994,600 | B2 | | 2/2006 | Coulon | |
| 7,014,515 | B2 | | 3/2006 | Lutsch | |
| 7,150,660 | B2 | | 12/2006 | Allgood | |
| 7,175,488 | B2 | | 2/2007 | Pavlovic | |
| 7,192,318 | B2 | | 3/2007 | Hotea | |
| 7,278,891 | B2 | | 10/2007 | Cvasa | |
| 7,300,319 | B2 | | 11/2007 | Lutsch | |
| 7,314,377 | B2 | | 1/2008 | Northey | |
| 7,329,132 | B1 | | 2/2008 | Kamath | |
| 7,329,158 | B1 | | 2/2008 | Roberts | |
| 7,338,305 | B2 | | 3/2008 | Norwood | |
| 7,491,100 | B2 | | 2/2009 | Johannes | |
| 7,494,352 | B2 | | 2/2009 | Furio | |
| 7,497,723 | B2 | | 3/2009 | Brassell | |
| 7,503,776 | B1 | | 3/2009 | Pavlovic | |
| 7,520,773 | B2 | | 4/2009 | Siebens | |
| 7,563,133 | B2 | | 7/2009 | Stein | |
| 7,568,921 | B2 | | 8/2009 | Pavlovic | |
| 7,595,715 | B2 | | 9/2009 | Pavlovic | |
| 7,613,003 | B2 | | 11/2009 | Pavlovic | |
| 7,647,954 | B2 | * | 1/2010 | Garber | F16L 37/0841 141/346 |
| 7,651,344 | B2 | | 1/2010 | Wu | |
| 7,682,180 | B2 | | 3/2010 | Brown | |
| 7,713,096 | B2 | | 5/2010 | Pavlovic | |
| 7,758,369 | B2 | | 7/2010 | Miller | |
| 7,766,706 | B2 | | 8/2010 | Kawamura | |
| 7,780,489 | B2 | | 8/2010 | Stuklek | |
| 7,837,519 | B2 | | 11/2010 | Copper | |
| 7,874,851 | B2 | | 1/2011 | Shimizu | |
| 7,876,193 | B2 | | 1/2011 | Pavlovic | |
| 7,892,050 | B2 | | 2/2011 | Pavlovic | |
| 7,927,127 | B1 | | 4/2011 | Glick | |
| 7,942,682 | B2 | | 5/2011 | Copper | |
| 7,942,683 | B2 | | 5/2011 | Copper | |
| 7,963,782 | B2 | | 6/2011 | Hughes | |
| 7,976,351 | B2 | | 7/2011 | Boemmel | |
| 7,988,505 | B2 | | 8/2011 | Hotea | |
| 8,111,052 | B2 | | 2/2012 | Glovinsky | |
| 8,128,426 | B2 | | 3/2012 | Glick | |
| 8,167,337 | B2 | * | 5/2012 | Bruno | F16L 37/04 285/7 |
| 8,202,124 | B1 | | 6/2012 | Natter | |
| 8,206,175 | B2 | | 6/2012 | Boyd | |
| 8,235,292 | B2 | * | 8/2012 | Talboys | H01R 13/641 235/375 |
| 8,242,874 | B2 | | 8/2012 | Pavlovic | |
| 8,277,243 | B1 | | 10/2012 | Hernandez | |
| 8,282,429 | B2 | | 10/2012 | Glick | |
| 8,366,497 | B2 | | 2/2013 | Glick | |
| 8,388,389 | B2 | | 3/2013 | Costello | |
| 8,422,230 | B2 | | 4/2013 | Aiba | |
| 8,430,689 | B2 | | 4/2013 | Myer | |
| 8,446,733 | B2 | | 5/2013 | Hampo | |
| 8,449,338 | B2 | | 5/2013 | Gong | |

(56) References Cited

U.S. PATENT DOCUMENTS

| | | | | |
|---|---|---|---|---|
| 8,475,220 | B2 | 7/2013 | Glick | |
| 8,651,892 | B2 | 2/2014 | Arant | |
| 8,662,935 | B2 | 3/2014 | Jouas | |
| 8,668,506 | B2 | 3/2014 | Stack | |
| 8,678,867 | B2 | 3/2014 | Glick | |
| 8,758,043 | B2 | 6/2014 | Ohyama | |
| 8,795,007 | B2 | 8/2014 | Itou | |
| 8,840,436 | B2 | 9/2014 | Mott | |
| 8,858,264 | B2 | 10/2014 | Mott | |
| 8,858,274 | B2 | 10/2014 | Jakoplic | |
| 8,941,731 | B2 | 1/2015 | Barba | |
| 8,944,844 | B2 * | 2/2015 | Myer | H01R 13/641 439/489 |
| 8,956,190 | B2 | 2/2015 | Natter | |
| 8,968,021 | B1 | 3/2015 | Kennedy | |
| 8,974,244 | B2 | 3/2015 | Aihara | |
| 8,992,270 | B2 | 3/2015 | Glick | |
| 8,998,655 | B2 | 4/2015 | Glick | |
| 9,011,186 | B2 | 4/2015 | Wirth | |
| 9,048,552 | B2 | 6/2015 | Eyles | |
| 9,059,542 | B2 | 6/2015 | Oh | |
| 9,077,114 | B2 | 7/2015 | Oh | |
| 9,142,902 | B2 | 9/2015 | Glick | |
| 9,166,322 | B2 | 10/2015 | Glick | |
| 9,190,756 | B2 | 11/2015 | Glick | |
| 9,225,116 | B2 | 12/2015 | Mckibben | |
| 9,236,682 | B2 | 1/2016 | Glick | |
| 9,257,804 | B1 | 2/2016 | Beck | |
| 9,293,852 | B2 | 3/2016 | Glick | |
| 9,300,069 | B2 | 3/2016 | Morello | |
| 9,353,894 | B2 | 5/2016 | Richards | |
| 9,356,394 | B2 | 5/2016 | Kennedy | |
| 9,368,904 | B2 | 6/2016 | Natter | |
| 9,379,470 | B2 | 6/2016 | Glick | |
| 9,431,740 | B2 | 8/2016 | Glick | |
| 9,437,974 | B2 | 9/2016 | Glick | |
| 9,444,168 | B2 | 9/2016 | Horiuchi | |
| 9,444,205 | B2 | 9/2016 | Rangi | |
| 9,455,516 | B2 | 9/2016 | Gutenschwager | |
| 9,502,783 | B2 | 11/2016 | Bleicher | |
| 9,525,254 | B2 | 12/2016 | Chen | |
| 9,537,241 | B2 | 1/2017 | Rivera | |
| 9,548,553 | B2 | 1/2017 | Glick | |
| 9,583,860 | B1 * | 2/2017 | DeWitte | H01R 13/436 |
| 9,608,369 | B1 | 3/2017 | Brandt | |
| 9,620,869 | B2 | 4/2017 | Listing | |
| 9,653,859 | B1 | 5/2017 | Moore | |
| 9,680,256 | B1 | 6/2017 | Lane | |
| 9,705,229 | B2 | 7/2017 | Itou | |
| 9,705,254 | B2 | 7/2017 | Lampert | |
| 9,711,885 | B2 | 7/2017 | Hamai | |
| 9,748,693 | B1 | 8/2017 | Exenberger | |
| 9,841,454 | B2 | 12/2017 | Gelonese | |
| 9,847,591 | B2 | 12/2017 | Glick | |
| 9,876,317 | B2 | 1/2018 | Glick | |
| 9,905,950 | B2 | 2/2018 | Marsh | |
| 9,905,953 | B1 | 2/2018 | Pavlovic | |
| 9,905,955 | B2 | 2/2018 | Endo | |
| 9,948,044 | B2 | 4/2018 | Harris, III | |
| 10,014,614 | B2 | 7/2018 | Davies | |
| 10,014,631 | B1 | 7/2018 | Chambly | |
| 10,038,278 | B2 | 7/2018 | Lane | |
| 10,044,140 | B1 | 8/2018 | Gianrossi | |
| 10,122,117 | B2 | 11/2018 | Miller | |
| 10,135,168 | B2 | 11/2018 | Pavlovic | |
| 10,178,754 | B2 | 1/2019 | Kobayashi | |
| 10,184,970 | B2 | 1/2019 | Maalouf | |
| 10,218,117 | B1 | 2/2019 | Probert | |
| 10,276,959 | B2 | 4/2019 | Lehner | |
| 10,283,889 | B2 | 5/2019 | Glick | |
| 10,355,414 | B1 * | 7/2019 | Alvarado | H01R 13/639 |
| 10,594,058 | B2 | 3/2020 | Kan | |
| 10,693,252 | B2 | 6/2020 | Pavlovic | |
| 11,069,999 | B2 | 7/2021 | Fisher | |
| 11,223,150 | B2 | 1/2022 | Pavlovic | |
| 11,239,597 | B2 * | 2/2022 | Dawson | H01R 43/26 |
| 11,296,462 | B2 * | 4/2022 | Schneider | H01R 13/465 |
| 11,398,696 | B2 | 7/2022 | Pavlovic | |
| 11,411,336 | B2 | 8/2022 | Pavlovic | |
| 11,476,609 | B2 | 10/2022 | Pavlovic | |
| 2001/0019924 | A1 | 9/2001 | Heimueller | |
| 2001/0021602 | A1 | 9/2001 | Zanten | |
| 2002/0016964 | A1 | 2/2002 | Aratani | |
| 2002/0019156 | A1 | 2/2002 | Fukamachi | |
| 2002/0049005 | A1 | 4/2002 | Leve | |
| 2002/0081888 | A1 | 6/2002 | Regnier | |
| 2002/0180272 | A1 | 12/2002 | Yuasa | |
| 2004/0150224 | A1 | 8/2004 | Lee | |
| 2005/0134037 | A1 | 6/2005 | Bruno | |
| 2005/0211934 | A1 | 9/2005 | Garber | |
| 2006/0040555 | A1 | 2/2006 | Chen | |
| 2006/0172618 | A1 | 8/2006 | Yamashita | |
| 2007/0123093 | A1 | 5/2007 | Lutsch | |
| 2007/0149050 | A1 | 6/2007 | Oka | |
| 2009/0197457 | A1 * | 8/2009 | Lanni | H01R 13/6456 439/491 |
| 2010/0056106 | A1 | 3/2010 | Korhonen | |
| 2011/0130023 | A1 | 6/2011 | Kataoka | |
| 2011/0168778 | A1 | 7/2011 | Talboys | |
| 2011/0171843 | A1 | 7/2011 | Casses | |
| 2012/0094551 | A1 | 4/2012 | Corman | |
| 2012/0129407 | A1 | 5/2012 | Glick | |
| 2012/0244756 | A1 | 9/2012 | Jouas | |
| 2013/0002102 | A1 | 1/2013 | Chen | |
| 2013/0004050 | A1 | 1/2013 | Wu | |
| 2013/0040505 | A1 | 2/2013 | Hirakawa | |
| 2013/0078874 | A1 | 3/2013 | Itou | |
| 2013/0109224 | A1 | 5/2013 | Chin | |
| 2013/0210292 | A1 | 8/2013 | Schmidt | |
| 2013/0215573 | A1 | 8/2013 | Wagner | |
| 2013/0337702 | A1 | 12/2013 | Pavlovic | |
| 2014/0087601 | A1 | 3/2014 | Glick | |
| 2014/0193995 | A1 | 7/2014 | Barthelmes | |
| 2014/0227915 | A1 | 8/2014 | Glick | |
| 2014/0244998 | A1 | 8/2014 | Amenedo | |
| 2015/0038000 | A1 | 2/2015 | Glick | |
| 2015/0072207 | A1 | 3/2015 | Soleski | |
| 2015/0074996 | A1 | 3/2015 | Glick | |
| 2015/0079859 | A1 | 3/2015 | Glick | |
| 2015/0162706 | A1 | 6/2015 | Kennedy | |
| 2015/0255912 | A1 | 9/2015 | Natter | |
| 2015/0255924 | A1 | 9/2015 | Glick | |
| 2015/0280381 | A1 | 10/2015 | Rangi | |
| 2015/0365400 | A1 | 12/2015 | Cox | |
| 2016/0028169 | A1 | 1/2016 | Glick | |
| 2016/0043505 | A1 | 2/2016 | Wu | |
| 2016/0336572 | A1 | 11/2016 | Yoshida | |
| 2017/0019381 | A1 | 1/2017 | Khazan | |
| 2017/0134424 | A1 | 5/2017 | Egorov | |
| 2017/0294764 | A1 | 10/2017 | Shimizu | |
| 2017/0338600 | A1 | 11/2017 | Tanaka | |
| 2018/0090900 | A1 | 3/2018 | Horiuchi | |
| 2018/0191095 | A1 | 7/2018 | Pavlovic | |
| 2018/0219305 | A1 | 8/2018 | Wavering | |
| 2018/0269624 | A1 | 9/2018 | Iwabe | |
| 2018/0351282 | A1 | 12/2018 | Duan | |
| 2019/0052025 | A1 | 2/2019 | Buechli | |
| 2019/0089083 | A1 | 3/2019 | Pavlovic | |
| 2019/0372262 | A1 * | 12/2019 | Christiano | H01R 13/436 |
| 2020/0395700 | A1 | 12/2020 | Pavlovic | |
| 2021/0167538 | A1 | 6/2021 | Pavlovic | |
| 2022/0131299 | A1 | 4/2022 | Pavlovic | |

FOREIGN PATENT DOCUMENTS

| | | | |
|---|---|---|---|
| CN | 103022756 | | 4/2013 |
| CN | 103141000 | | 6/2013 |
| CN | 203193080 | | 9/2013 |
| CN | 2015100485492 | | 5/2015 |
| CN | 105225040 | | 1/2016 |
| CN | 206098831 | U | 4/2017 |
| CN | 206962160 | | 2/2018 |
| CN | 107863610 | | 3/2018 |
| CN | 111937250 | | 11/2020 |

(56) References Cited

FOREIGN PATENT DOCUMENTS

| | | | |
|---|---|---|---|
| DE | 4215162 | A1 | 12/1992 |
| DE | 4139100 | C1 | 1/1993 |
| DE | 19817924 | | 10/1999 |
| DE | 102013211208 | | 12/2014 |
| EP | 1291979 | | 12/2004 |
| EP | 3024097 | | 5/2016 |
| JP | H1040995 | | 2/1998 |
| JP | H1050376 | | 2/1998 |
| JP | H1050377 | | 2/1998 |
| JP | 2011049107 | | 3/2011 |
| JP | 2012043739 | | 3/2012 |
| JP | 2016-100113 | | 5/2016 |
| JP | 2016529675 | A | 9/2016 |
| JP | 2017010755 | | 1/2017 |
| JP | 6989715 | | 1/2022 |
| KR | 20160138442 | | 12/2016 |
| WO | 2017195092 | | 11/2017 |
| WO | 2019164536 | | 8/2019 |
| WO | 2019229587 | | 12/2019 |
| WO | 2019236976 | | 12/2019 |
| WO | 2019237009 | | 12/2019 |
| WO | 2019237046 | | 12/2019 |
| WO | 2020150399 | | 7/2020 |
| WO | 2021050499 | | 3/2021 |

OTHER PUBLICATIONS

International Search Report and Written Opinion issued in PCT/US21/33446, dated Aug. 24, 2021, 17 pages.

International Search Report from PCT/US2018/019787 dated Nov. 26, 2018 (3 pages).

Written Opinion from PCT/US2018/019787 dated Nov. 26, 2018 (10 pages).

International Search Report and Written Opinion issued in PCT/US2019/036070, dated Sep. 27, 2019, 8 pages.

International Search Report and Written Opinion issued in PCT/US2019/036010, dated Sep. 30, 2019, 13 pages.

International Search Report and written Opinion issued in PCT/US2019/036127, dated Oct. 4, 2019, 11 pages.

International Search Report and written Opinion issued in PCT/US20/013757, dated Dec. 10, 2020, 7 pages.

International Search Report and Written Opinion issued in PCT/US20/14484, dated Mar. 31, 2020, 7 pages.

Component of a DC Converter Assembly, Lincoln Aviator Part No. L1MZ14B227D (shorturl.at/nABE5), believed to be available before Jan. 2020.

International Search Report and Written Opinion issued in PCT/US21/43788, dated Dec. 23, 2021, 23 pages.

International Search Report and Written Opinion issued in PCT/US21/47180, dated Jan. 6, 2022, 18 pages.

International Search Report and Written Opinion issued in PCT/US21/43686, dated Dec. 23, 2021, 28 pages.

Website entitled High Power Lock Box, available at:<https://web.archive.org/web/20200812181656/https://royalpowersolutions.com/products/battery-power-electronics/high-power-lock-box> (Royal Power Solutions) Aug. 12, 2020.

Office Action issued for U.S. Appl. No. 18/362,373 dated Feb. 8, 2024.

USCAR-2, Rev. 6.

USCAR-38, Rev. 1.

USCAR-37, Rev. 1.

USCAR-25, Rev. 3.

USCAR-21, Rev. 3.

USCAR-12, Rev. 5.

English translation of Office Action from Japanese Application No. 2022-515637 dated Sep. 11, 2024.

* cited by examiner

CONNECTOR RECORDING SYSTEM WITH READABLE AND RECORDABLE INDICIA

CROSS-REFERENCE TO RELATED APPLICATIONS

This application is a Continuation of U.S. patent application Ser. No. 17/588,468, which is a Continuation of U.S. patent application Ser. No. 17/351,413, which is a Continuation of International Patent Application No. PCT/US2020/049870, which claims priority from U.S. Provisional Patent Application No. 62/897,658. The disclosures set forth in the referenced applications are incorporated herein by reference in their entireties.

FIELD OF DISCLOSURE

The present disclosure relates to a connector recording system including a recording system and a connector system. The connector system includes a multi-component connector assembly with a female housing assembly, a male housing assembly, and a connector positioning assembly with an indicia, the indicia being read by the recording system to detect installation states with respect to the component or device to which the connector assembly is installed.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creates comforts to the occupants of the motor vehicles. Considerable time, resources, and energy have been expended to develop power distribution components that meet the varied needs and complexities of the motor vehicle market; however, conventional power distribution components suffer from a variety of shortcomings.

Existing connector systems require a human, such as an operator or technician, to inspect the connector assemblies, determine whether these assemblies are properly mated or secured to another component or device, and then notate whether the assemblies are properly mated/secured to that component or device. This human verification process is susceptible to error in making this determination and notation and as a result, poor precision over time (e.g., during the work shift). The human verification system is no better than 80% accurate, which is insufficient for a variety of component or device applications and installations, such as critical signal connections (e.g., automotive airbags, batteries, battery power packs, and advanced driver-assistance systems (ADAS)) and critical high-power systems. Due to the inherent limitations of the human verification system, multiple inspections of the connector components must be conducted during the installation process, which reduces the efficiency of the installation process and increases costs. Also, if the human verification system does not detect an improper connection, the installed device is susceptible to a malfunction during operation of the related component or device, such as arcing and intermittency, which impact the functionality and life of the installed component or device.

Accordingly, there is an unmet need for an improved connector recording system that addresses the shortcomings of a human verification system, wherein the improved connector recording system provides a number of benefits and improvements for a wide variety of component, devices, products, applications and industries. The description provided in the background section should not be assumed to be prior art merely because it is mentioned in or associated with the background section.

SUMMARY

The present disclosure relates to a mechanical and electrical connector system or platform that includes a readable and recordable indicia that allows for the reading and recordation of various installation states of the connector. The connector recording system is suitable for use with mechanically and electrically connecting components or devices (e.g., alternators, power modules and battery packs) found in an airplane, motor vehicle, a military vehicle (e.g., tank, personnel carrier, heavy-duty truck, and troop transporter), a bus, a locomotive, a tractor, marine applications (e.g., cargo ship, tanker, pleasure boat, submarine and sailing yacht) telecommunications hardware (e.g., server), a battery pack, a 24-48 volt system, for a high-power application, a high-current application and/or a high-voltage application. Accordingly, the connector recording system is well-suitable to electrically and mechanically connect components or devices that are installed in these vehicles to ensure reliable, long-term performance and operation of the components, devices and vehicles.

In one embodiment, the connector recording platform comprises a recording system that includes a scanner and a connector system. The connector system includes: a male housing assembly with a male engaging member that is coupled to a front wall of the male housing assembly, a female housing assembly with a female engaging member that is coupled to the male housing assembly in a connected stat, and a connector position assurance assembly having an indicia and a locking member that is coupled to the male housing assembly, the locking member being movable between a locked position and a unlocked position. When the locking member is in the locked position, the locking member secures the male housing assembly to the female housing assembly when the connector system is in the connected state. When the locking member is in the locked position, the indicia is in a state that allows the scanner to obtain information from the indicia, said information capable of informing an installer that the connector is in the connected state and the connector position assurance assembly is in the locked position. When the locking member is in the unlocked position, the indicia is in a state that does not allow the scanner to obtain information from the indicia.

The connector system only requires a single person or machine to mate the male connector assembly into the female connector assembly. After the person or installer displaces the male connector assembly into engagement with the female connector assembly, a connector position assurance (CPA) assembly is actuated and then makes an audible sound, such as a "click", as it is locked into place. The person exerts a small force, which can be considered to be a "tug", on the connector assemblies to ensure they are properly coupled together. If the small tug force results in disconnection of the male and female connector assemblies, then the prior connection was not properly performed and the male connector assembly is again mated with the female connector assembly. Once the connector has passed the "tug" step, the connector system can be read. The reading of the system is intended to: (i) record information associated with the connector system and the component or device environment in which the connector system is installed, and (ii) inform the installer that the male connector assembly is properly mated with the female connector assembly. Accordingly, the connector system is "PCTR" (push, click, tug, read) compliant under certain industry standards.

Additional structural and functional aspects and benefits of the system are disclosed in the Detailed Description section and the Figures.

BRIEF DESCRIPTION OF THE DRAWINGS

The accompanying drawings or figures, which are included to provide further understanding and are incorporated in and constitute a part of this specification, illustrate disclosed embodiments and together with the description serve to explain the principles of the disclosed embodiments. In the Figures, like reference numerals refer to the same or similar elements throughout the Figures. In the drawings.

DETAILED DESCRIPTION

Figure 1A:
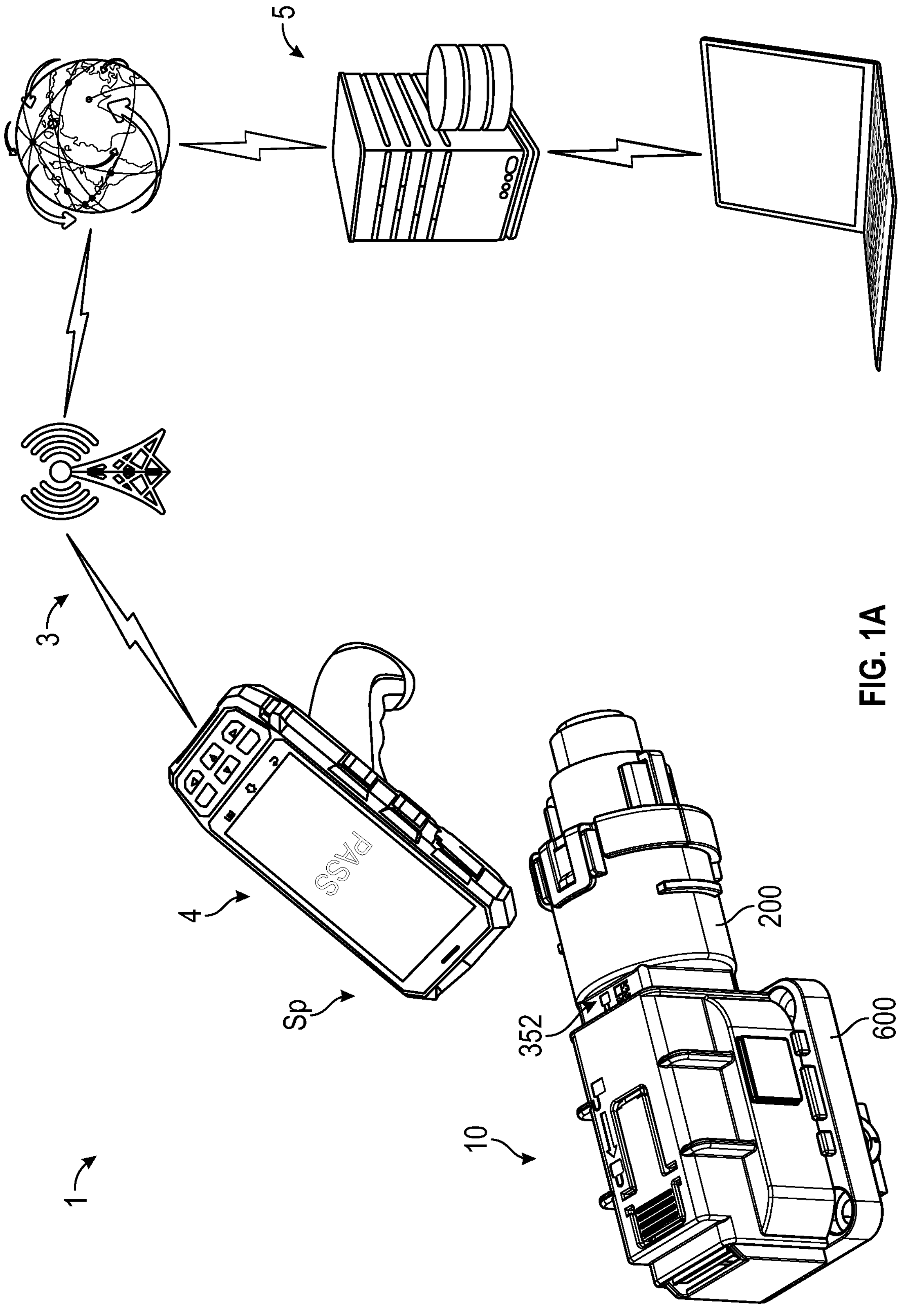
FIG. 1A is a schematic view of a connector recording system that includes a connector system and a multi-component recording system.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings. In the Figures, like reference numerals refer to the same or similar elements throughout the Figures.

The Figures show a connector recording system or platform 1 that includes a recording system 3 that is designed to interact with and function with various embodiments of a connector system 10, 1010, 2010, 3010, 4010, 5010, 6010. The recording system 3 includes multiple components that interact to read, obtain, transfer, store, and display information associated with a connector system 10 and an environment, application, component or device in which the connector system 10 is installed or coupled to. The connector recording system 1 constitutes a platform of integrated components, functions and technologies provided by the recording system 3 and the connector system 10, 1010, 2010, 3010, 4010, 5010, 6010. Alternatively, the recording system 3 is omitted and the connector recording system 1 is a platform of integrated components, functions and technologies provided by the connector system 10, 1010, 2010, 3010, 4010, 5010, 6010.

The ability of the connector recording system 1 to record and document the installation status of the connector system 10 is particularly important where the connector system 10 (i) is integrated with or installed in a component or device 7 that has an extended operating life, (ii) is installed within a broader component, product, application, or environment, and/or (iii) is produced or operated under industry standards and/or government regulations that must be complied with, including well after the connector system 10 is initially installed. For example, the connector recording system 1 can detect improper mechanical and/or electrical installation of the connector system 10, or detect and provide confirmatory results showing proper mechanical and/or electrical installation of the connector system 10 to satisfy industry standards and/or government regulations where this showing is made during a post-installation review or investigation. The ability of the connector recording system 1 to provide accurate recordation of the installation enables the connector recording system 1 to provide long-term benefits to ensure compliance with industry standards and government regulations, especially in the context of defending against misplaced allegations raised during a regulatory proceeding, audit of installation results, or legal dispute focusing on the alleged improper installation or performance of the connector system 10 or its components.

As depicted in the Figures, the connector system 10 is designed to provide mechanical and electrical coupling in the component or device 7, such as: (i) a power source (e.g., alternator or battery) to a device (e.g., radiator fan, heated seat, power distribution component, or another current drawing component), or (ii) a power source (e.g., alternator or battery) to another power source (e.g., alternator or battery) using a bus bar. The connector system 10 may be used within another component or device 7, such as a power distribution system, which may be installed within an airplane, motor vehicle, a military vehicle (e.g., tank, personnel carrier, heavy-duty truck, and troop transporter), a bus, a locomotive, a tractor, a boat, a submarine, a battery pack, a 24-48 volt system, for a high-power application, for a high-current application, for a high-voltage application. In these applications, the power distribution components are essential to meet industry standards, production, and performance requirements of the power distribution system and the motor vehicle. It should be understood that multiple connector systems 10 could be used in a single environment, application, product, component, or device. It should also be understood that the connector system 10 is "PCTR" (push, click, tug, read) compliant and consistently meets USCAR Specifications, including USCAR-12, USCAR-25, and USCAR-2.

The connector system 10 includes a CPA assembly 350 that has at least one readable indicia 354. The indicia 354 is configured to be placed into two different configurations or installation states depending on the arrangement of the connector system 10 and the CPA assembly 350, wherein in one configuration the indicia 354 is unreadable by the recording system 3, and in a second configuration the indicia 354 is readable by the recording system 3. The term "readable" means that the recording system 3 can view and/or decode the information provided by or contained within the indicia 354. Likewise, the term "unreadable" means that the recording system 3 cannot view and/or decode the information contained provided by or within the indicia 354. When the indicia 354 is unreadable, the CPA assembly 350 is in the unlocked position $P_U$. In the unlocked position $P_U$, an extent of the connector system 10 has caused the indicia 354 to become: (i) inaccessible, concealed, and/or not viewable, or (ii) partially inaccessible, partially concealed, and/or not completely viewable. In other words, the indicia 354 is unreadable when it is: (i) inaccessible, concealed, and/or not viewable and/or (ii) partially inaccessible, partially concealed, and/or not completely viewable. The connector system 10 is configured such that the indicia 354 is readable only when the CPA assembly 350 is in the locked position $P_L$. In other words, the design of the connector system is configured such that the indicia 354 is unreadable when the CPA assembly 350 is not in the locked position $P_L$. Making the indicia 354 readable in only the locked position $P_L$ is desirable because the male terminal assembly 430 may be mechanically and electrically connected with the female terminal assembly 800 and thus current can pass through the system 10. Accordingly, the installer may not realize that the CPA 350 is in the unlocked position $P_U$ before proceeding to the next step in the assembly process, which may lead to failure at a later time of the connector during operation of the component, product, or application.

Furthermore, the indicia 354 is readable when the connector system 10: (i) is in the connected state $S_C$ and (ii) the CPA assembly is in the locked position $P_L$. These conditions occur because an extent of the connector system 10 has made the indicia 354 unreadable. It should be understood that in certain embodiments, the indicia 354 may be readable when the connector system 10 is not in the connected state $S_C$ but the CPA assembly is in the locked position $P_L$, which may cause the recording system 3 to record a false positive connected reading. However, this false positive connected reading should be easily identified by the installer because the male terminal assembly 430 will not properly mate with the female terminal assembly 800 and thus current will not be able to flow through the connector system 10. Accordingly, the installer will recognize and know that the connector system 10 is not properly mated or connected due to the fact that current cannot be detected as flowing through the component, product, or application. In other embodiment, the connector system 10 may have an alternative configuration that does not allow the recording system 3 to record false positive readings.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. Accordingly, the drawings and detailed descriptions are to be regarded as illustrative in nature, not restrictive or limiting.

Figure 1B:
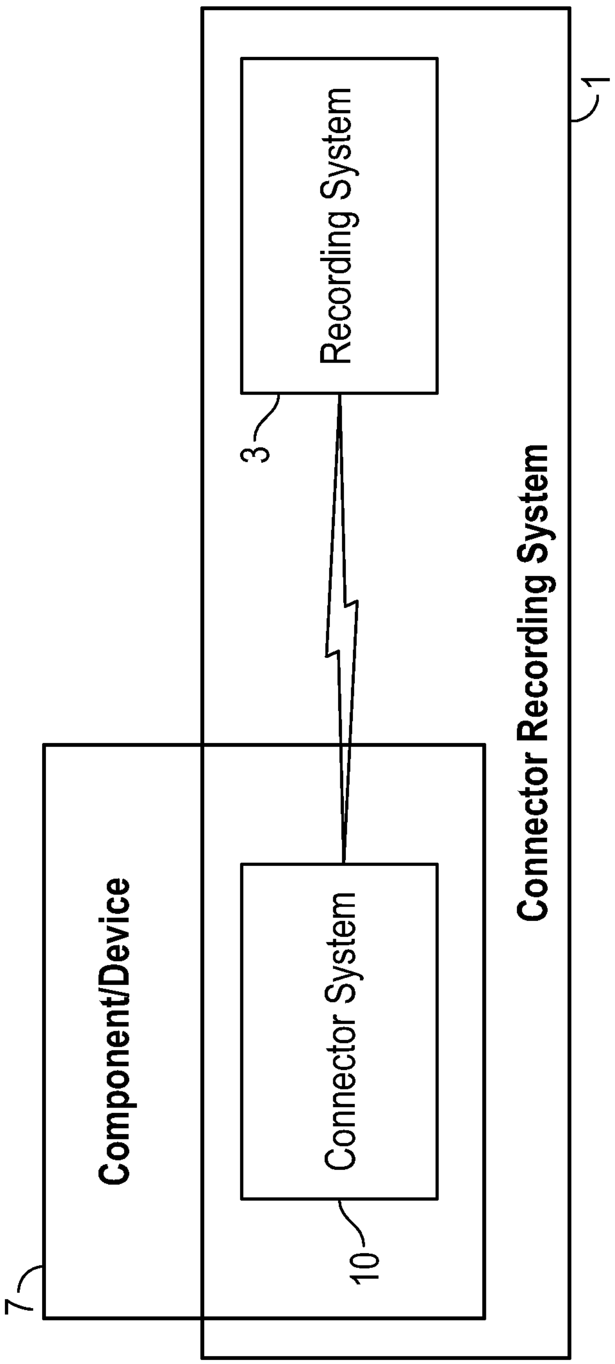
FIG. 1B is a schematic view of the connector recording system operationally integrated with an application/component/device.

Referring to FIG. 1, the connector recording system 1 includes an indicia reading device or scanner 4 and a database 5. The indicia reading device or scanner 4 is configured to decode the information that is contained within the indicia 354. As such, the indicia reading device 4 may be handheld (as shown in FIG. 1) or be affixed to a structure or machine contained within the installation environment. If the indicia reading device 4 is handheld, the installer may be required to manipulate the device 4 to properly read the indicia 354. Alternatively, the indicia reading device 4 may not be manipulated by the installer and instead can remotely read the indicia 354 from a distance. For example, reading an RFID tag using a reading device 4 that is positioned on multiple sides or locations of an assembly line.

The indicia reading device 4 may also utilize any technology that is adapted for decoding information contained within the indicia 354. For example, the indicia reading device 4 may be a non-contact optical based scanner 4A. In other words, the indicia reading device 4 may be a still image camera, a video camera, a barcode scanner, or a CCD reader. In other embodiments, the indicia reading device 4 may be a radio based device (capable of reading indicia 354, which takes the form of a RFID tag), a contact based device (touch probe), a light based device (LiDAR or a light source with a photodetector), or other similar devices.

Once the indicia reading device 4 attempts to read the indicia 354, the indicia reading device 4 informs the installer whether the indicia 354 was properly read. For example, the indicia reading device 4 informs the installer of an error if the installer points the indicia reading device 4 at the indicia 354 and activates the indicia reading device 4 for a predefined amount of time, but the indicia reading device 4 is unable to read and/or decode the information that is contained within the indicia 354. In contrast, the indicia reading device 4 will inform the installer that the connector system 10 passes and there are no errors with the installation when the installer points the indicia reading device 4 at the indicia 354, activates the indicia reading device 4, and the indicia reading device 4 is able to read and decode the information that is contained within the indicia 354. As will be discussed in greater detail below, the information that is contained within the indicia 354 may be a serial number, part number, application information (e.g., vehicle identification number), component information (e.g., power distribution assembly) or device information (e.g., alternator).

Once the indicia reading device 4 has decoded the information that is contained within the indicia 354, this information may be combined with the information about the environment, application, component or device that is beyond the indicia 354 to create the associated connector dataset. Information that is not obtained from the indicia 354 and provided by another source includes: (i) time, including minutes, hours, day, year, of the mating of the components of the connector assembly, namely the male connector assembly, the female connector assembly, and the CPA assembly, (ii) location, (iii) installer's name or other factory information, (iv) production number for day, month and/or year, (v) day the indicia reading device 4 was last calibrated, (vi) application information (e.g., vehicle identification number), (vii) component information (e.g., power distribution assembly) or (viii) device information (e.g., alternator). For example, the indicia reading device 4 may record the geographic location, time, type of vehicle, install location within the vehicle, and component that the connector system 10 couples together.

The associated connector data can then be sent directly to a database 5, routed through an intranet to the database 5 or routed through the internet to the database 5. The sending of this associated connector data can be done using a: (i) wired communication protocol (e.g., any USB based communication protocol (e.g., USB 1.0, 2.0, 3.0), Ethernet (e.g., 802.3), FireWire, or any other type packet based wired communication technology) or (ii) a wireless communication protocol (e.g., Bluetooth, ZigBee, Wi-Fi (e.g., 802.11a, b, g, n), Wi-Fi Max (e.g., 802.16e), Digital Enhanced Cordless Telecommunications (DECT), cellular communication technologies (e.g., CDMA-1×, UMTS/HSDPA, GSM/GPRS, TDMA/EDGE, EV/DO, or LTE), near field communication (NFC), or a custom designed wireless communication technology).

Once the associated connector data is received by the database 5, it is stored for a predetermined amount of time. The database 5 may be a local database or a remote database (e.g., a network enabled database, such as a cloud server). The database 5 allows a user or an installer to connect an external device to the database 5 to view the recorded records. Such a device may be an internet enabled device, including a laptop or a smartphone. The benefits of storing the records on a remote database that is accessible using an internet enabled device includes: (i) the ability to ensure that records are maintained even if local databases are destroyed or lost, ii) the ability to provide access to these regardless of location (i.e., the ability to provide any dealership with proof that the connector was properly engaged upon completion of manufacturing the vehicle), or other known benefits of using a remote network accessible database.

It should be understood that the component described above may take different forms or use different technology to achieve the same basic goals. Further, it should also be understood that some of the above described components may be omitted for this system 3. For example, the database may be omitted in certain embodiments.

The first embodiment of the connector system 10 is shown within FIGS. 3-24B and is comprised of multiple components that are described below and/or shown within the Figures. The connector system 10 includes a male connector assembly 200, a female connector assembly 600, and a CPA assembly 350. The male connector assembly 200 is typically coupled to a wire or lead, while the female connector assembly 600 is installed within or to a product, component, or device.

FIGS. 3-24B provide various views of the male connector assembly 200. The male connector assembly 200 includes: (i) a male housing assembly 220, (ii) a male terminal assembly 430, and (iii) a lead or wire 590. The male housing assembly 220 has a body 226 and a terminal receiver 260. The body 226 includes an arrangement of side walls 228*a*-228*d* and a front wall 236. The arrangement of side walls 228*a*-228*d* form a receiver 230 that is configured to receive an extent of the male terminal assembly 430 and the wire 590. The receiver 230 is closed by the front wall 236 that is integrally formed with the side walls 228*a*-228*d*.

As shown in FIGS. 3-24B, the male terminal receiver 260 is formed from an arrangement of terminal receiver side walls 262*a*-262*d* and a terminal perimeter wall 264. The side walls 262*a*-262*d* form a bowl shaped receiver 266. The receiver 266 is configured to snugly receive a majority of the male terminal assembly 430. This configuration provides additional rigidity to the male terminal assembly 430 and limits the exposed amount of the male terminal assembly 430. However, the entire male terminal assembly 430 is not enclosed within the male terminal receiver 260 or the body 226 because then the male terminal assembly 430 would then be prevented from contacting the female terminal assembly 800. Thus, to facilitate the coupling of the male terminal assembly 430 to the female terminal assembly 800, the side walls 262*a*-262*d* each have male terminal openings 268*a*-268*d* there through. The male terminal openings 268*a*-268*d* are disposed through an intermediate portion of the side walls 262*a*-262*d* and are configured to permit an extent of the male terminal assembly 430 to extend through the side walls 262*a*-262*d* to enable the male terminal assembly 430 to contact the female terminal assembly 800.

Figure 2:
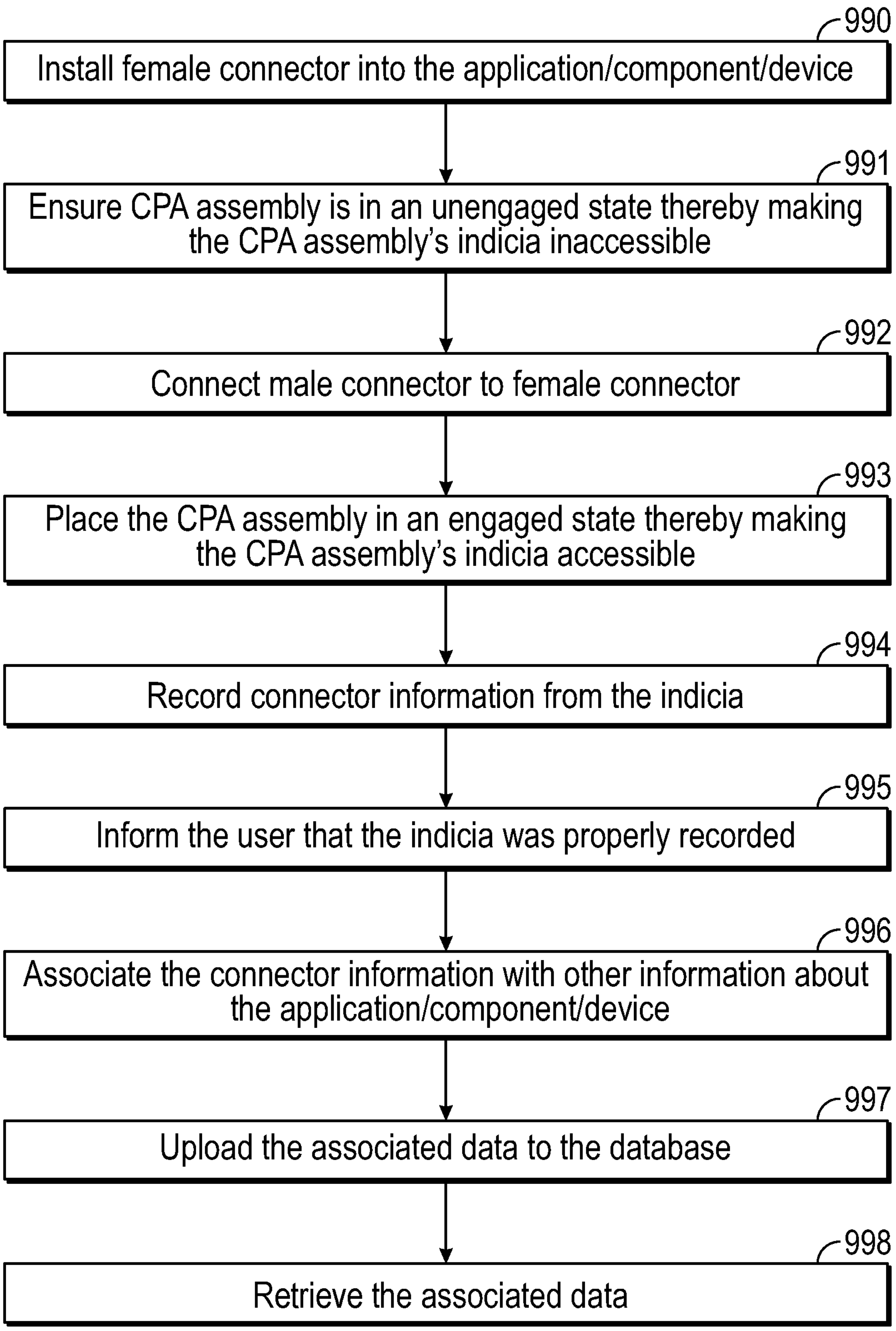
FIG. 2 is a flowchart showing the installation and usage process for the connector recording system in regards to a component or device.

FIGS. 3, 10-11A, 13, 14A, 16, 17A, 19, 20A and 22 provide various views of the male terminal assembly 430. Specifically, the male terminal assembly 430 includes a spring member 440*a* and a male terminal 470. The male terminal 470 includes a male terminal body 472 and a male terminal connection member or plate 474. The male terminal connection plate 474 is coupled to the male terminal body 472 and is configured to receive an extent of a structure (e.g., lead or wire 590, as shown in FIG. 2) that connects the male terminal assembly 430 to a device (e.g., an alternator) outside of the connector system 10. The wire 590 is typically welded to the connection plate 474; however, other methods (e.g., forming the wire 590 as a part of the connection plate 474) of connecting the wire 590 to the connection plate 474 are contemplated by this disclosure.

The male terminal body 472 includes: (i) an arrangement of male terminal side walls 482*a*-482*d* and (ii) a first or top terminal wall 480. The arrangement of male terminal side walls 482*a*-482*d* are coupled to one another and generally form a rectangular prism. Two male terminal side walls 482*a*, 482*c* within the arrangement of male terminal side walls 482*a*-482*d* include: (i) a side wall portion 492*a*, 492*c*, which generally has a "U-shaped" configuration and (ii) contact arms 494*a*-494*h*. The side wall portions 492*a*, 492*c* are substantially planar and have a U-shaped configuration with an intermediate segment. The contact arms 494*a*-494*h* extend: (i) from an extent of the intermediate segment of the side wall portion 492*a*, 492*c*, (ii) away from the top male terminal wall 480, and (iii) across an extent of the contact arm openings. This configuration is beneficial over the configuration of the terminals shown in FIGS. 9-15, 18, 21-31, 32, 41-42, 45-46, 48 and 50 in PCT/US2018/019787 because it allows for: (i) can be shorter in overall length, which means less metal material is needed for formation and the male terminal 470 can be installed in narrower, restrictive spaces, (ii) has a higher current carrying capacity, (iii) is easier to assemble, (iv) improved structural rigidity because the contact arms 494*a*-494*h* are positioned inside of the first male terminal side wall portion 492*a*-492*d*, (iv) benefits that are disclosed in connection with PCT/US2019/036010, and (v) other beneficial features that are disclosed herein or can be inferred by one of ordinary skill in the art from this disclosure.

Figure 22:
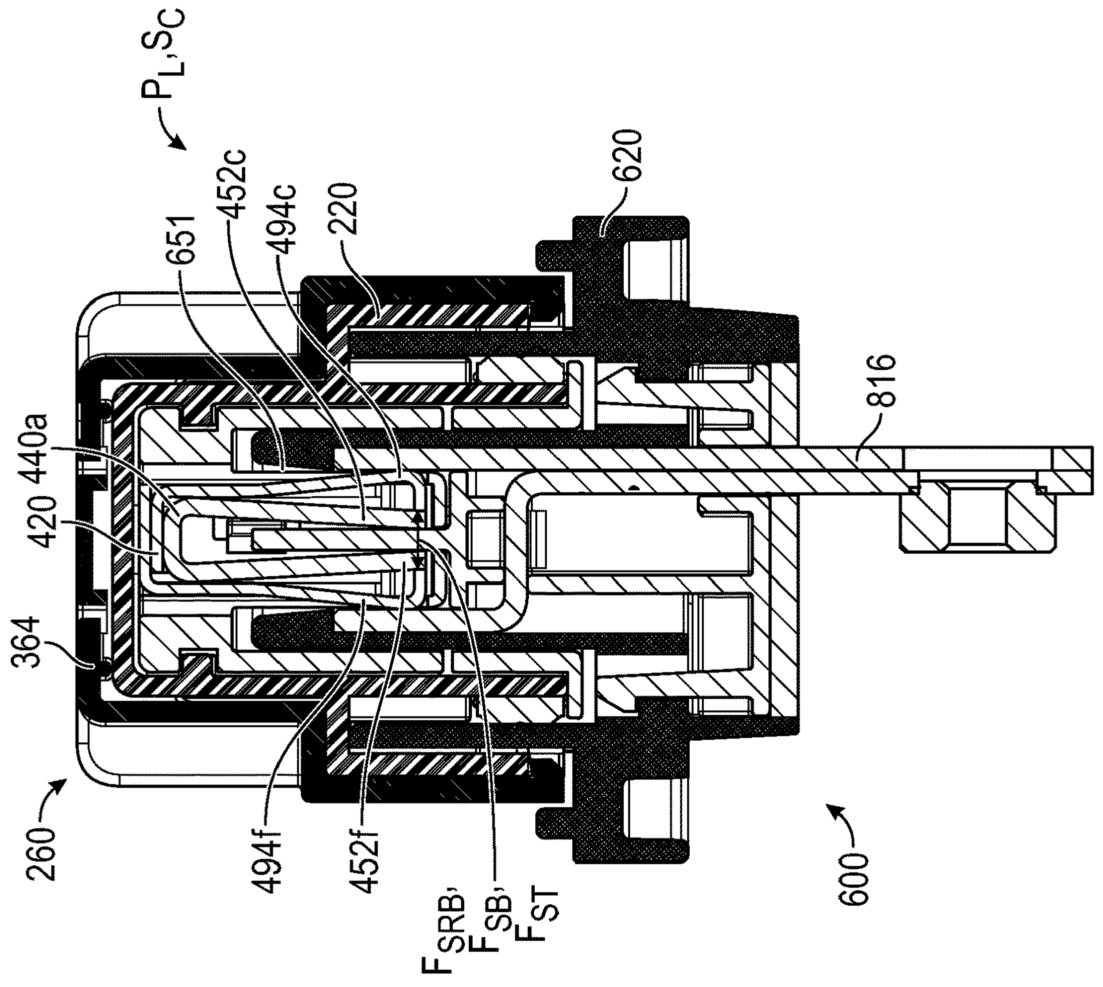
FIG. 22 is a cross-sectional view of the connector system taken along line 22-22 of FIG. 21.
Figure 21:
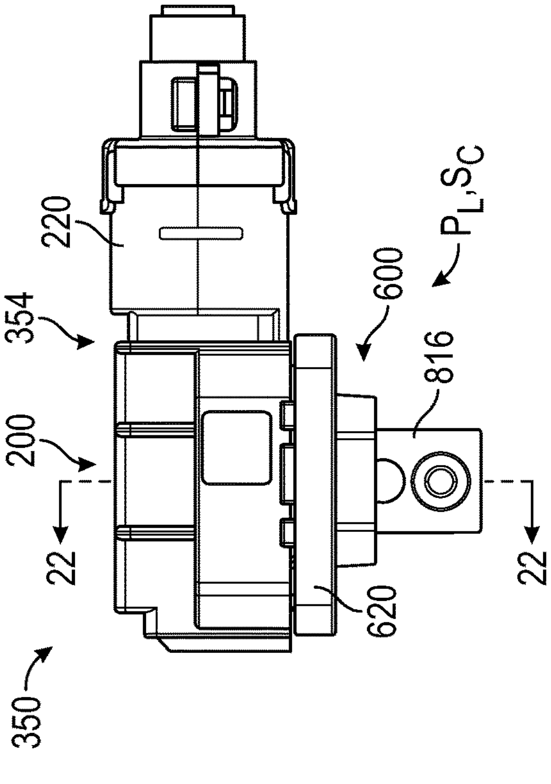
FIG. 21 is a side view of the connector system of FIG. 3 in a connected state $S_C$, wherein the CPA assembly is in a locked position $P_L$.

The contact arms 494*a*-494*h* extend away from the top male terminal wall 480 at an outward angle. This configuration allows the contact arms 494*a*-494*h* to be deflected or displaced inward and towards the center of the male terminal 470 by the female terminal assembly 800, when the male terminal assembly 430 is inserted into the female terminal assembly 800. This inward deflection is best shown in FIG. 22 and other figures contained within PCT/US2019/036010. This inward deflection helps ensure that a proper mechanical and electrical connection is created by ensuring that the contact arms 494*a*-494*h* are placed in contact with the female terminal assembly 800. The male terminal 470 is typically formed from a single piece of material (e.g., metal). Therefore, the male terminal 470 is a one-piece male terminal 470 and has integrally formed features. To integrally form these features, the male terminal 470 is typically formed using a die cutting process. However, it should be understood that other types of forming the male terminal 470 may be utilized, such as casting or using an additive manufacturing process (e.g., 3D printing). In other embodiments, the features of the male terminal 470 may not be formed from one-piece or be integrally formed, but instead formed from separate pieces that are welded together.

FIGS. 3, 10-11A, 13, 14A, 16, 17A, 19, 20A and 22 show views of the spring member 440*a* that is configured to function with the first embodiment of the male terminal 470. The spring member 440*a* generally includes: (i) arched spring sections 448*a*-448*d* and (ii) spring arms 452*a*-452*h*. The arched spring sections 448*a*-448*d* extend between the rear extent of the spring member wall 444 and the spring arms 452*a*-452*h*. The spring arms 452*a*-452*h* are not connected to one another. This configuration allows for omni-directional of the spring arms 452*a*-452*h*, which facilitates in the mechanical coupling between the male terminal 470 and the female terminal assembly 800. The spring member 440*a* is typically formed from a single piece of material (e.g., metal). To integrally form these features, the spring member 440*a* is typically formed using a die forming process. As discussed in greater detail below and in PCT/US2019/036010, when the spring member 440*a* is formed from a flat sheet of metal, installed within the male terminal 470 and connected to the female terminal assembly 800, and is subjected to elevated temperatures, the spring member 440*a* applies an outwardly directed spring thermal force, $S_{TF}$, on the contact arms 494*a*-494*h* due in part to the fact that the spring member 440*a* attempts to return to a flat sheet. However, it should be understood that other types of forming the spring member 440*a* may be utilized, such as casting or using an additive manufacturing process (e.g., 3D printing). In other embodiments, the features of the spring member 440*a* may not be formed from a one-piece or be integrally formed, but instead formed from separate pieces that are welded together.

FIGS. 3-22B provide various views of the female connector assembly 600. The female connector assembly 600 includes: (i) a female housing 620 and (ii) a female terminal assembly 800. The female housing 620 has a body 640 that includes an arrangement of side walls 642*a*-642*d* that form a substantially rectangular receptacle 653, which is configured to receive the female terminal assembly 800. At least one of the side walls 642*a*-642*d* of the female housing 620 has means for displacing the contact arms 494*a*-494*h* during insertion of the male terminal assembly 430. Referring specifically to FIGS. 3, 10-11A, 13, 14A, 16, 17A, 19, 20A and 22, the side walls 642*a*-642*d* of the female housing 620 an internal segment 651 designed to slidingly engage with an extent of the contact arms 494*a*-494*h* of the male terminal assembly 430 during insertion of the male terminal assembly 430 into the receptacle 653 of the female housing 620, as detail below. The internal segment 651 is angled or sloped relative to the outer surface of the side walls 642*a*-642*d* at an internal angle. In this exemplary embodiment, the internal angle $\alpha$ is between 0.01 degrees and 15 degrees, preferably between 1 degree and 7 degrees and most preferably 5 degrees. Also, the internal angle $\alpha$ is substantially constant. This angled internal segment 651 is designed to gently compress contact arms 494*a*-494*h* inward as these two components slidingly engage while the operator (e.g., a worker or a robot) inserts the male connector assembly 200 into the receptacle 653 of the female connector assembly 600.

It should be understood that in other embodiments, the sloped or angled configuration of the internal segment 651 may not be constant, the dimensions may be different, and the internal segment 651 may not be continuous within the housing 620; instead, it may be discontinuous and thus only be present in certain locations. It should also be understood that the internal segment 651 is typically formed from the same material that the rest of the female housing is formed from, such as polymer (e.g., nylon or plastic). Utilizing a polymer material is beneficial because there is less friction between the metal contact arms 494*a*-494*h* and the polymer material in comparison to the friction between the metal contact arms 494*a*-494*h* and the metal female terminal assembly 800. In alternative embodiments, a coating, liner or other materials may be used to line or coat the internal surface 652 to reduce the friction with the contact arms 494*a*-494*h*.

FIGS. 3-22B depict various views of the female terminal assembly 800. The female terminal assembly 800 includes: (i) a female terminal body 810 and (ii) a female terminal connection plate 816. The connection plate 816 is directly connected to the female terminal body 810 and is configured to be coupled to a structure (e.g., a radiator fan) outside of the connector system 10. The female terminal body 810 has a tubular configuration and is comprised of an arrangement of female terminal side walls 812*a*-812*d* that are coupled to one another to form a substantially rectangular shape. Specifically, one female terminal side wall 812*a* of the arrangement of female terminal side walls 812*a*-812*d* is: (i) substantially parallel with another one female terminal side wall 812*c* of the arrangement of female terminal side walls 812*a*-812*d* and (ii) substantially perpendicular to two female terminal side wall 812*b*, 812*d* of the arrangement of female terminal side walls 812*a*-812*d*. The female terminal body 810 defines a female terminal receiver 814. The female terminal receiver 814 is designed and configured to be coupled, both electrically and mechanically, to an extent of the male terminal 470, when the male terminal 470 is inserted into the female terminal receiver 814.

The female terminal assembly 800 is typically formed for a single piece of material (e.g., metal). Therefore, the female terminal assembly 800 is a one-piece female terminal assembly 800 and has integrally formed features. In particular, the connection plate 816 is integrally formed with female terminal body 810 and specifically is integrally formed with the one female terminal side wall 812*c*. To integrally form these features, the female terminal assembly 800 is typically formed using a die cutting process. However, it should be understood that other types of forming the female terminal assembly 800 may be utilized, such as casting or using an additive manufacturing process (e.g., 3D printing). In other embodiments, the features of the female terminal assembly 800 may not be formed from one-piece or be integrally formed, but instead formed from separate pieces that are welded together.

The CPA assembly 350 is comprised of multiple parts that are coupled to or integrally formed with portions of the male and female connector assemblies 200, 600. The CPA assembly 350 includes: (i) an indicia 354, (ii) a CPA sidewall arrangement 356 that forms a CPA receptacle 358, (iii) an elastically deformable male or exterior engaging member 360, (iv) a female or interior coupling member 362, and (v) a locking member 364. The indicia 354 is configured to be placed into two different configurations depending on the configuration of the connector system 10 and the CPA assembly 350, wherein one configuration the indicia 354 is unreadable by the recording system 3 and the other configuration the indicia 354 is readable by the recording system 3. The indicia 354 may contain a serial number, part number, application information (e.g., vehicle identification number), component information (e.g., power distribution assembly) or device information (e.g., alternator). The indicia 354 may be a barcode (e.g., single or multi-dimensional barcode), quick response (QR) code, SnapTags, Microsoft Tags, Blipper, MaciCode, Data Matrix, Bokode, Aztec Code, CueCat, PDF417, Semacode, ShotCode, Touchatag, SPARQCode, SQR codes, RFID, NFC, Bluetooth, collection of shapes that can be read by the recording system 3, radio based device that can be read by the recording system 3, a collection of projections that can be read by the recording system 3, a collection of different color shapes, or a combination of the above. In other words, the indicia 350 may be any pattern, any color, have any texture, have a 2 dimensional configuration, or 3 dimensional configuration.

Figure 3:
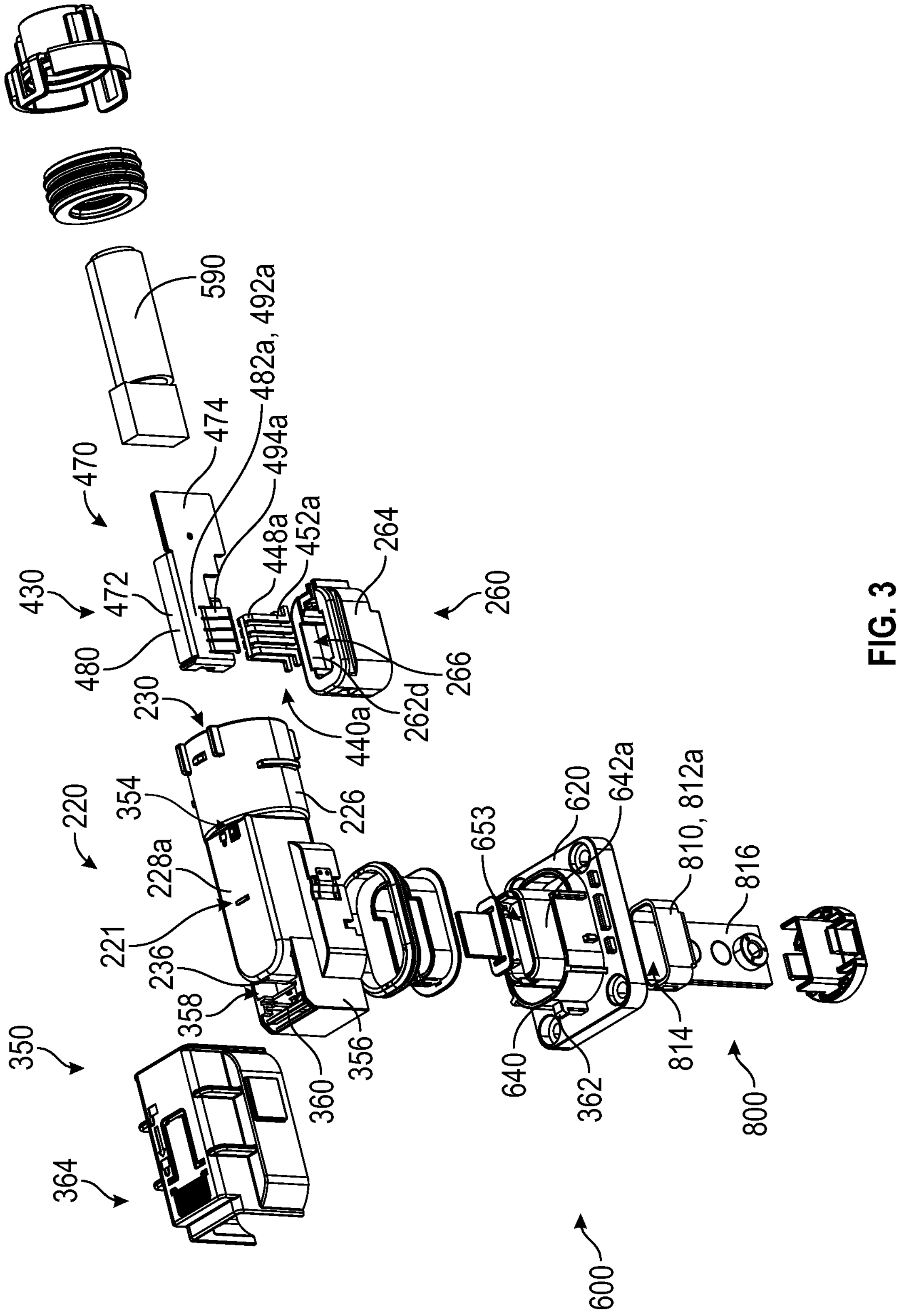
FIG. 3 is a exploded view of a first embodiment of a connector system having a connector position assurance (CPA) assembly that includes a readable and recordable indicia.
Figure 5:
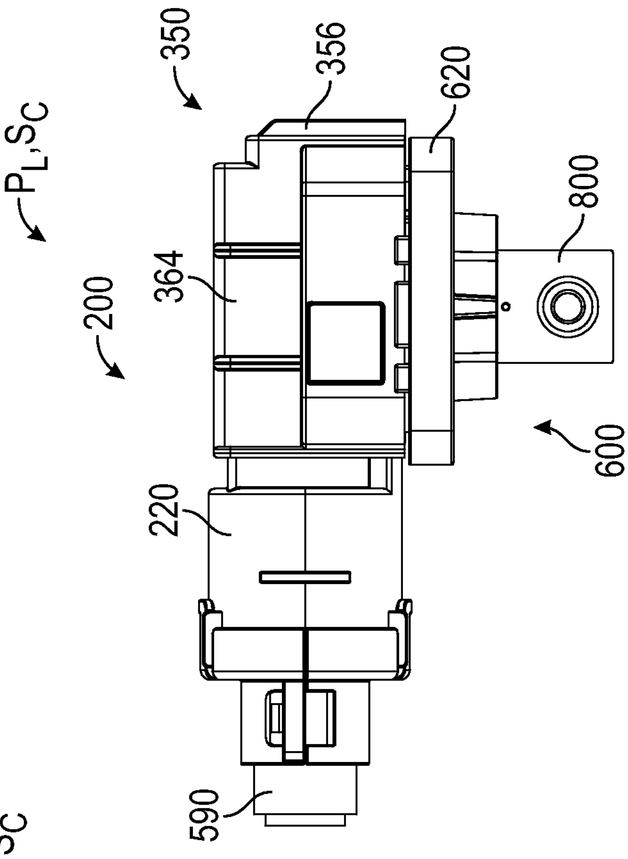
FIG. 5 is a second side view of the connector system of FIG. 3.
Figure 4:
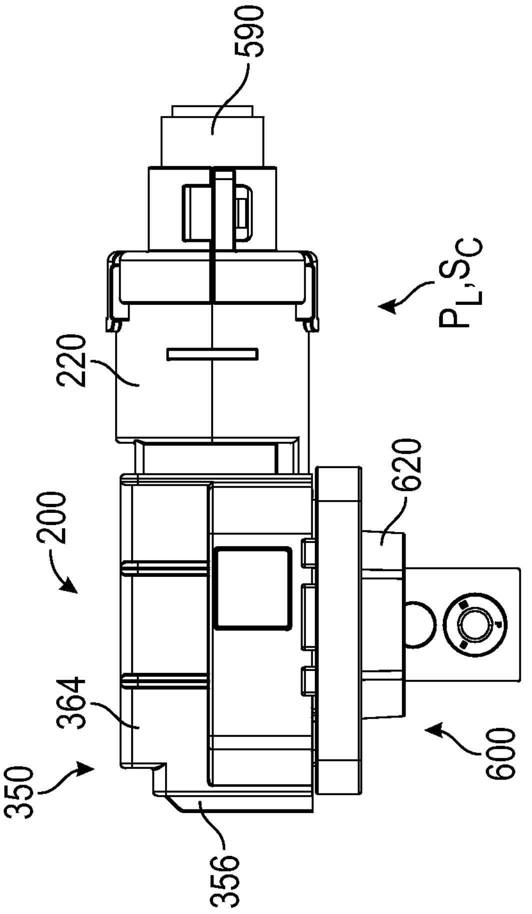
FIG. 4 is a first side view of the connector system of FIG. 3.
Figure 8:
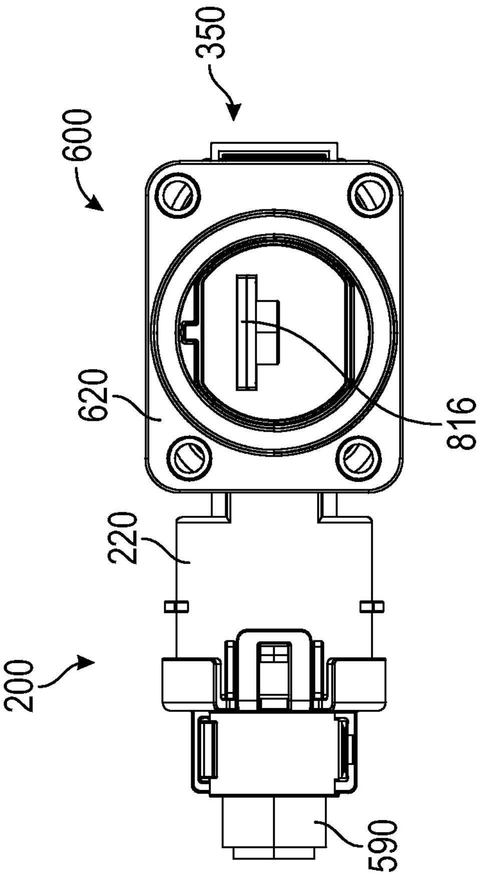
FIG. 8 is a bottom view of the connector system of FIG. 3.
Figure 6:
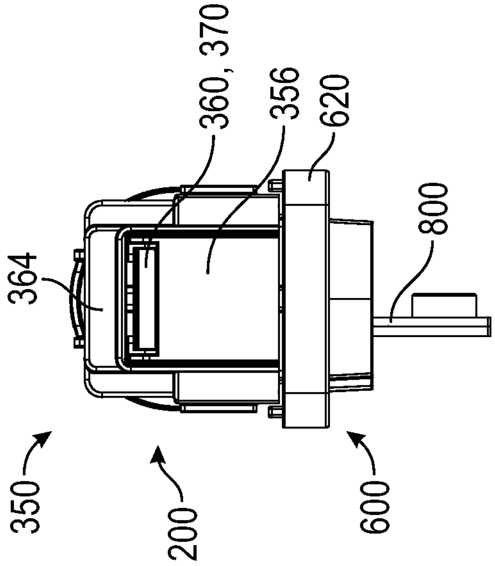
FIG. 6 is a front view of the connector system of FIG. 3.
Figure 7:
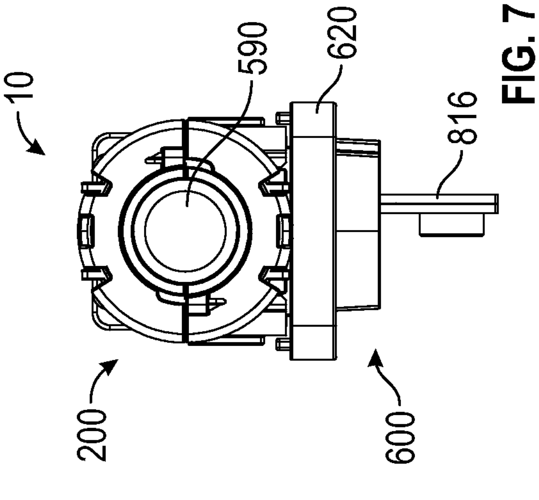
FIG. 7 is a rear view of the connector system of FIG. 3.
Figure 10:
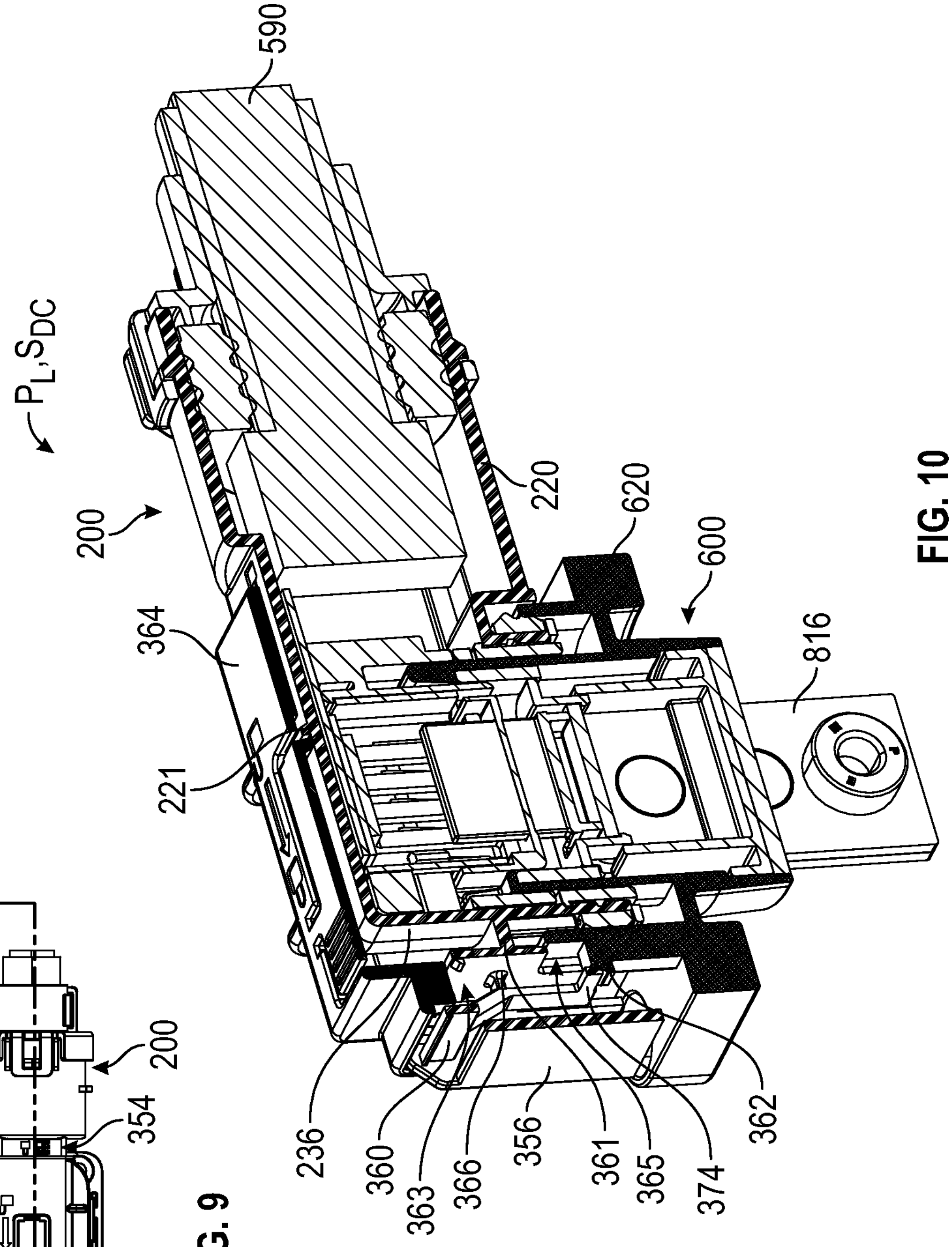
FIG. 10 is a perspective cross-sectional view of the connector system taken along line 10-10 of FIG. 9.
Figure 9:
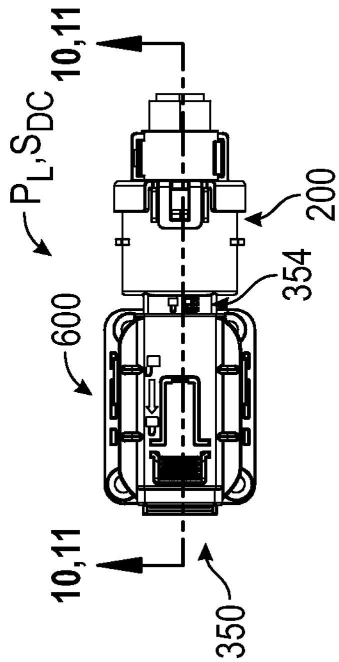
FIG. 9 is a top view of the connector system of FIG. 3 in a disconnected state $S_{DC}$, wherein the CPA assembly is in a locked position $P_L$.
Figure 11A:
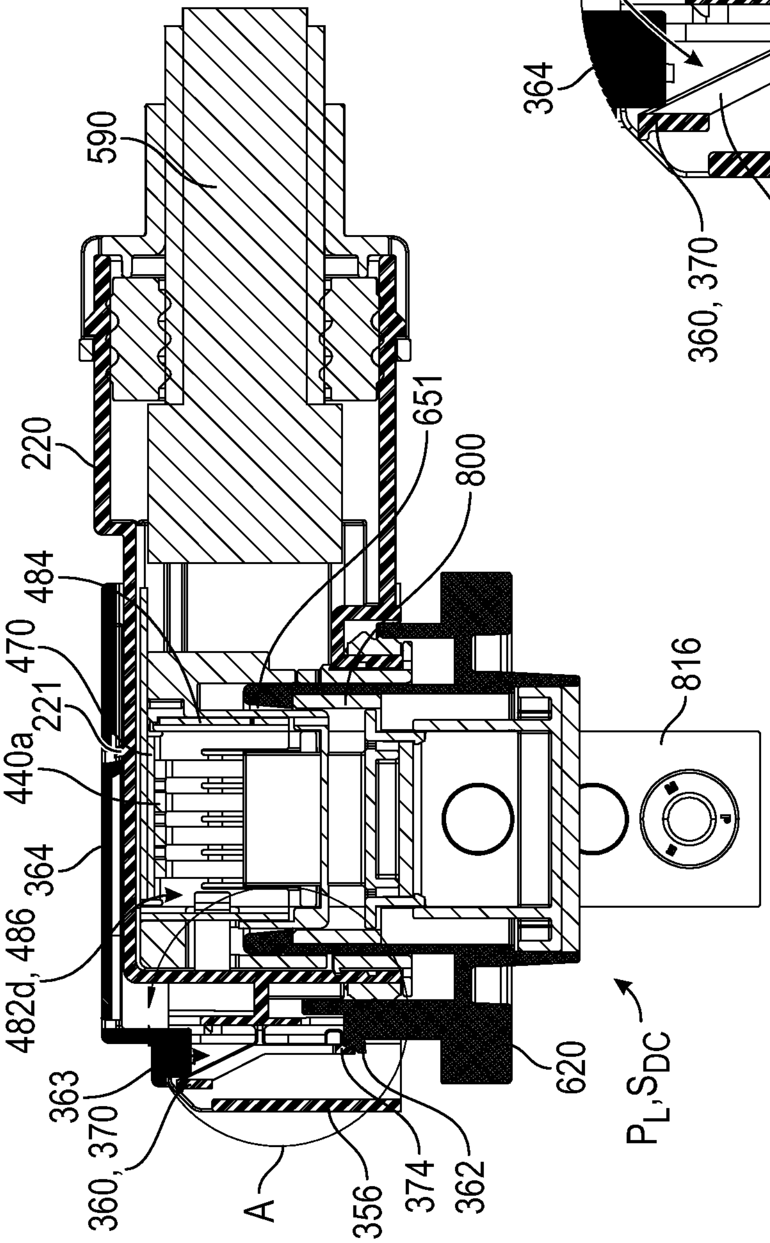
FIG. 11A is a cross-sectional view of the connector system taken along line 11-11 of FIG. 9.
Figure 11B:
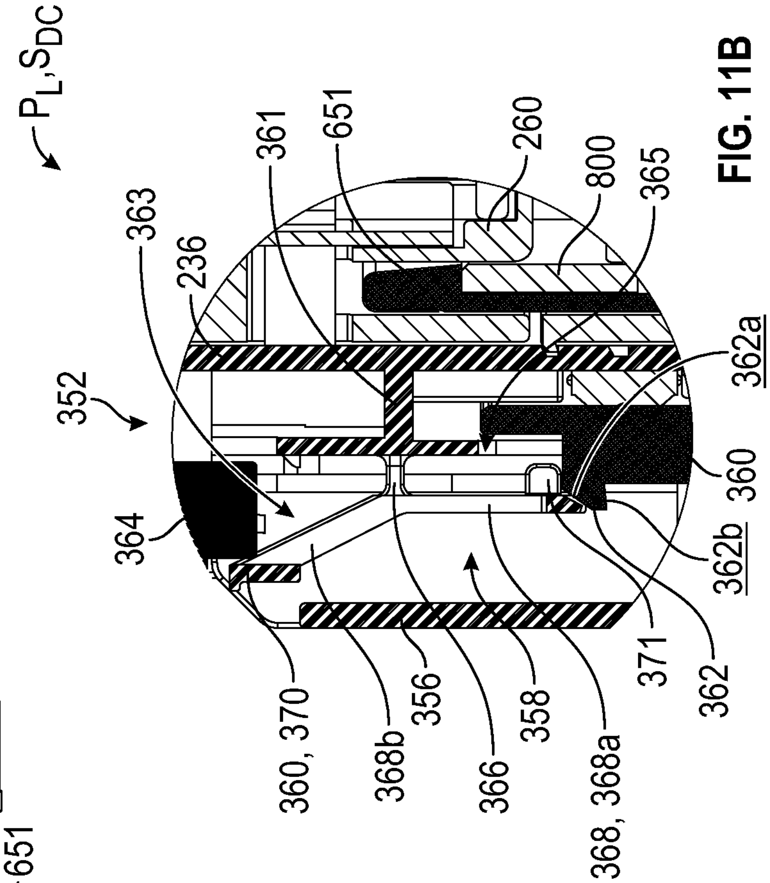
FIG. 11B is a zoomed in view of area A of the connector system in FIG. 11A.
Figure 13:
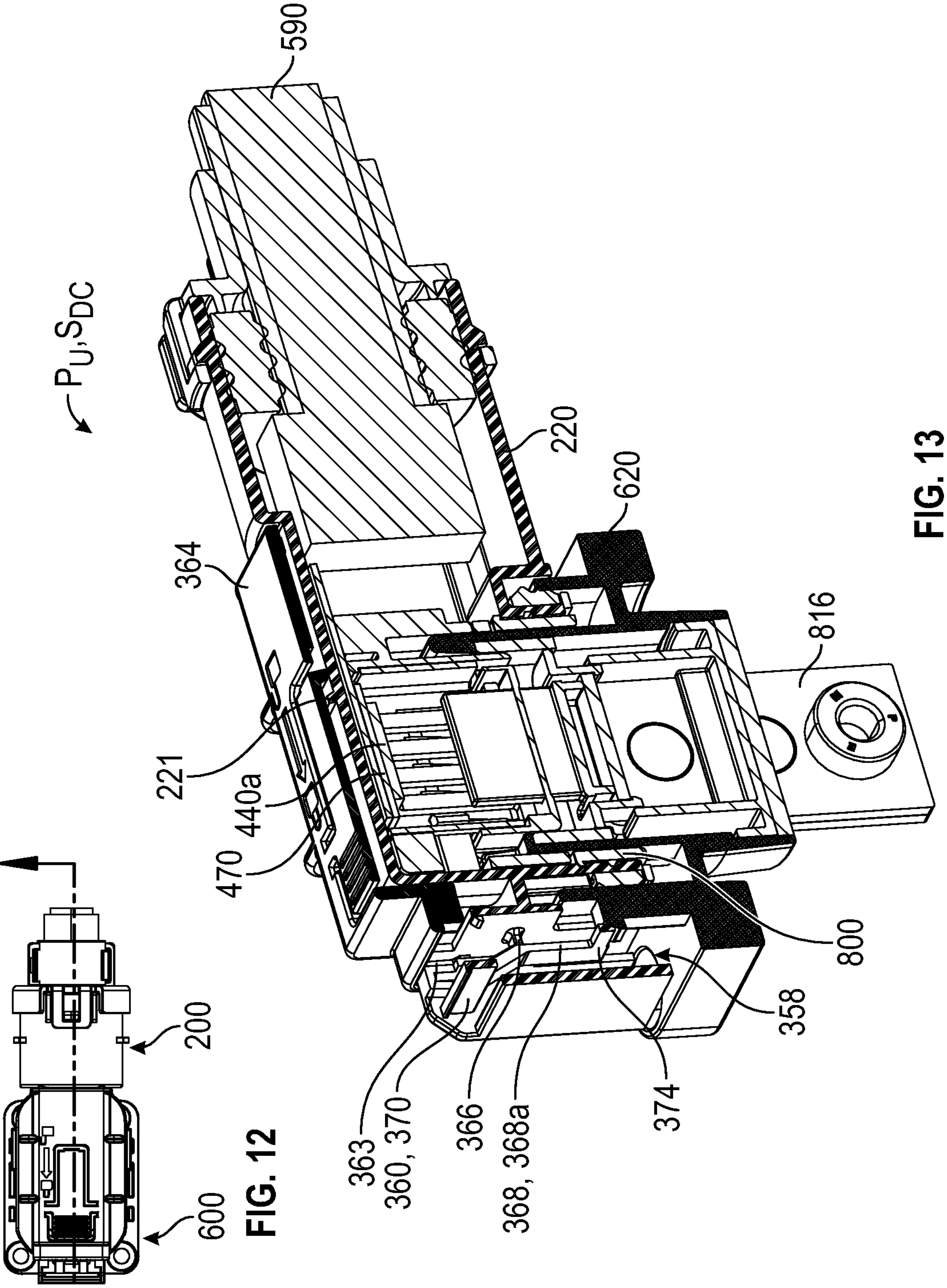
FIG. 13 is a perspective cross-sectional view of the connector system taken along line 13-13 of FIG. 12.
Figure 12:
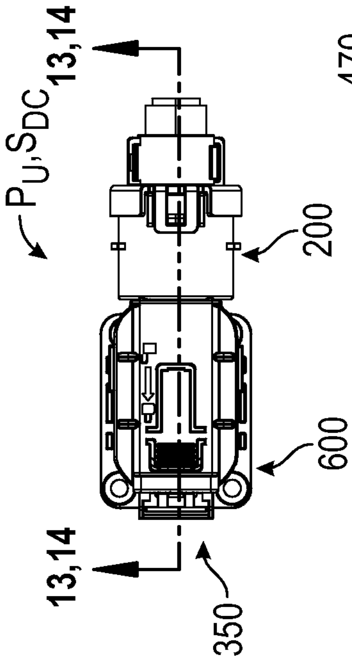
FIG. 12 is a top view of the connector system of FIG. 3 in a disconnected state $S_{DC}$, wherein the CPA assembly is in an unlocked position $P_U$.
Figure 14A:
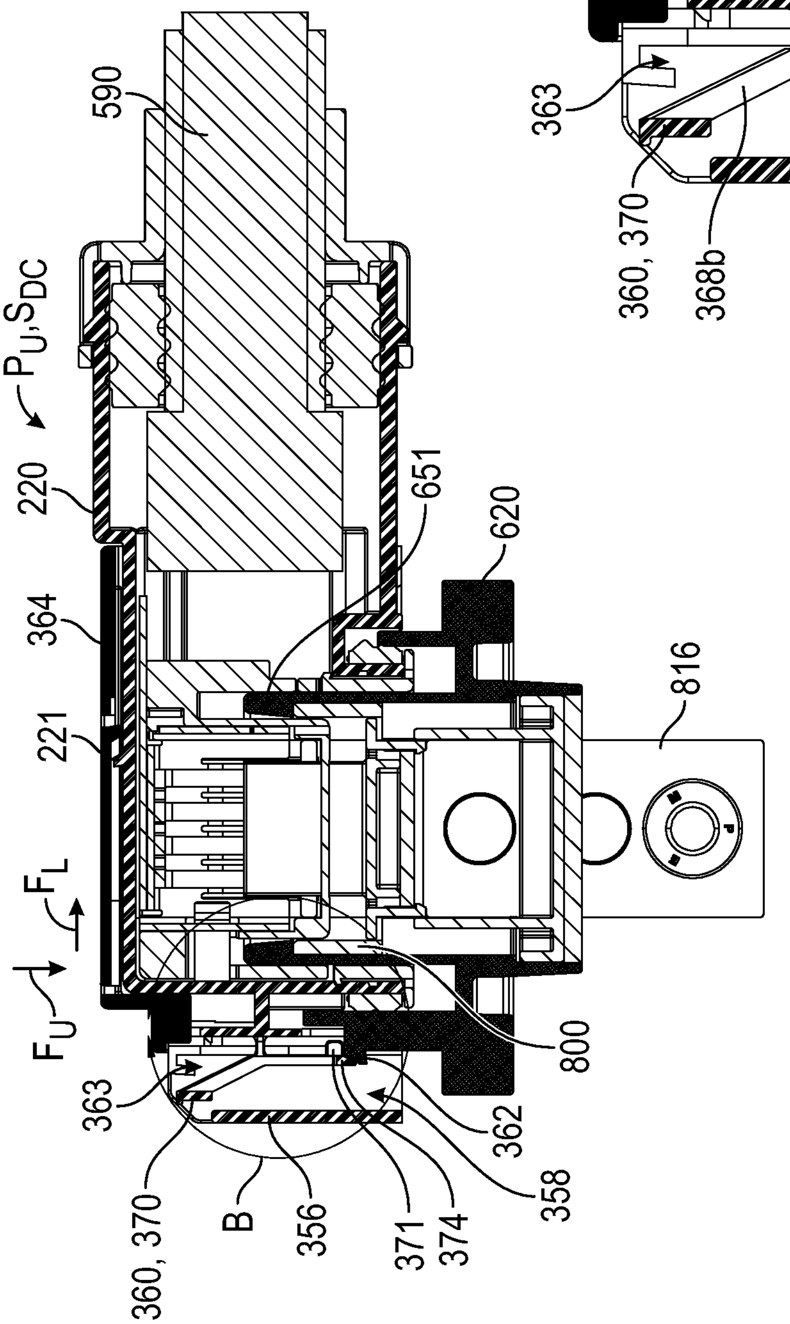
FIG. 14A is a cross-sectional view of the connector system taken along line 14-14 of FIG. 12.
Figure 14B:
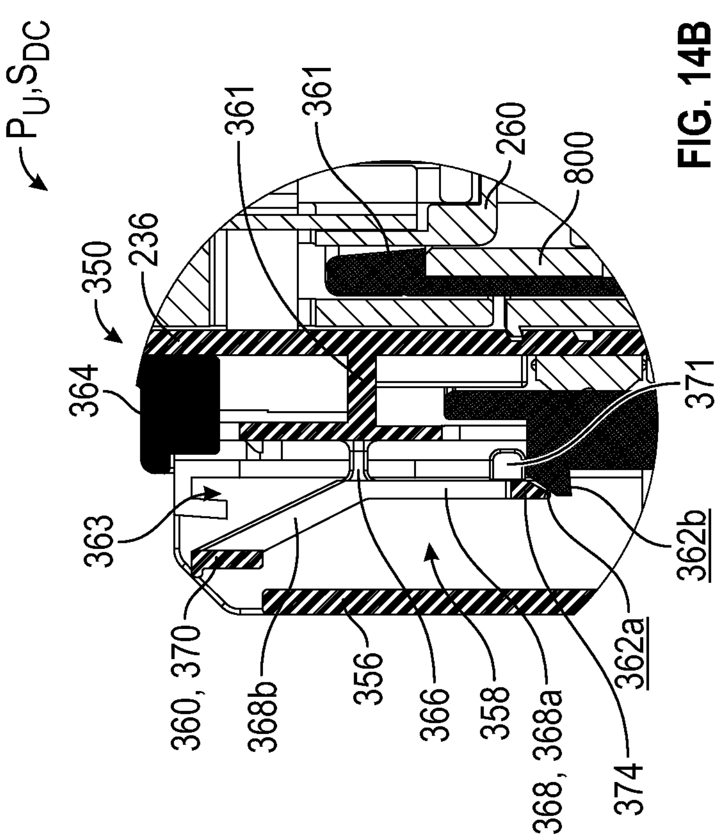
FIG. 14B is a zoomed in view of area B of the connector system in FIG. 14A.
Figure 15:
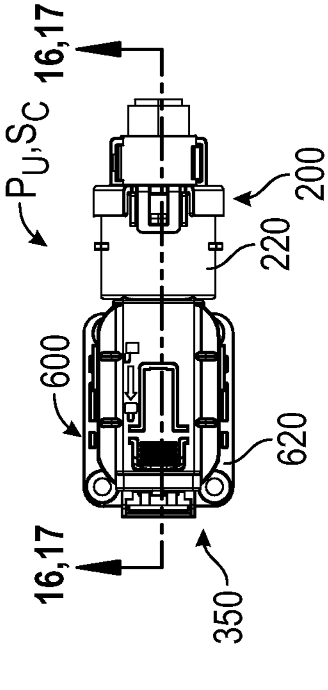
FIG. 15 is a top view of the connector system of FIG. 3 in a connected state $S_C$, wherein the CPA assembly is in an unlocked position $P_U$.
Figure 16:
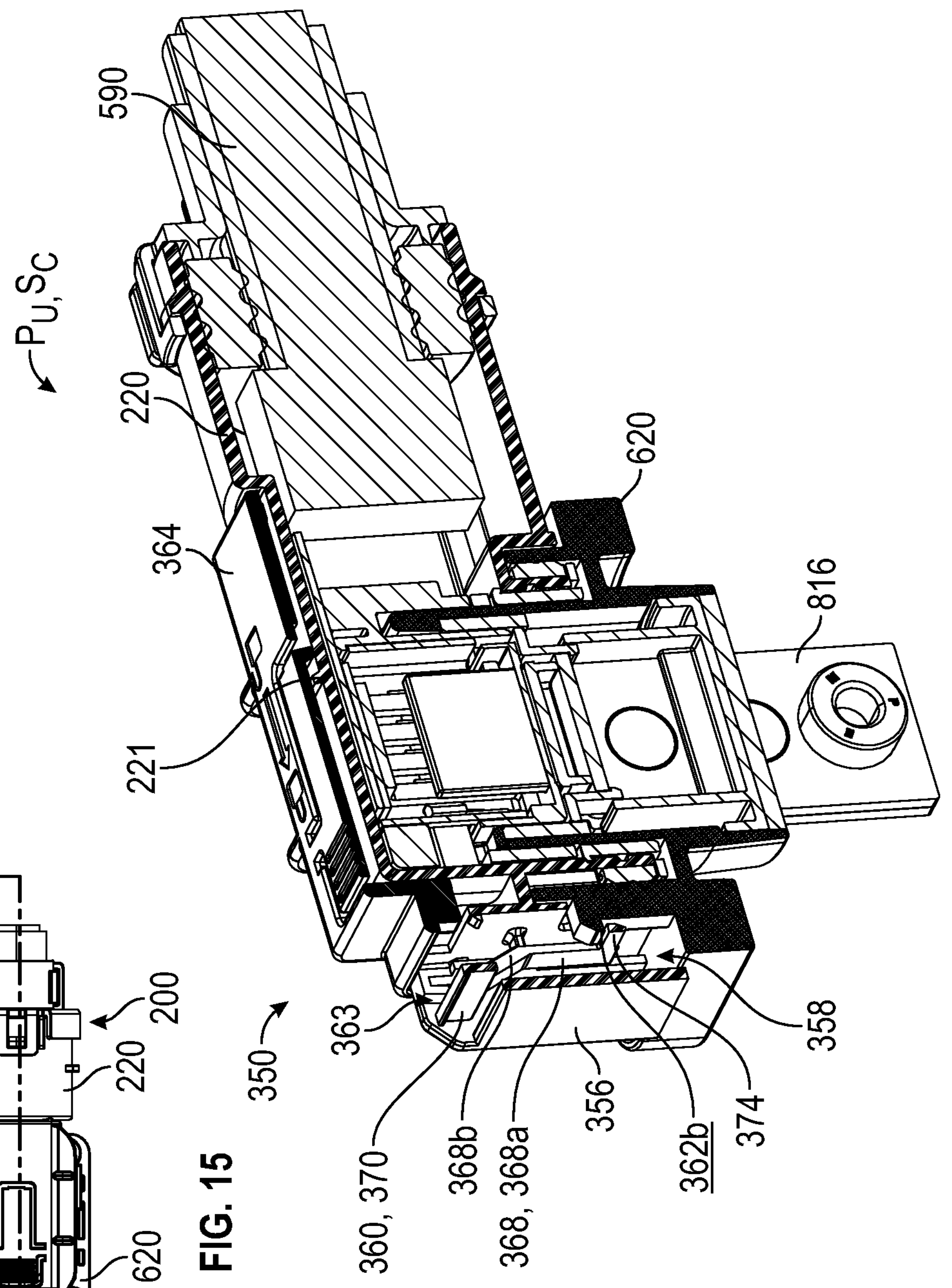
FIG. 16 is a perspective cross-sectional view of the connector system taken along line 16-16 of FIG. 15.
Figure 17A:
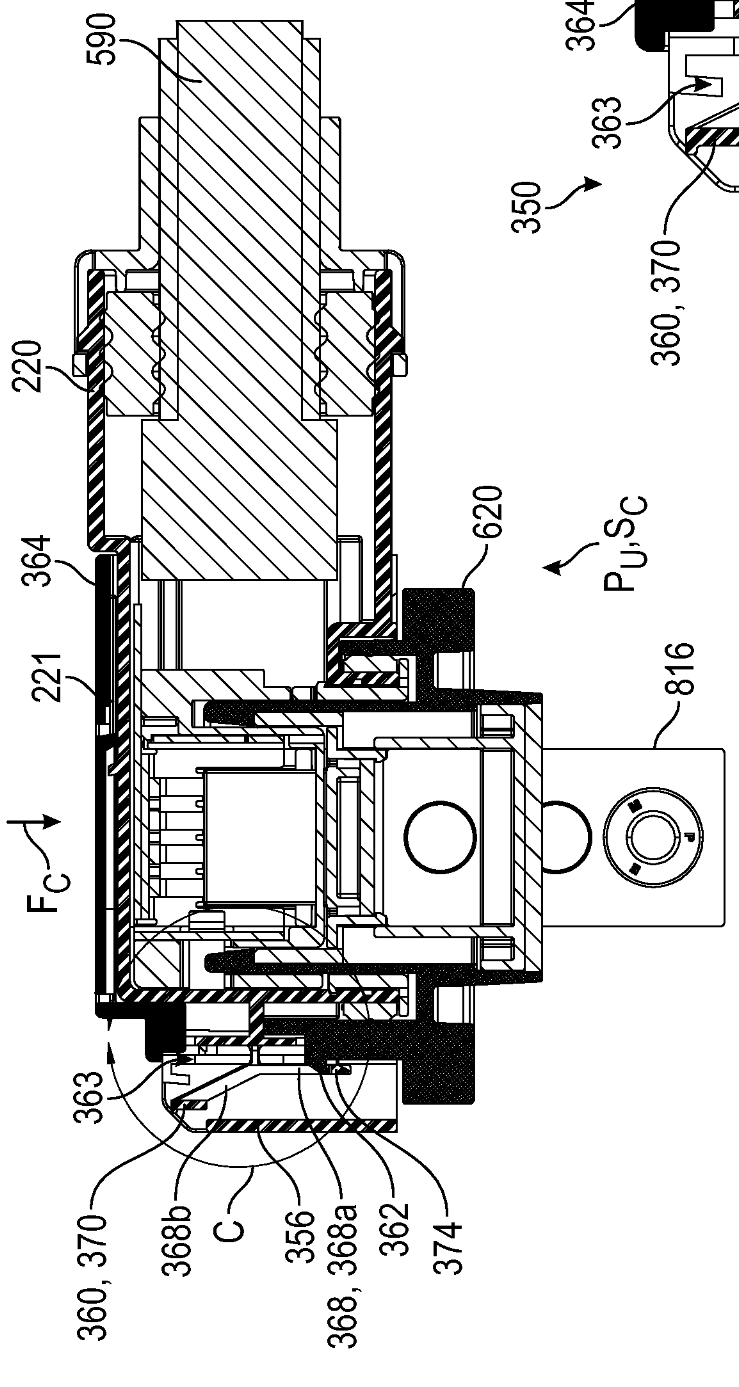
FIG. 17A is a cross-sectional view of the connector system taken along line 17-17 of FIG. 15.
Figure 17B:
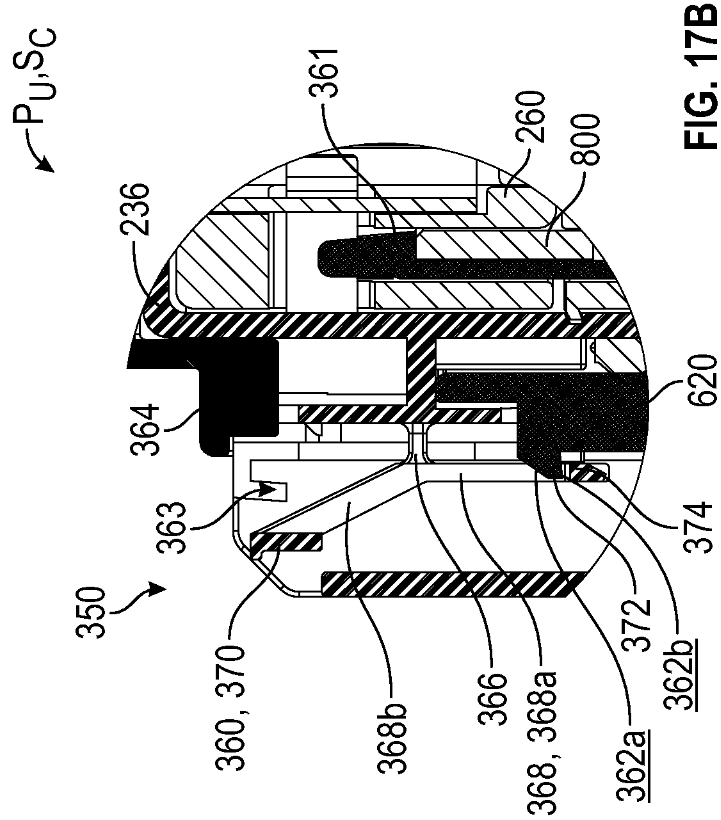
FIG. 17B is a zoomed in view of area C of the connector system in FIG. 17A.
Figure 18:
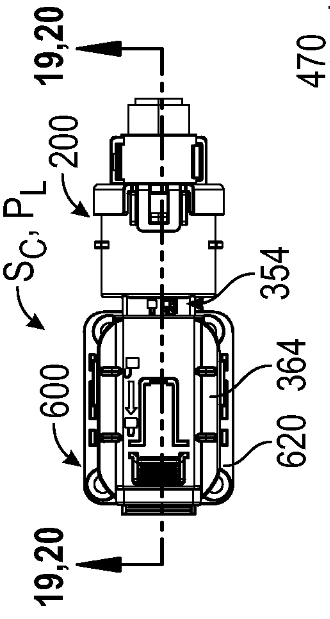
FIG. 18 is a top view of the connector system of FIG. 3 in a connected state $S_C$, wherein the CPA assembly is in a locked position $P_L$.
Figure 19:
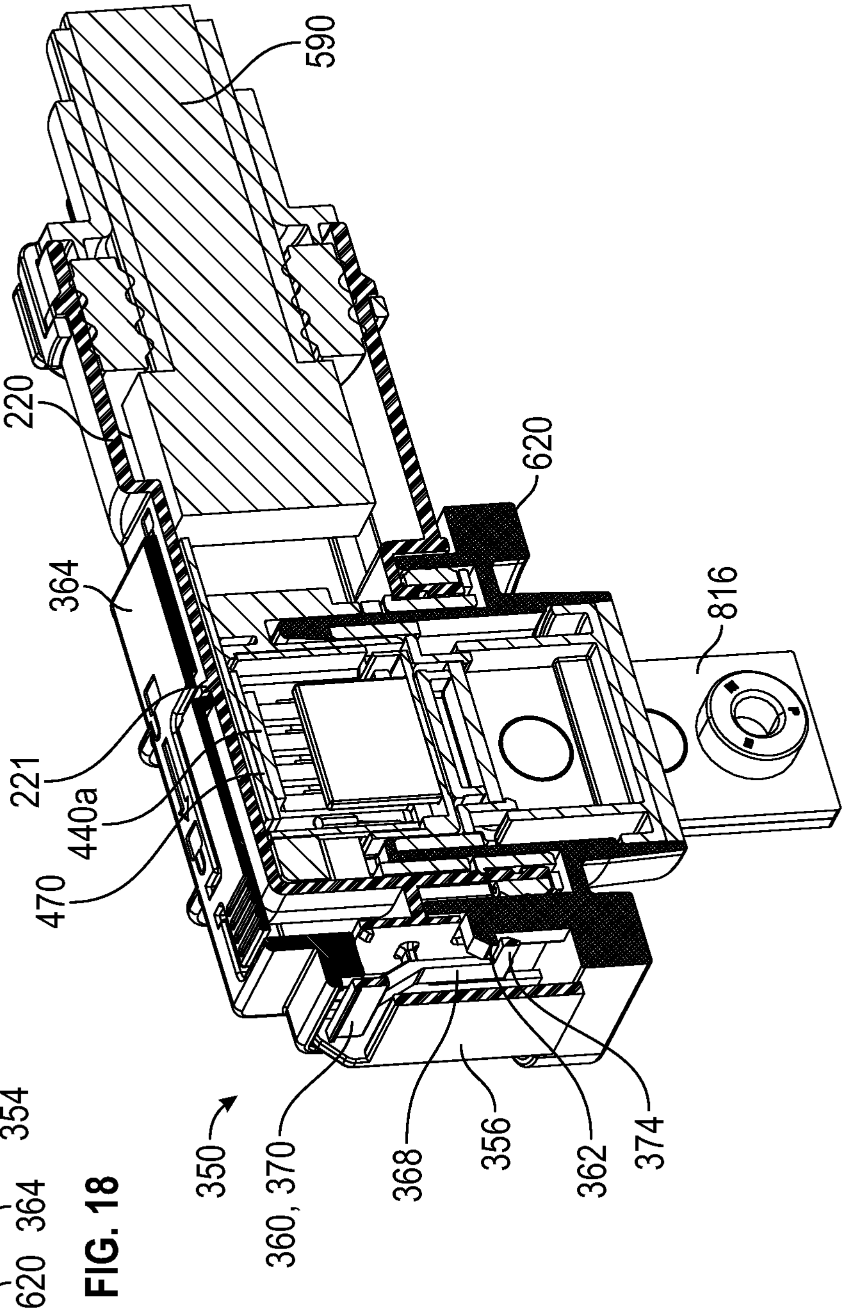
FIG. 19 is a perspective cross-sectional view of the connector system taken along line 19-19 of FIG. 18.
Figure 20A:
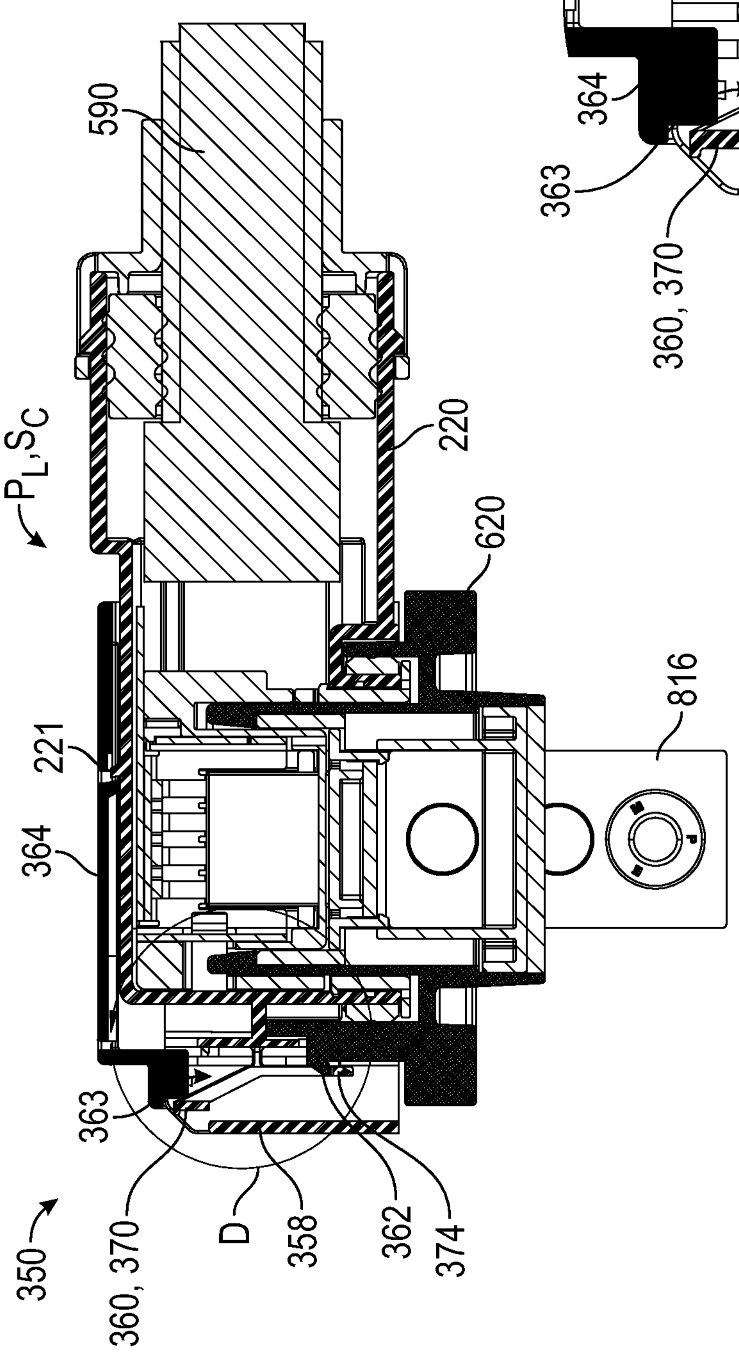
FIG. 20A is a cross-sectional view of the connector system taken along line 20-20 of FIG. 18.
Figure 20B:
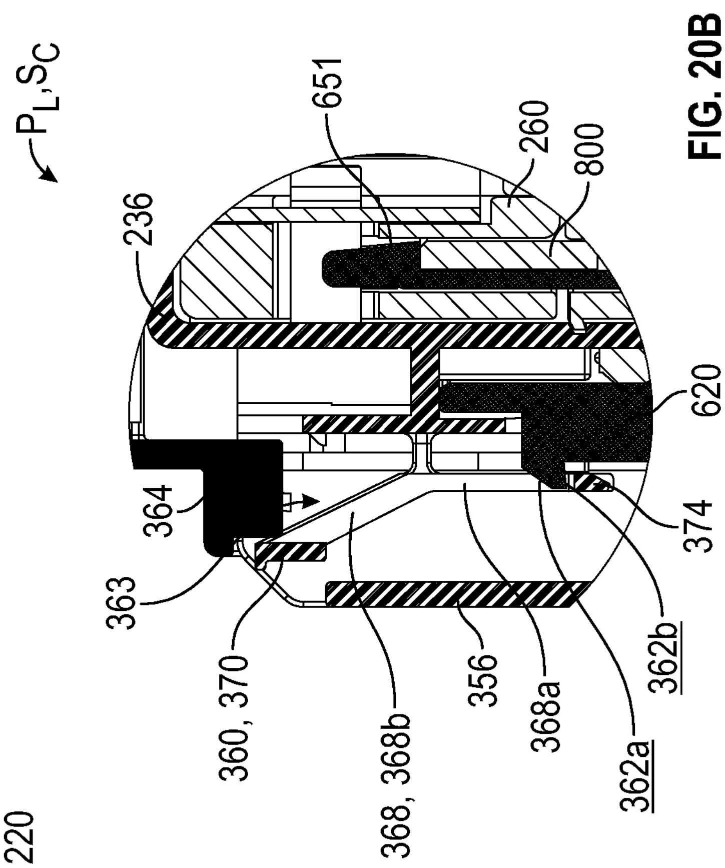
FIG. 20B is a zoomed in view of area D of the connector system in FIG. 20A.
Figure 24A:
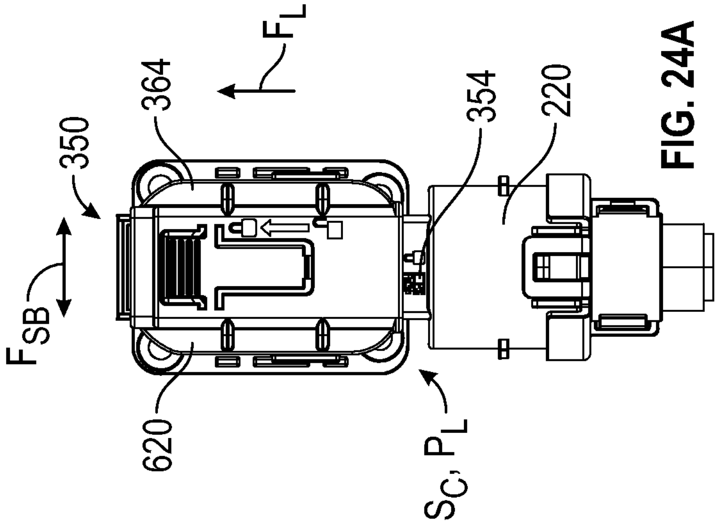
FIG. 24A is a top view of the connector system of FIG. 3 in a connected state $S_C$, wherein the CPA assembly is in a locked position $P_L$.
Figure 24B:
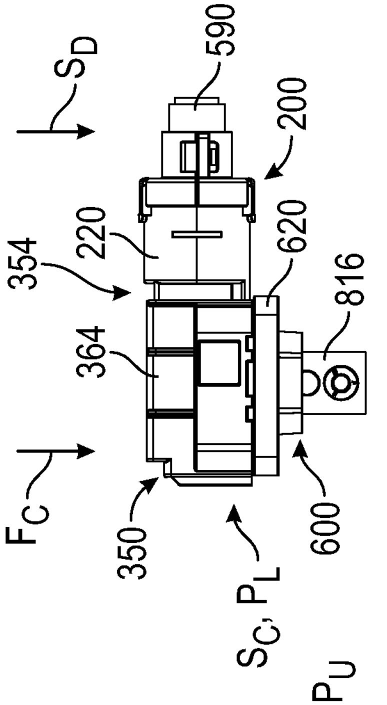
FIG. 24B is a side view of the connector system of FIG. 24A.
Figure 23A:
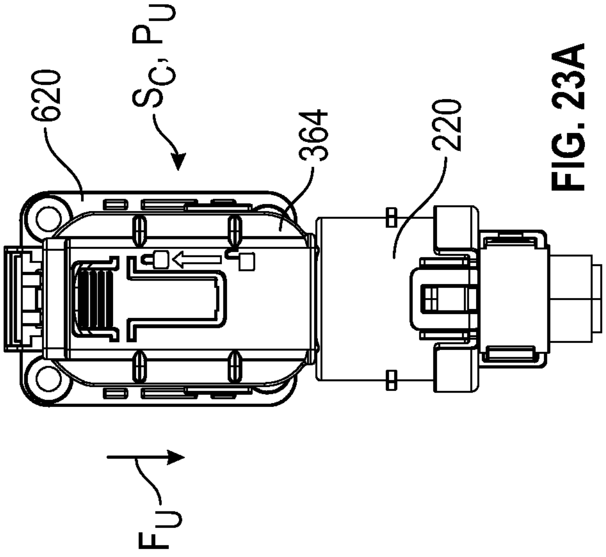
FIG. 23A is a top view of the connector system of FIG. 3 in a connected state $S_C$, wherein the CPA assembly is in an unlocked position $P_U$.
Figure 23B:
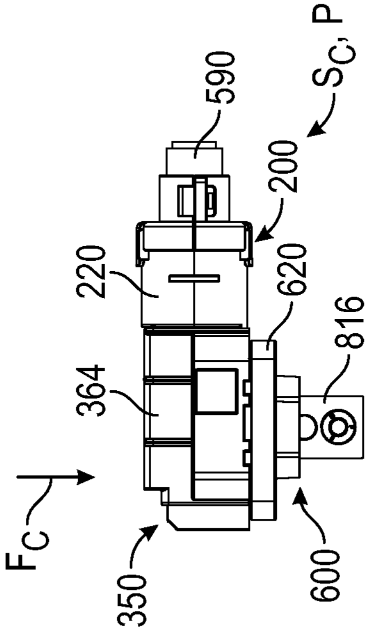
FIG. 23B is a side view of the connector system of FIG. 23A.
Figure 25A:
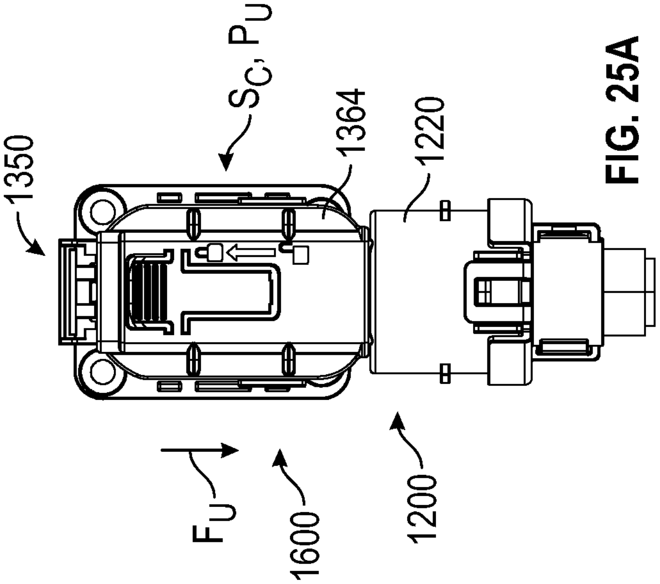
FIG. 25A is a top view of a second embodiment of a connector system having a CPA assembly that includes a readable and recordable indicia, wherein the connector system is in a connected state $S_C$, wherein the CPA assembly is in an unlocked position $P_U$.
Figure 25B:
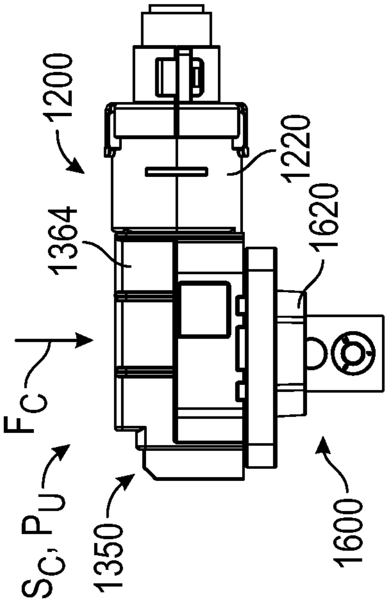
FIG. 25B is a side view of the connector system of FIG. 25A.
Figure 26A:
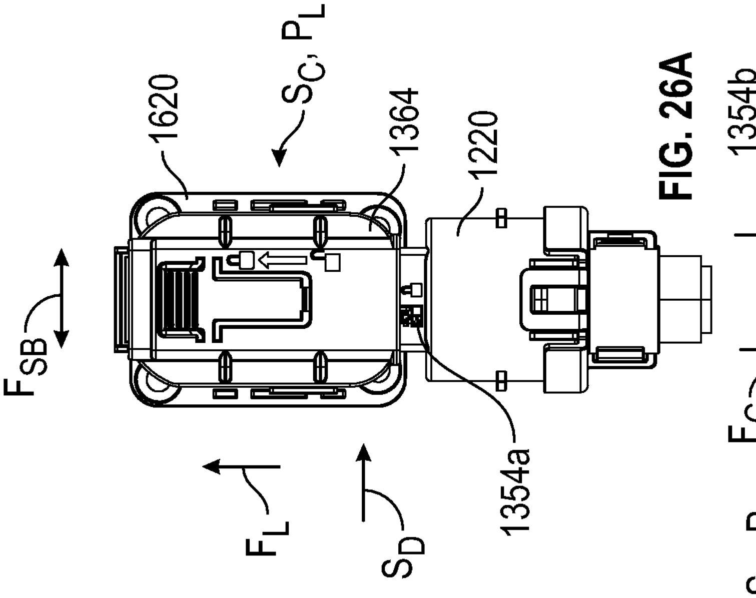
FIG. 26A is a top view of the connector system of FIG. 25A in a connected state $S_C$, wherein the CPA assembly is in a locked position $P_L$.
Figure 26B:
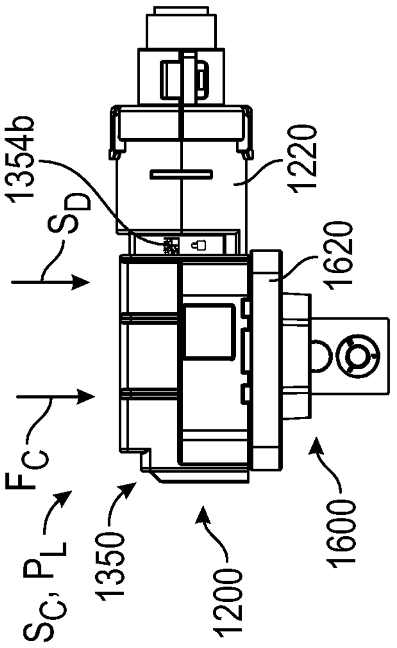
FIG. 26B is a side view of the connector system of FIG. 26A.
Figure 28A:
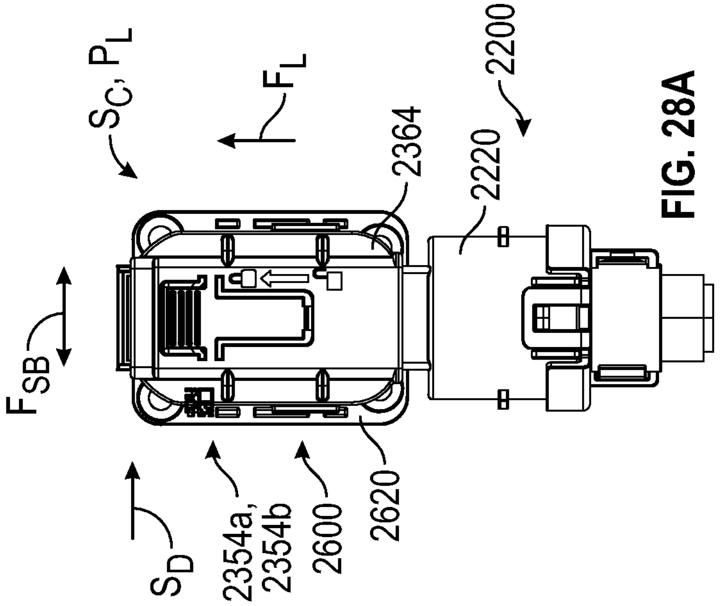
FIG. 28A is a top view of the connector system of FIG. 27A in a connected state $S_C$, wherein the CPA assembly is in a locked position $P_L$.
Figure 28B:
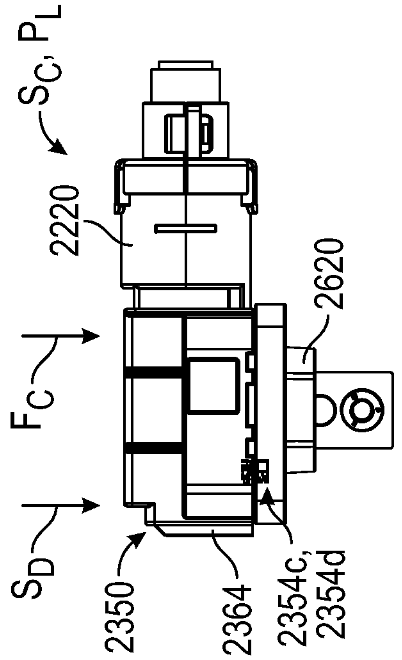
FIG. 28B is a side view of the connector system of FIG. 28A.
Figure 27A:
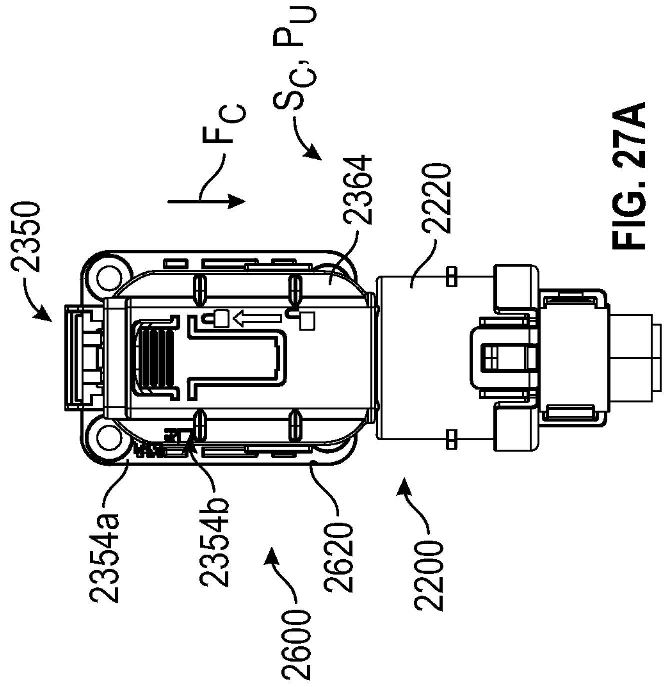
FIG. 27A is a top view of a third embodiment of a connector system having a CPA assembly that includes a recordable indicia, wherein the connector system is in a connected state $S_C$, wherein the CPA assembly is in an unlocked position $P_U$.
Figure 27B:
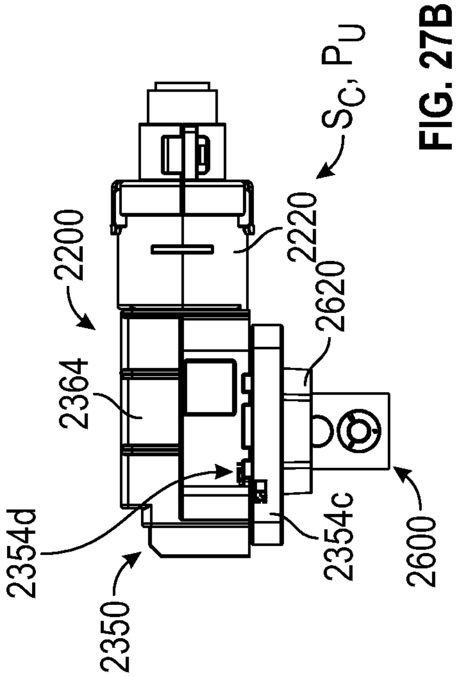
FIG. 27B is a side view of the connector system of FIG. 27A.
Figure 29:
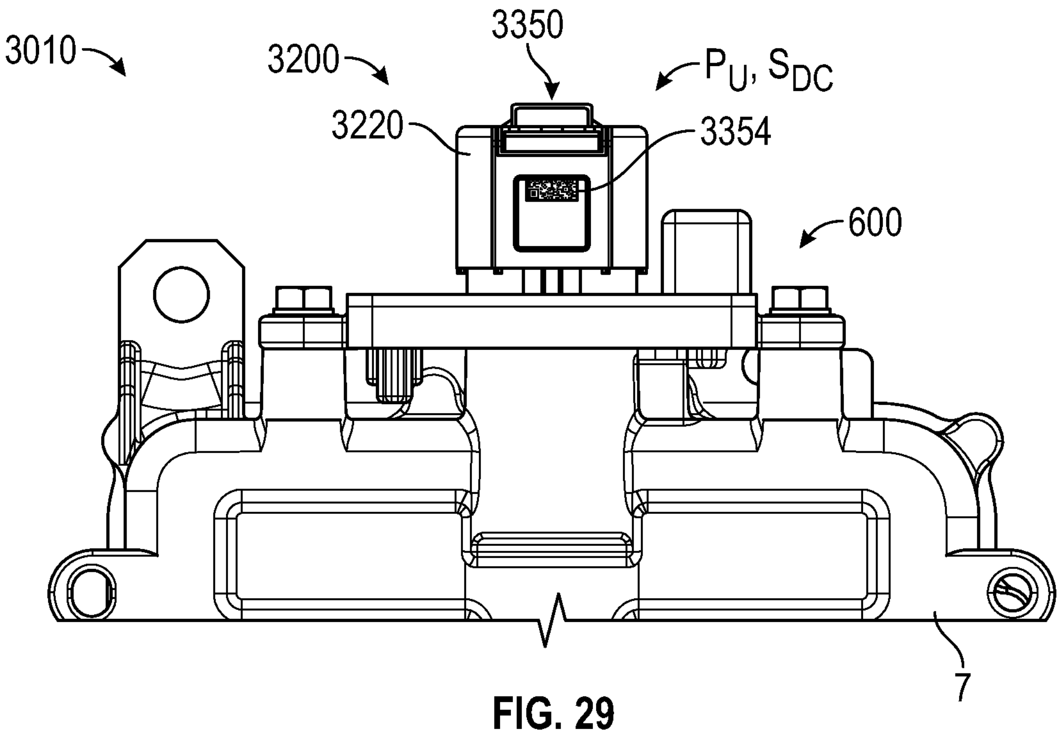
FIG. 29 is a front view of a fourth embodiment of a connector system having a CPA assembly that includes a readable and recordable indicia, wherein the connector system is in a disconnected state $S_{DC}$, wherein the CPA assembly is in an unlocked position $P_U$.
Figure 30:
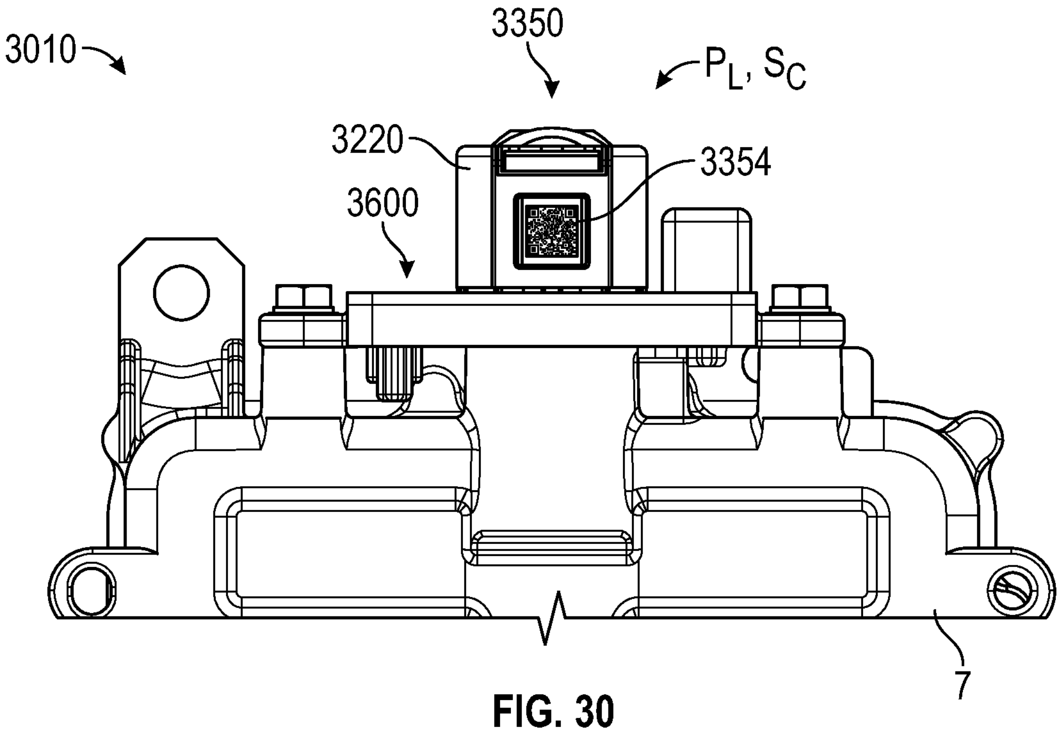
FIG. 30 is a front of the connector system of FIG. 29 in a connected state $S_C$, wherein the CPA assembly is in a locked position $P_L$.
Figure 31A:
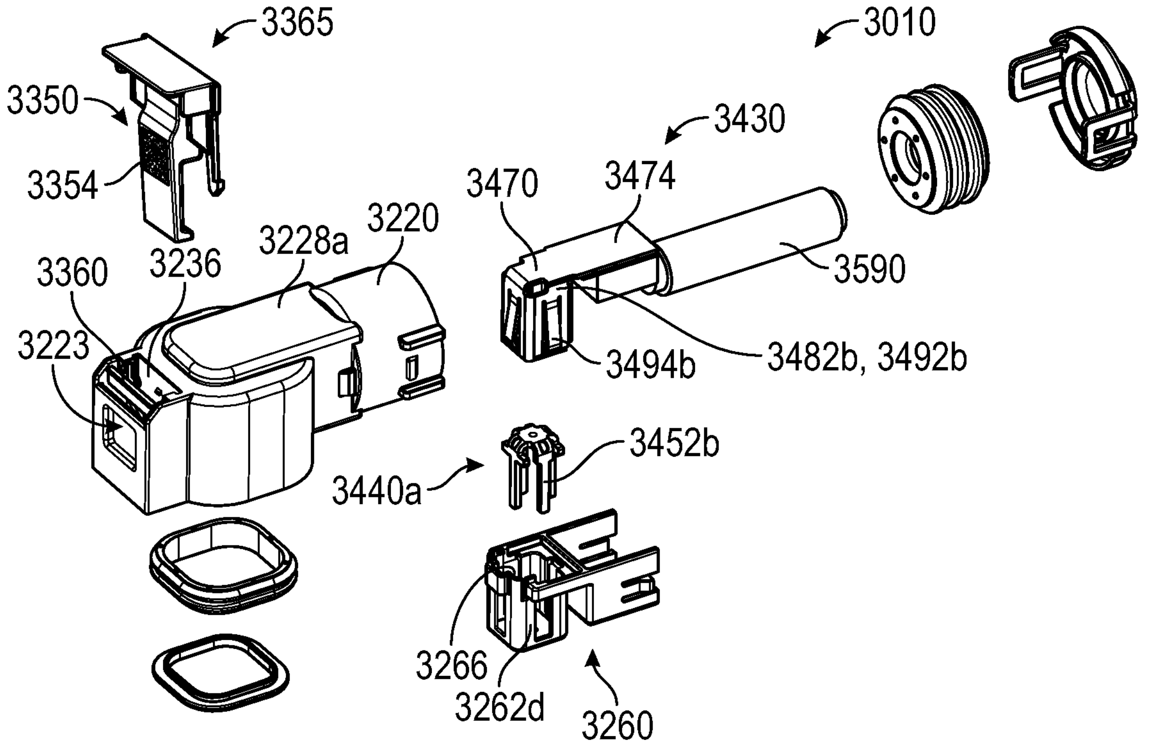
FIG. 31A is a exploded view of the connector system of FIG. 29.
Figure 31B:
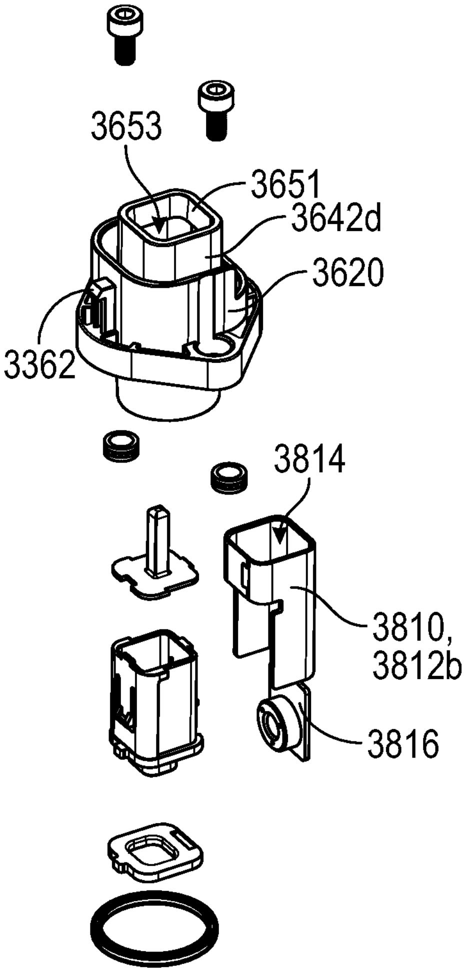
FIG. 31B is an enlarged view of the male engaging member of the CPA assembly of the connector system of FIG. 29.
Figure 31B:
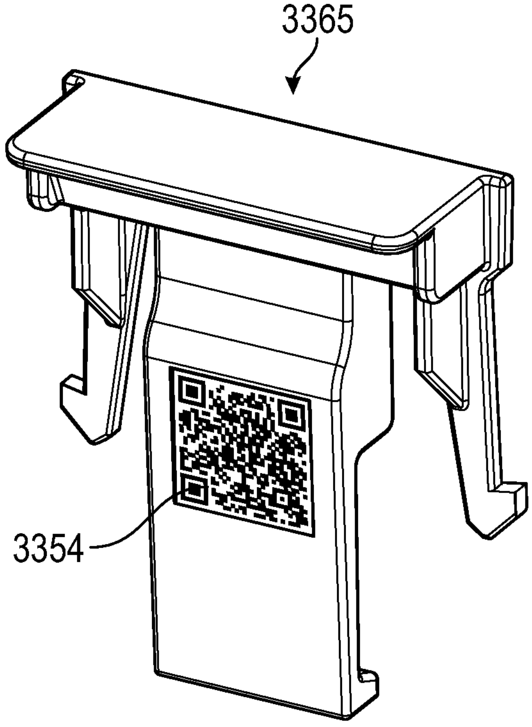
Figure 33:
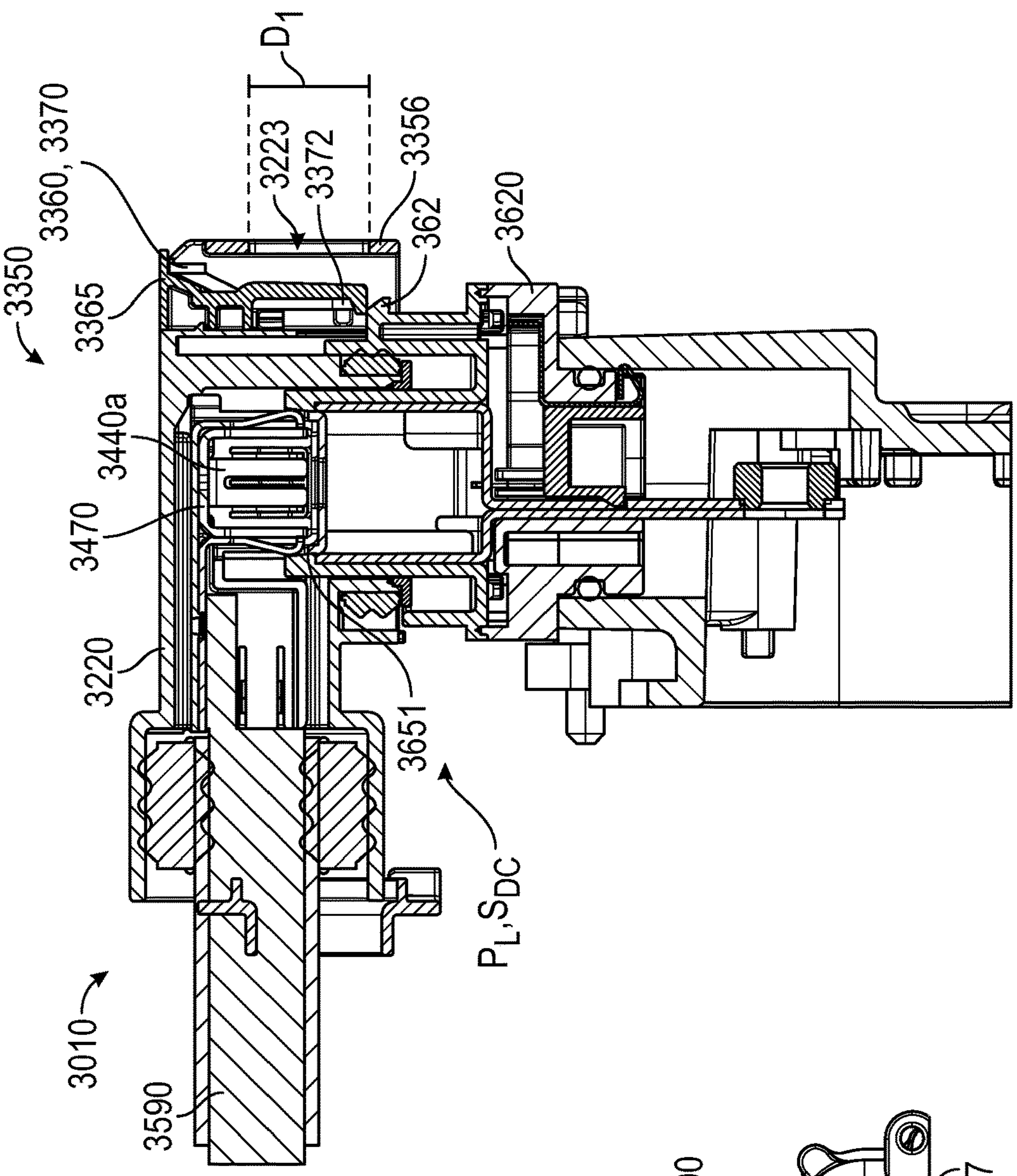
FIG. 33 is a cross-sectional view of the connector system taken along line 33-33 of FIG. 32.
Figure 32:
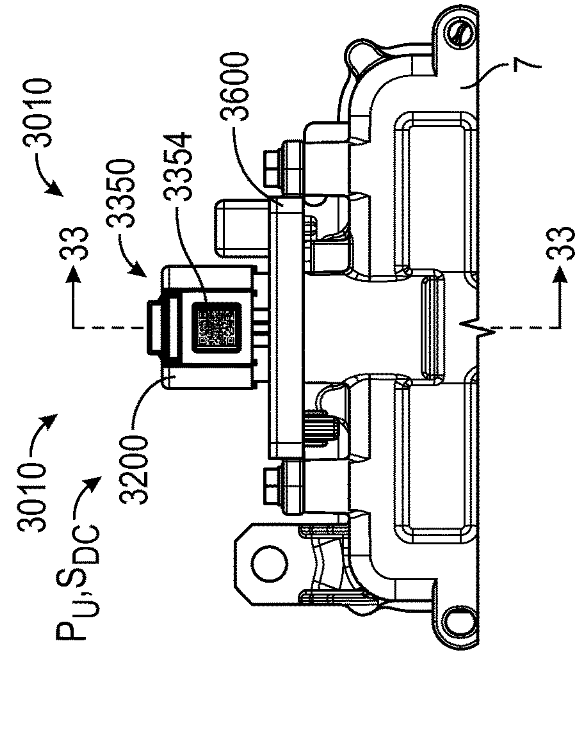
FIG. 32 is a front view of the connector system of FIG. 29 in a disconnected state $S_{DC}$, wherein the CPA assembly is in a locked position $P_L$.
Figure 34A:
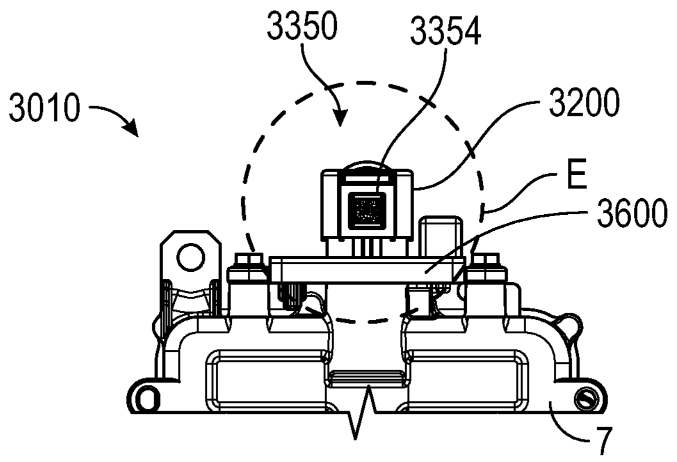
FIG. 34A is a front view of the connector system of FIG. 29 in a disconnected state $S_{DC}$, wherein the CPA assembly is in a locked position $P_L$.
Figure 34B:
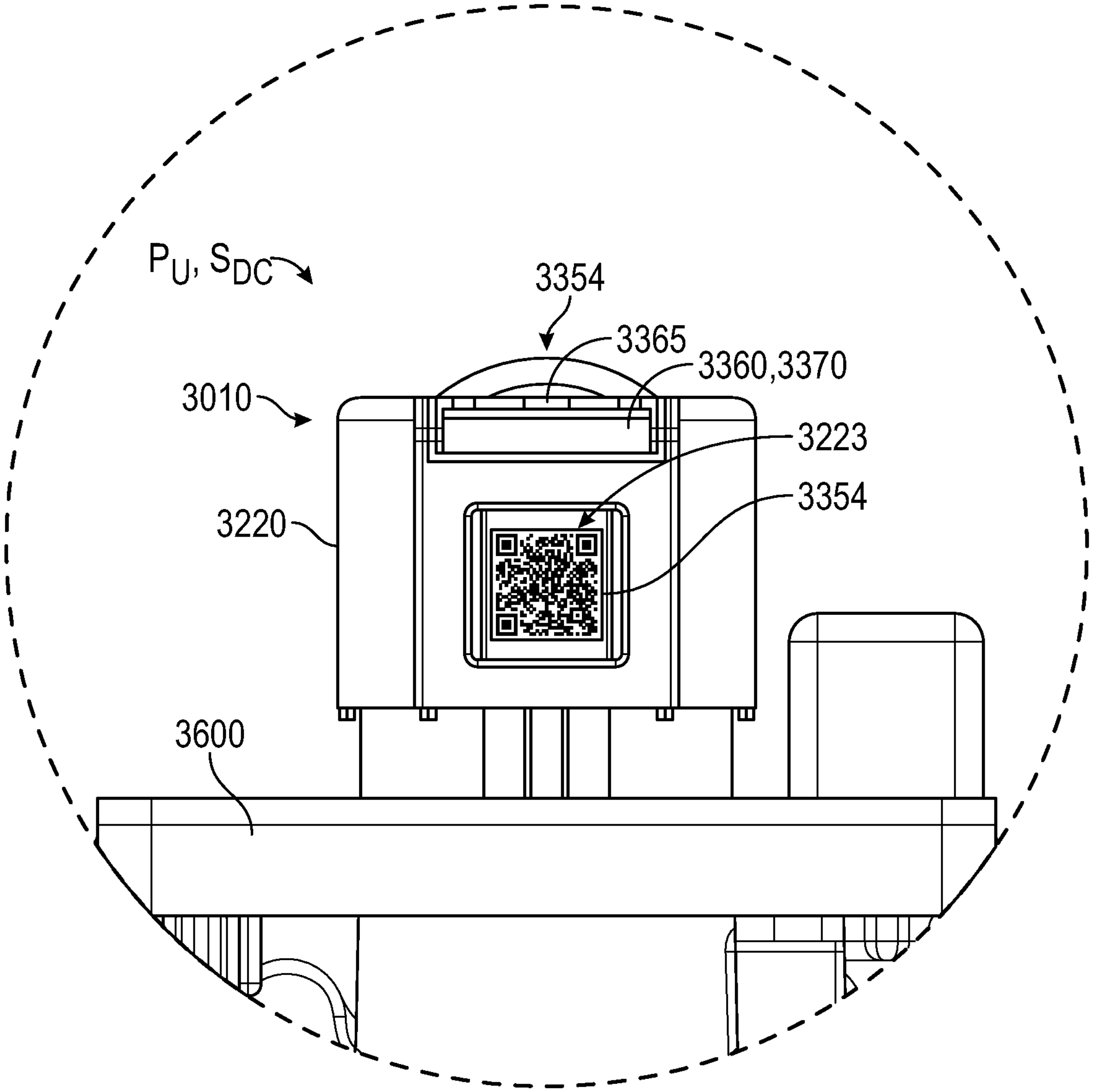
FIG. 34B is a zoomed in view of area E, focusing on the CPA assembly of FIG. 34A.
Figure 36:
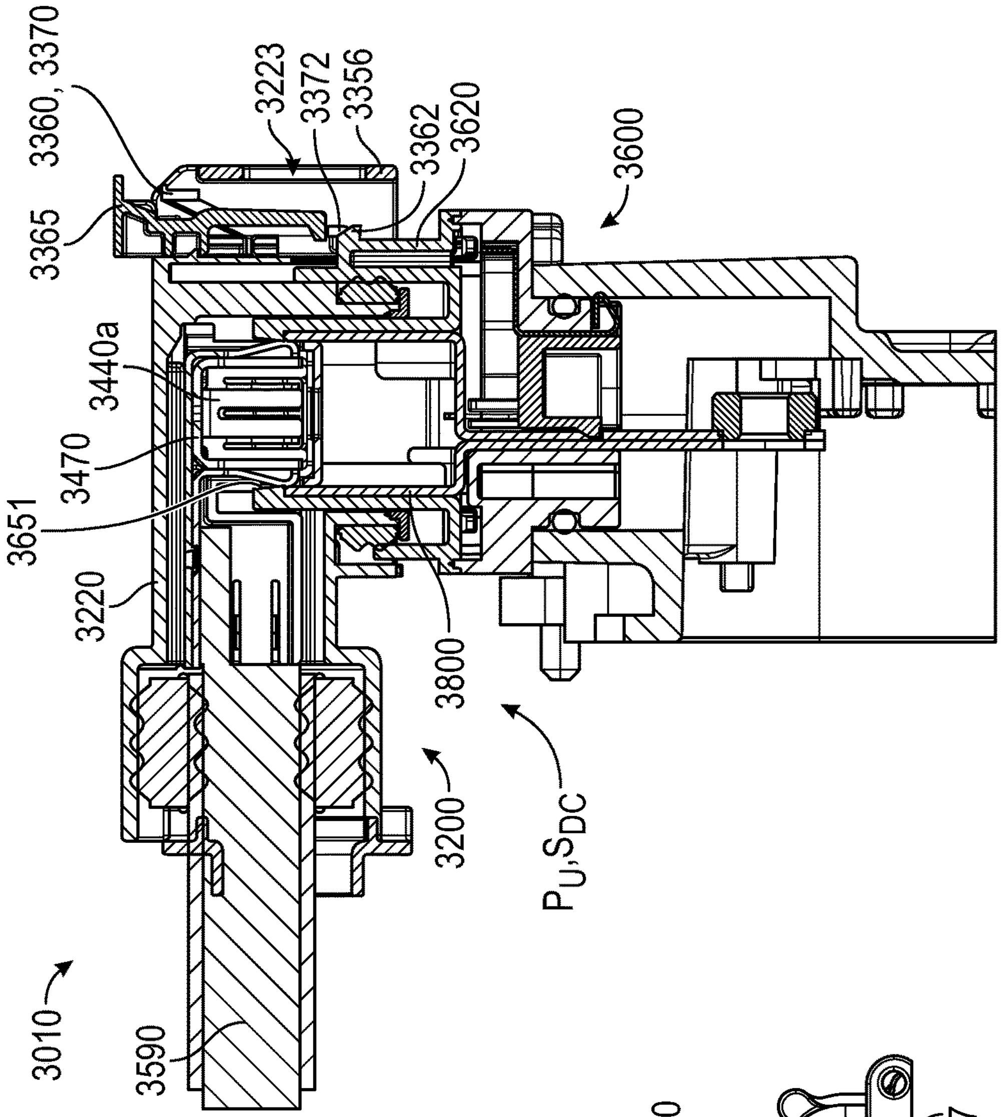
FIG. 36 is a cross-sectional view of the connector system taken along line 36-36 of FIG. 35.
Figure 35:
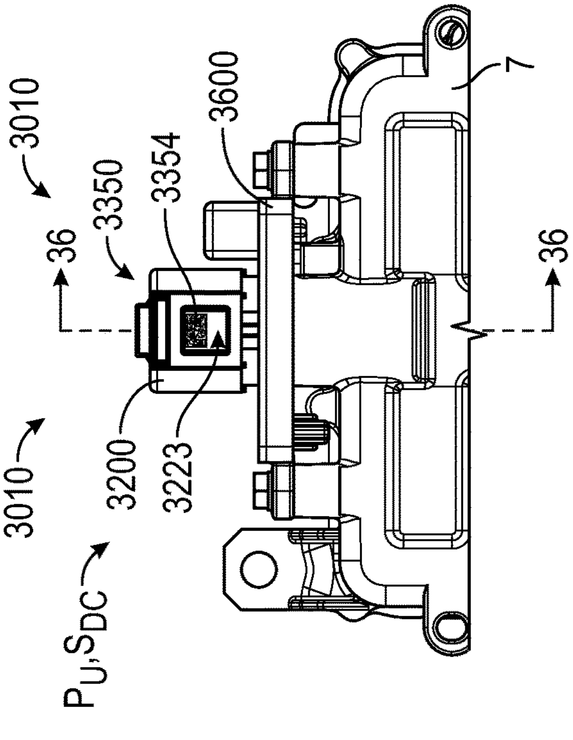
FIG. 35 is a front view of the connector system of FIG. 29 in a disconnected state $S_{DC}$, wherein the CPA assembly is in an unlocked position $P_U$.
Figure 37A:
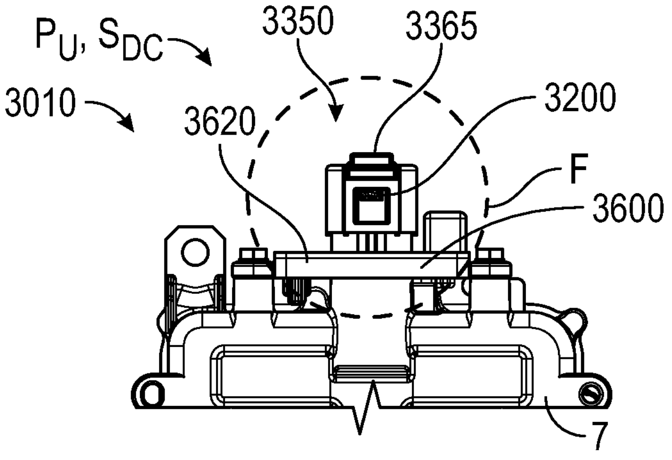
FIG. 37A is a front view of the connector system of FIG. 29 in a disconnected state $S_{DC}$, wherein the CPA assembly is in an unlocked position $P_U$.
Figure 37B:
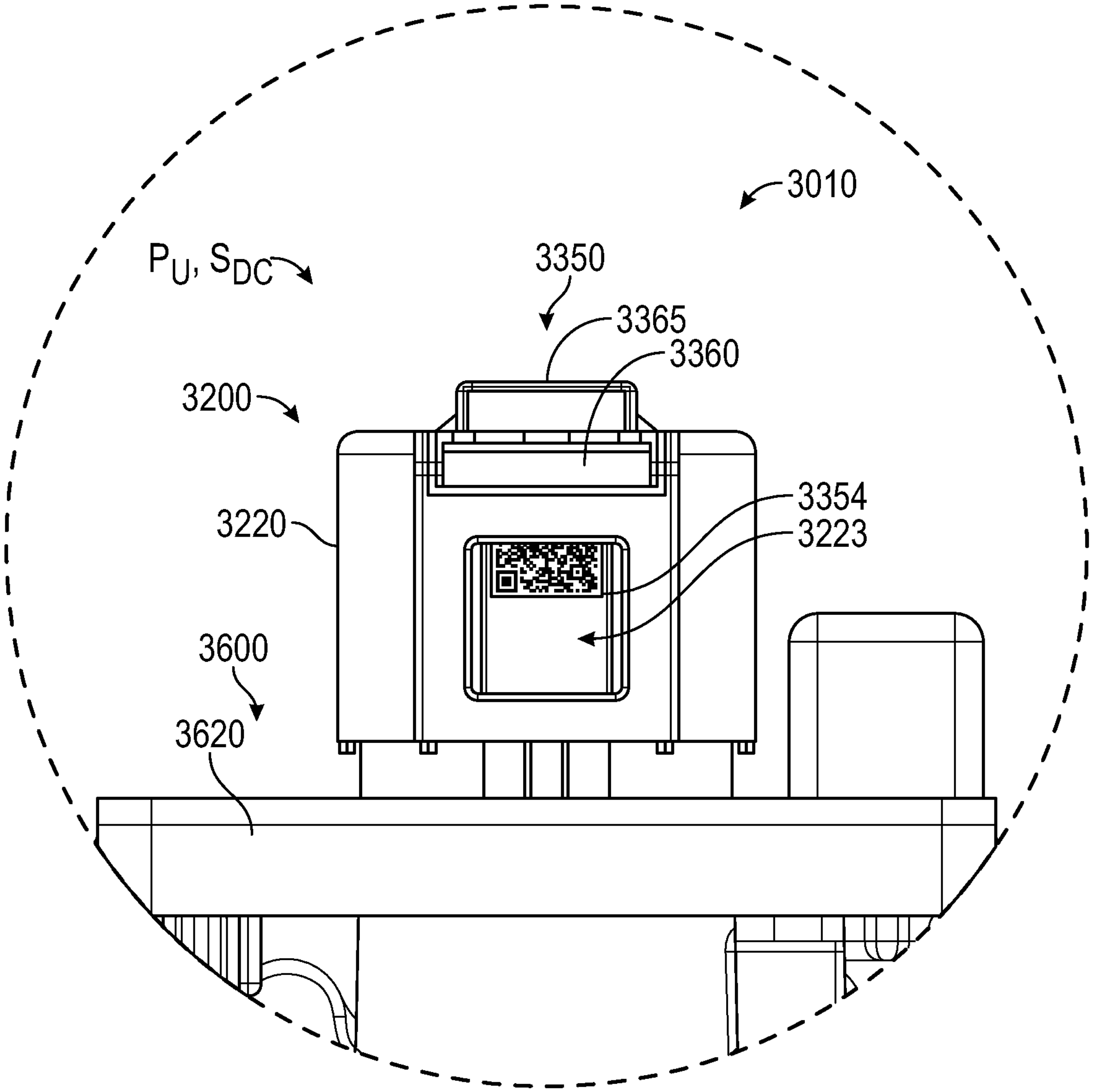
FIG. 37B is a zoomed in view of area F, focusing on the CPA assembly of FIG. 37A.
Figure 39:
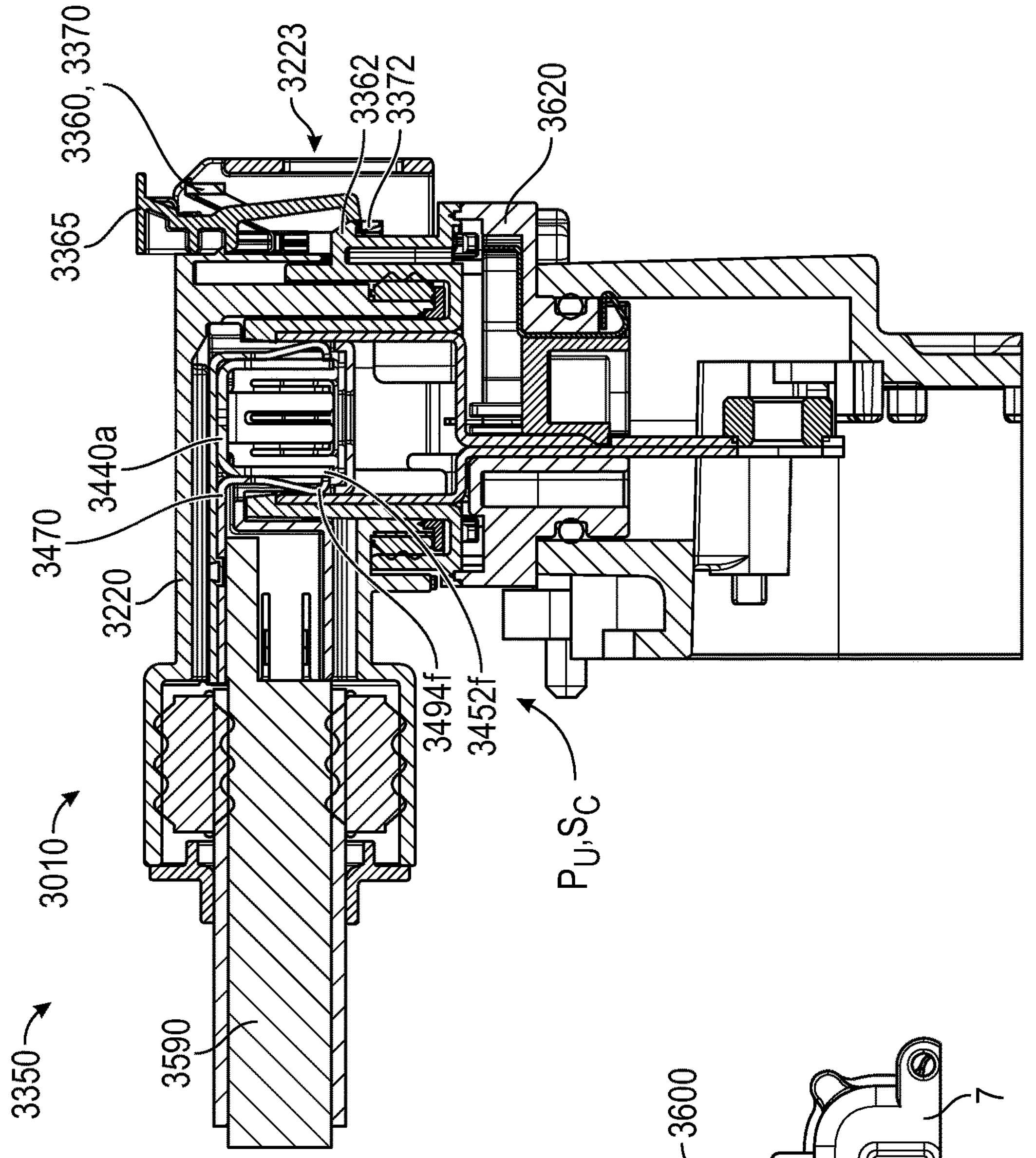
FIG. 39 is a cross-sectional view of the connector system taken along line 39-39 of FIG. 38.
Figure 38:
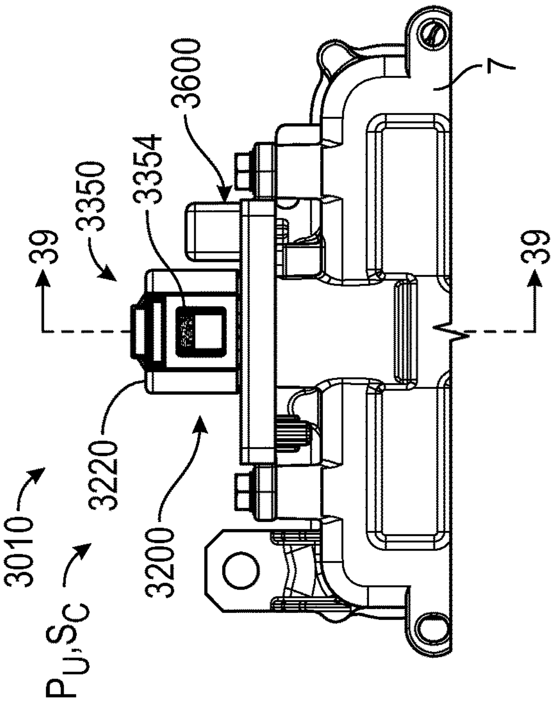
FIG. 38 is a front view of the connector system of FIG. 29 in a connected state $S_C$, wherein the CPA assembly is in an unlocked position $P_U$.
Figure 40A:
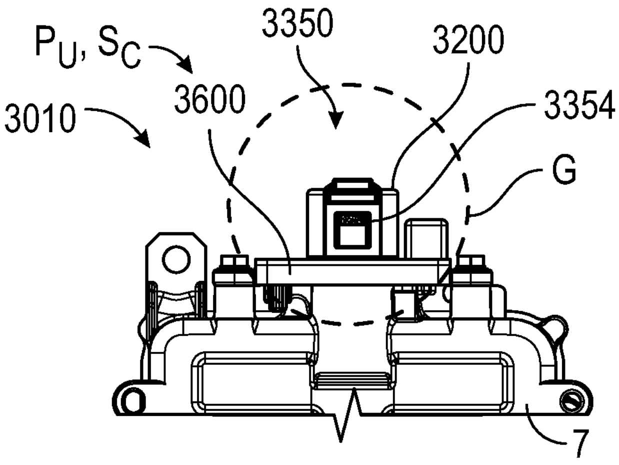
FIG. 40A is a front view of the connector system of FIG. 29 in a connected state $S_C$, wherein the CPA assembly is in an unlocked position $P_U$.
Figure 40B:
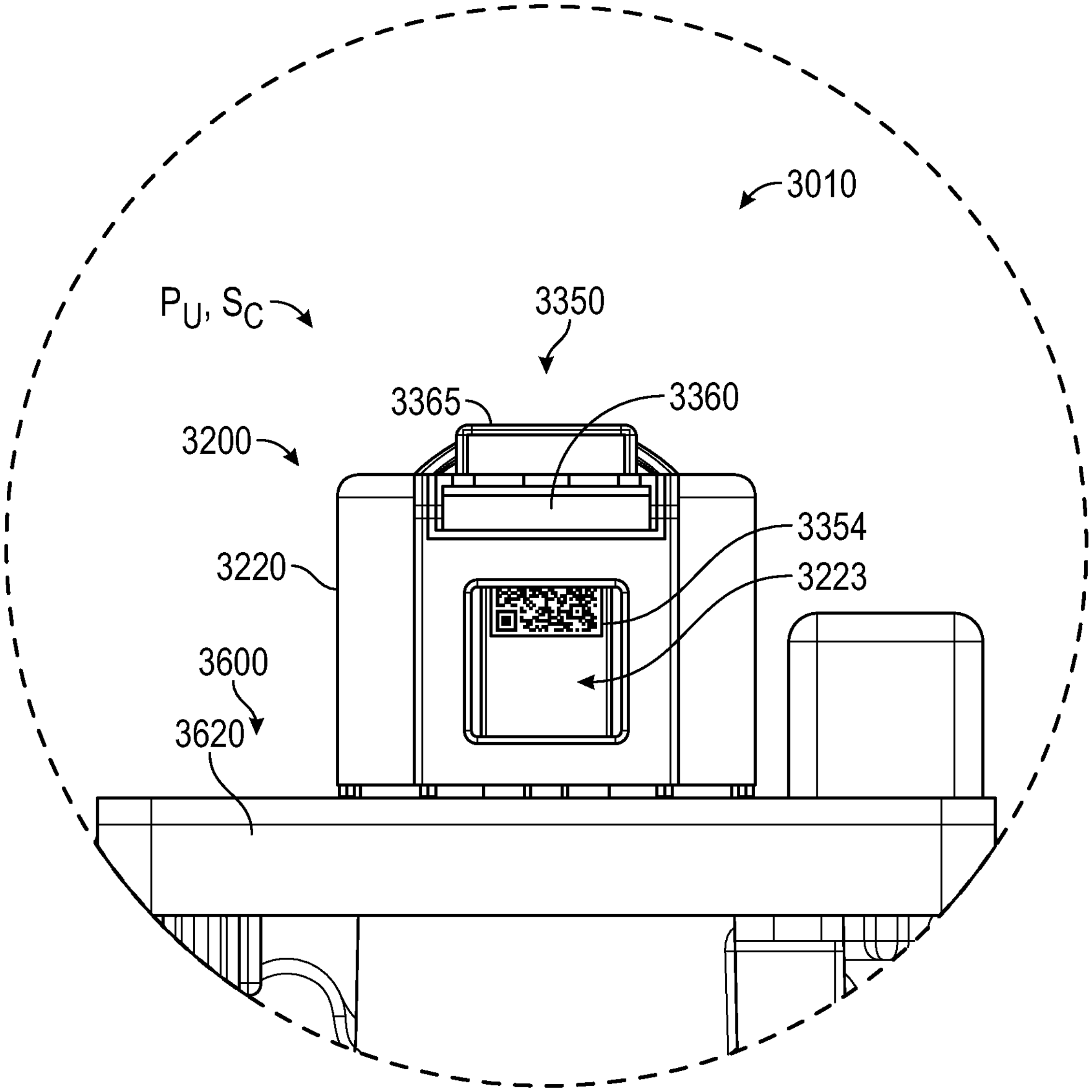
FIG. 40B is a zoomed in view of area G, focusing on the CPA assembly of FIG. 40A.
Figure 42:
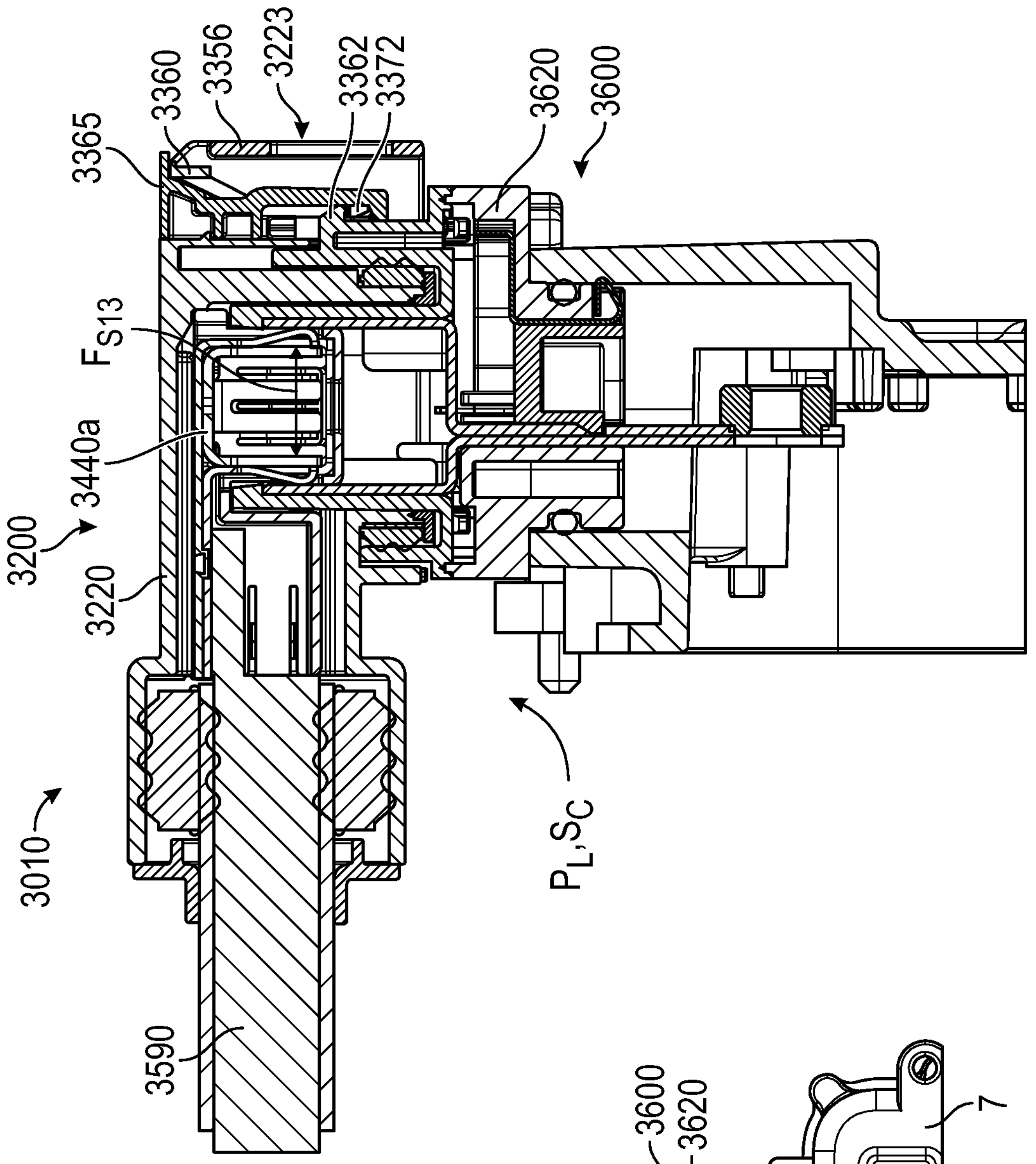
FIG. 42 is a cross-sectional view of the connector system taken along line 42-42 of FIG. 41.
Figure 41:
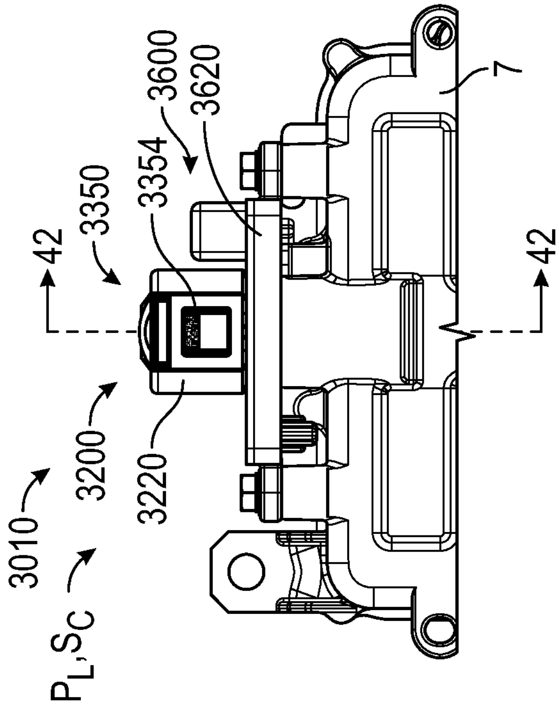
FIG. 41 is a front view of the connector system of FIG. 27 in a connected state $S_C$, wherein the CPA assembly is in a locked position $P_L$.
Figure 43A:
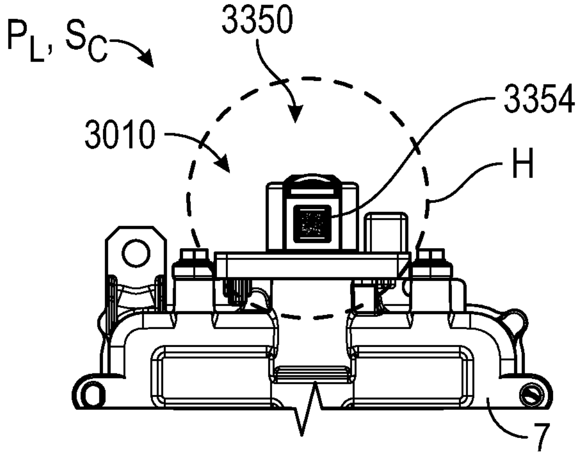
FIG. 43A is a front view of the connector system of FIG. 27 in a connected state $S_C$, wherein the CPA assembly is in an locked position $P_L$.
Figure 43B:
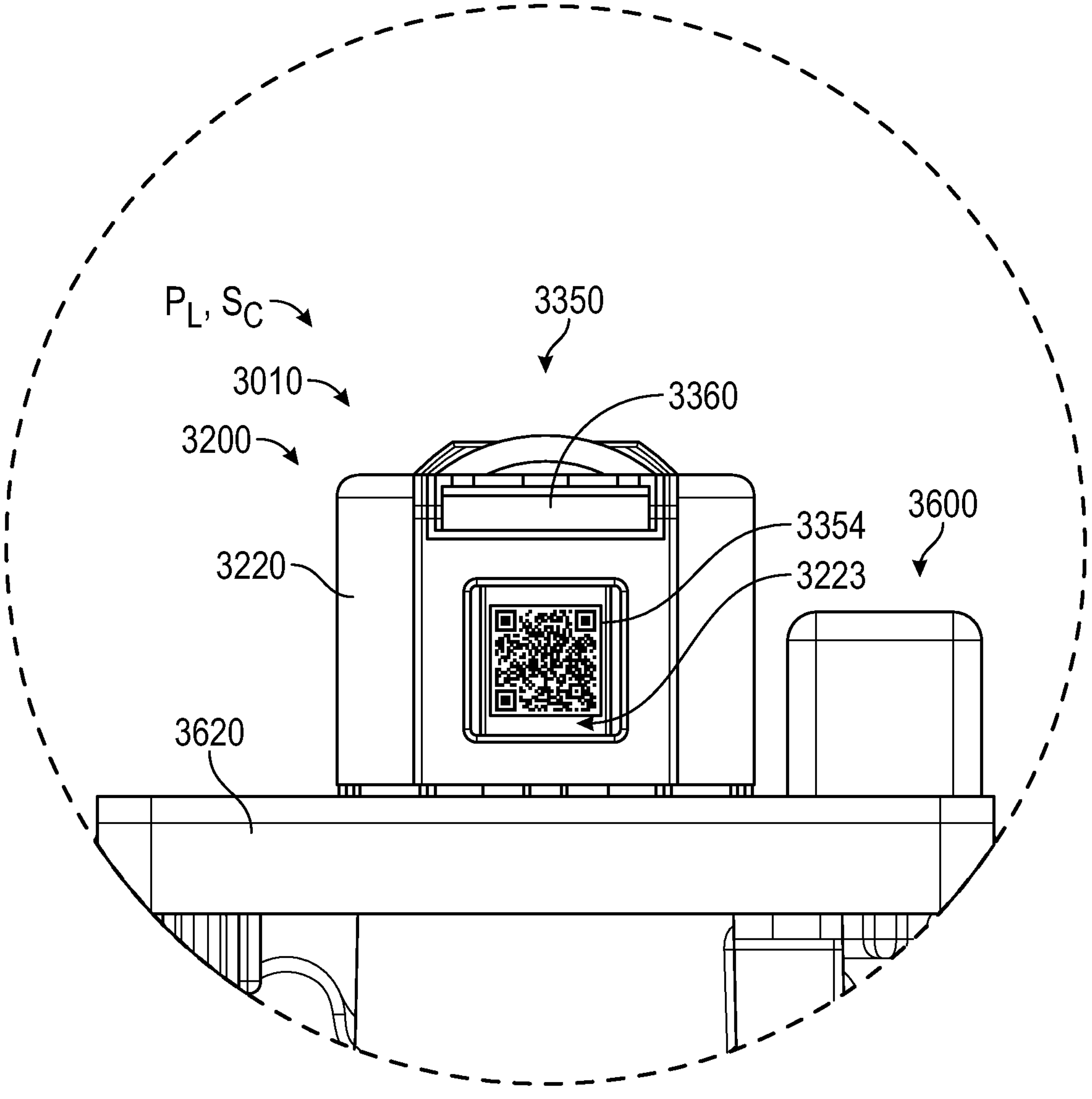
FIG. 43B is a zoomed in view of area H, focusing on the CPA assembly of FIG. 43A.
Figure 44A:
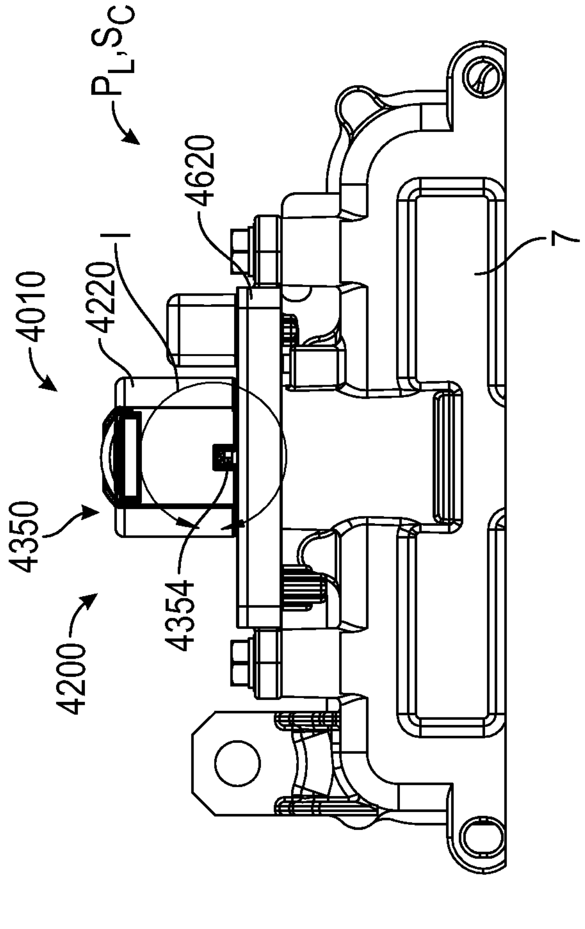
FIG. 44A is a front view of a fifth embodiment of a connector system having a CPA assembly that includes a readable and recordable indicia, wherein the connector system is in a connected state $S_C$, wherein the CPA assembly is in an locked position $P_L$.
Figure 44B:
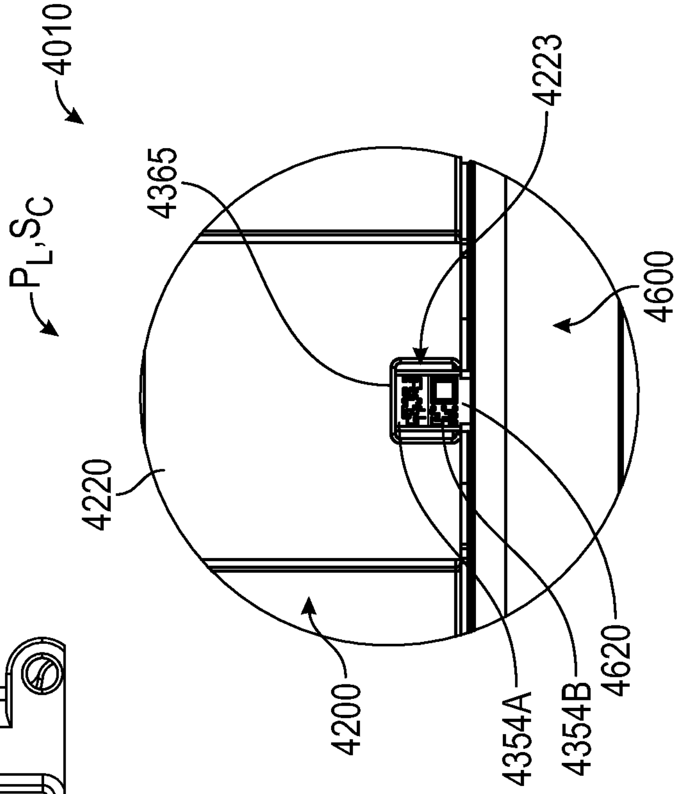
FIG. 44B is a zoomed in view of area I, focusing on the CPA assembly of FIG. 44.
Figure 45A:
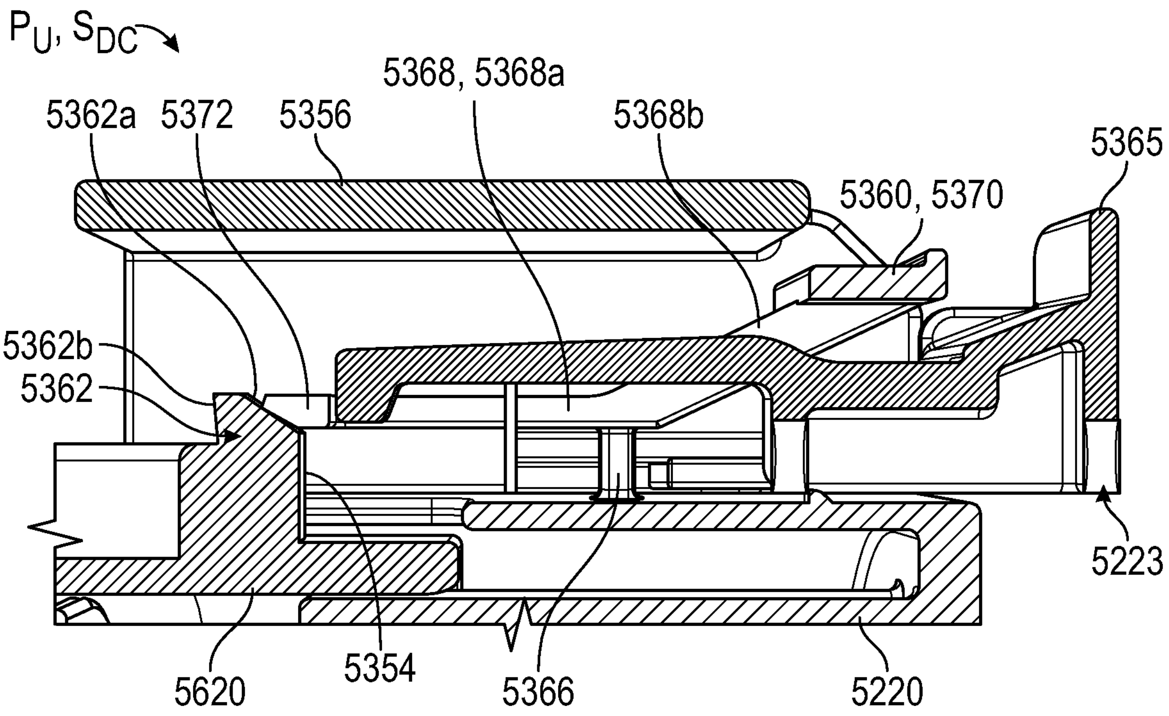
FIG. 45A is a cross-sectional view of a sixth embodiment of a connector system having a CPA assembly that includes a readable and recordable indicia, wherein the connector system is in a disconnected state $S_{DC}$, wherein the CPA assembly is in an unlocked position $P_U$.
Figure 45B:
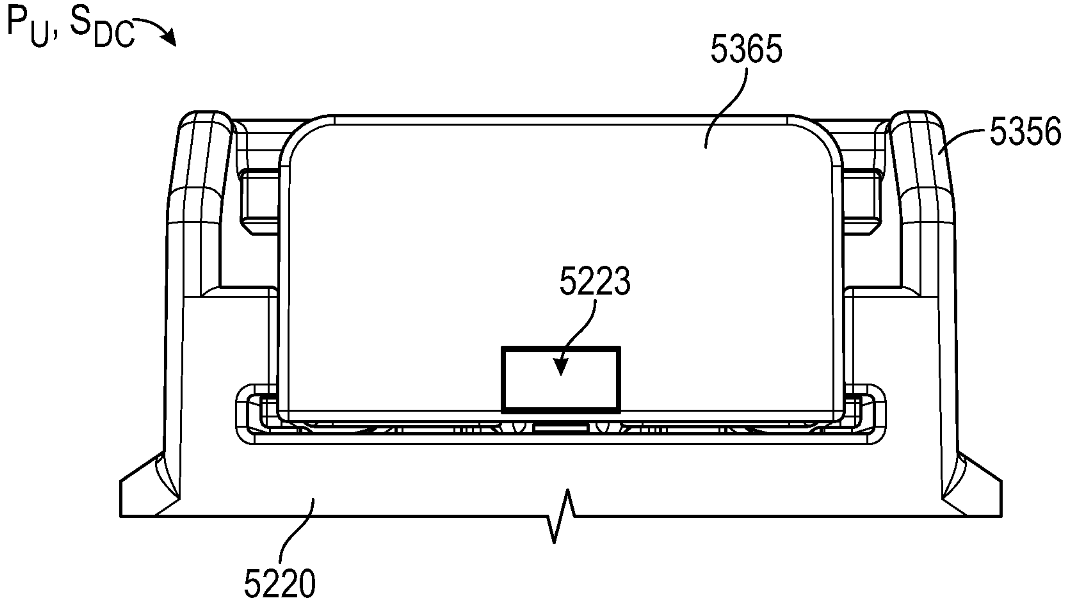
FIG. 45B is a top view of the connector system of FIG. 45A.
Figure 46:
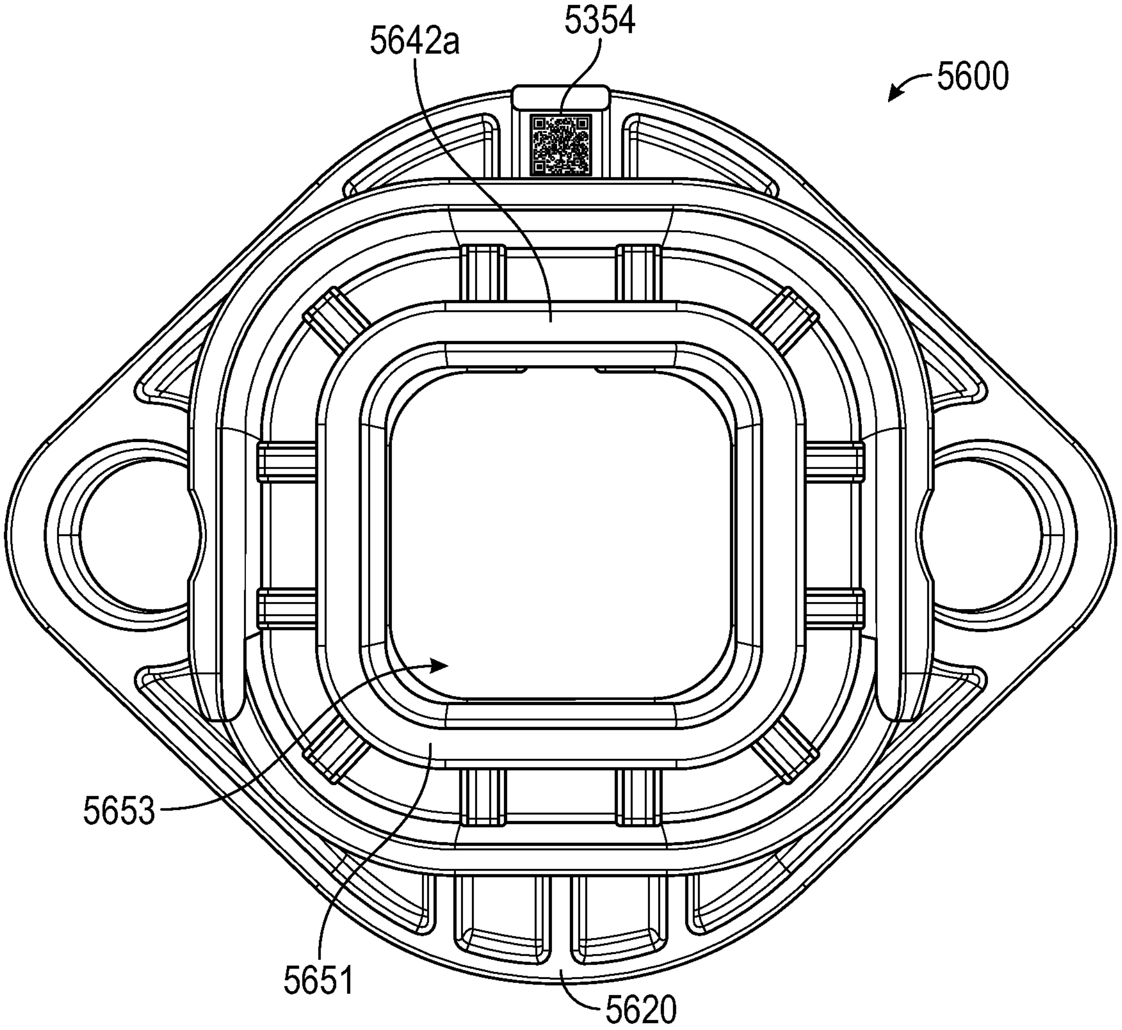
FIG. 46 is a top view of a female housing of the connector system of FIG. 45A.
Figure 47A:
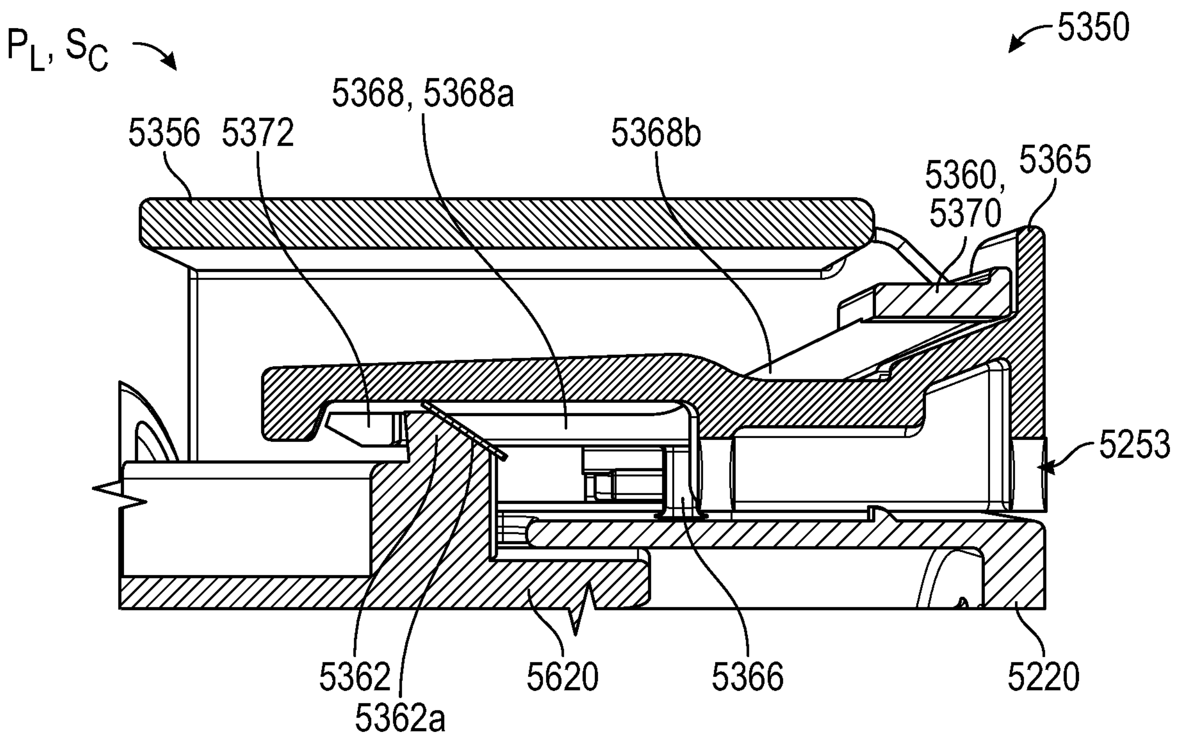
FIG. 47A is a top view of the connector system of FIG. 45A in a connected state $S_C$, wherein the CPA assembly is in a locked position $P_L$.
Figure 47B:
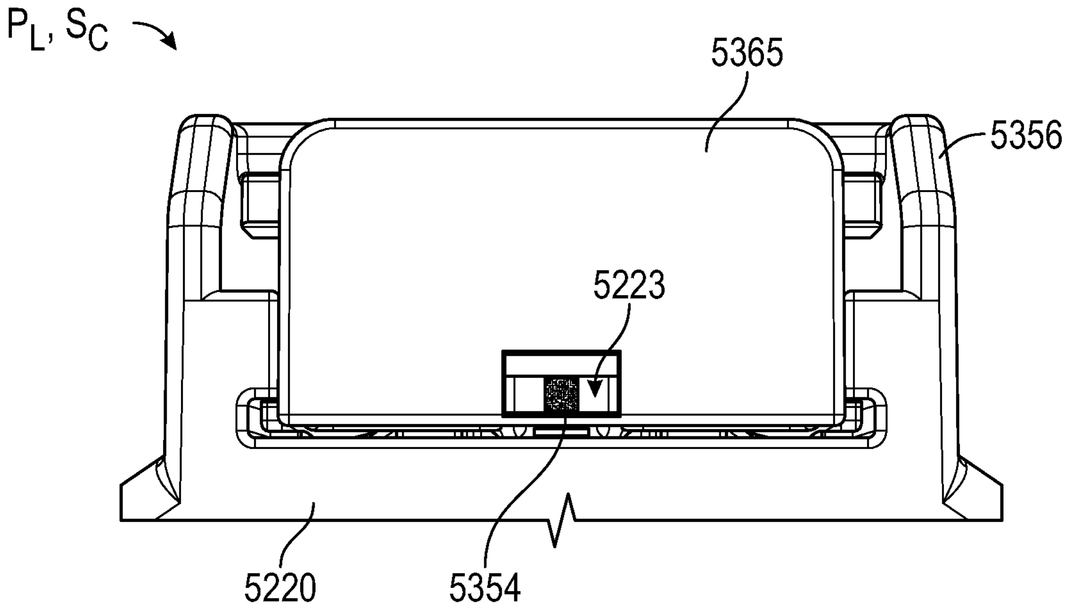
FIG. 47B is a top view of the connector system of FIG. 45A.
Figure 48A:
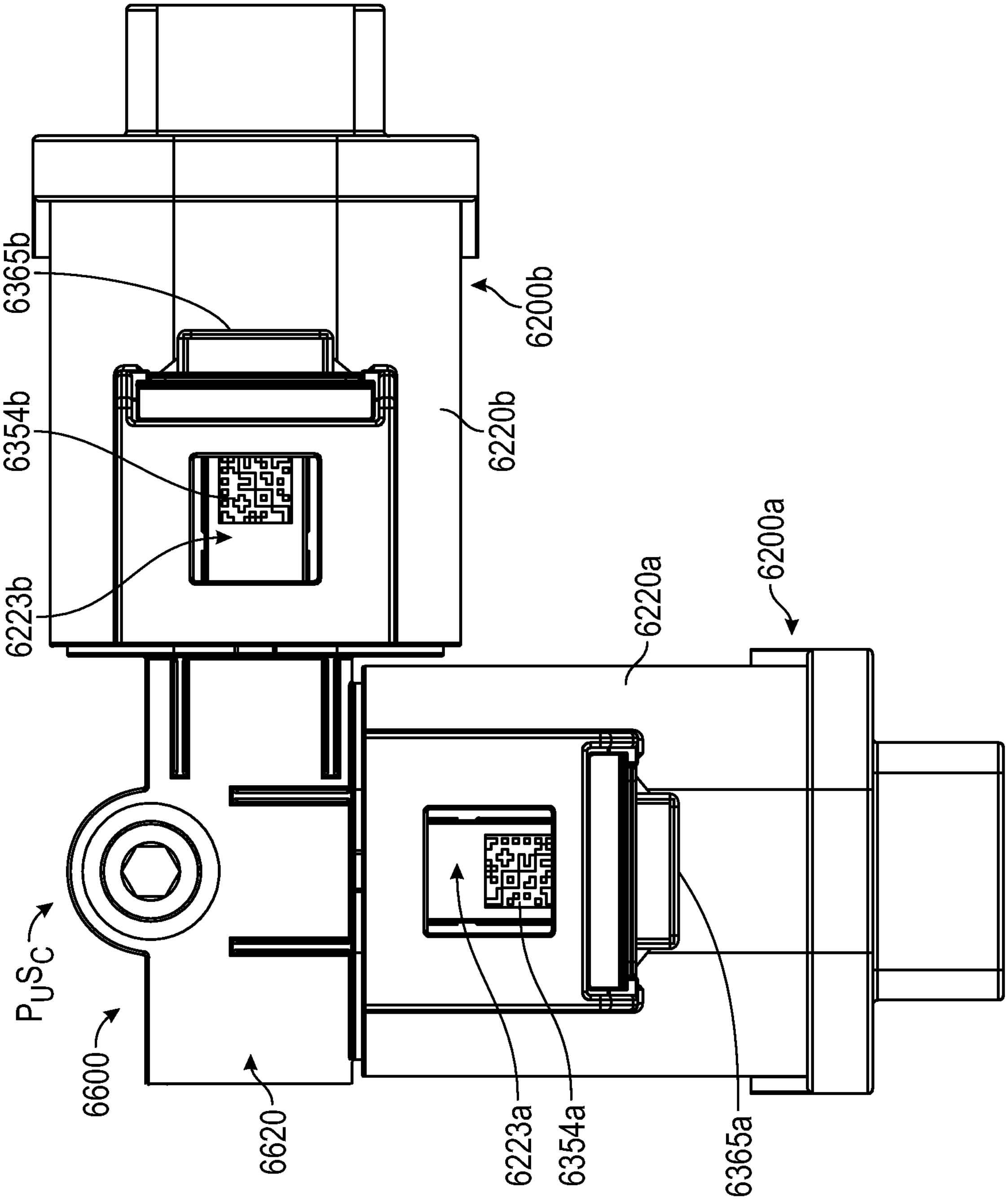
FIG. 48A is a front view of a seventh embodiment featuring dual connector systems angularly arranged with each other, each connector system having a CPA assembly that includes a readable and recordable indicia, wherein the connector system is in a connected state $S_C$, wherein the CPA assembly is in an unlocked position $P_U$.
Figure 48B:
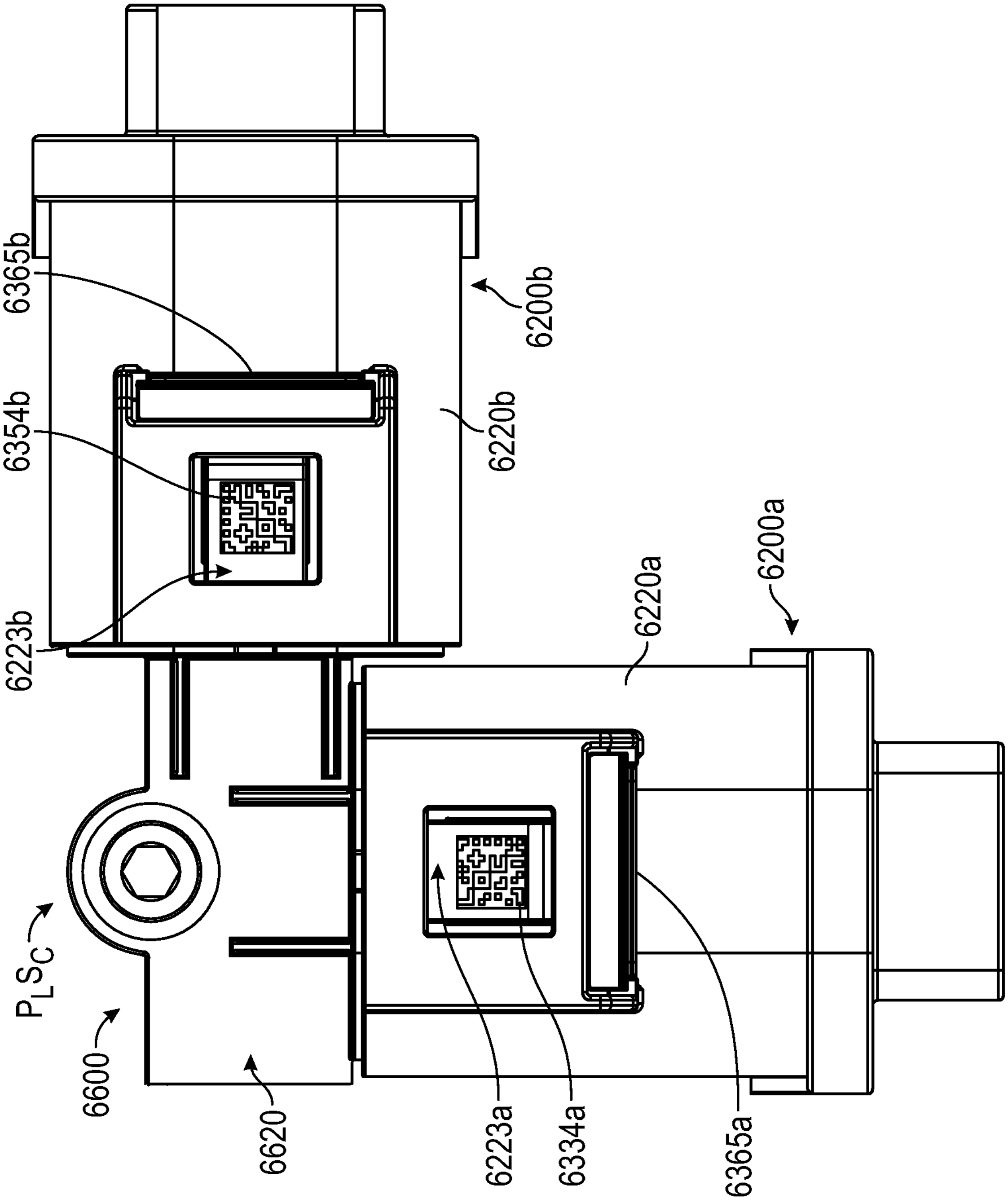
FIG. 48B is a top view of the dual connector system of FIG. 48A in a connected state $S_C$, wherein the CPA assembly is in a locked position $P_L$.

As shown in FIGS. 1, 3, 24*a*, the indicia 354 is a QR code and is formed on the male housing assembly 220 and rearward of the female housing 620. The indicia 354 is not designed to be removed from the connector system 10 and is not formed on: (i) a movable extent of the connector system 10 (e.g., a handle or lever), (ii) on the sides of the male housing assembly 220, or (iii) on the bottom of the male housing assembly 220. Additionally, the indicia 350 may be larger than 0.2 mm, preferably larger than 4 mm, and most preferably larger than 8 mm. It is desirable to enlarge the size of the indicia 354 because it speeds up the time it takes the indicia recording device 4 to read the indicia 350 and it minimizes the number of false negative readings. However, making the indicia 354 too large becomes impractical at some point because it requires the designer to increase the size of the connector system 10. Thus, the design must balance these two factors. It should be understood that the indicia 354 may be integrally formed with the housing assembly 220 using etching process or including it within the model. In other embodiments, the indicia 354 may not be integrally formed with the housing assembly 220 and instead be a sticker that is applied to the housing. Additionally, the indicia 354 may also be coupled to or formed with the housing assembly 220 before the connector assembly 10 is shipped to the location where it will be installed or it may be generated and applied to the connector system 10 at a location that is proximate to the location where it will be installed. For example, a laser may be used to add the indicia 354 to the connector assembly 10 adjacent to the installation location at a time that is proximate to when the connector will be included within the application, product, component, or device.

The CPA sidewall arrangement 356 extends from the front wall 236 of the male housing assembly 220 and are arranged in a "U-shaped" configuration. The combination of the CPA sidewall arrangement 356 and the front wall 236 of the male housing assembly 220 form the CPA receiver 358. The CPA receiver 358 is designed to: (i) house a standoff 361 that an elastically deformable male or exterior engaging member 360 is coupled thereto, and (ii) an extent of the female housing 620, including the female or internal engaging member 362. The standoff 361 extends from the front wall 236 of the male housing assembly 220 and creates: (i) a first gap or space 363 that permits the elastically deformable male or exterior engaging member 360 to deform when coupling the male connector assembly 200 with the female connector assembly 600 to reach the connected state $S_C$, and (ii) a second space 365 that is designed to receive an extent of the female housing 620 when the male connector assembly 200 is coupled to the female connector assembly 600.

The elastically deformable male or exterior engaging member 360 includes: (i) a spacer 366 that extends from the standoff 361, (ii) elongated body 368 that has a first portion 368*a* that extends downward from the spacer 366 and is positioned substantially perpendicular to the spacer 366 and a second portion 368*b* that extends upward from the spacer 366 and away from the front wall 236, (iii) a head or top engaging structure 370, (iv) a projection 371, and (v) bottom engaging structure 374. As will be described in greater detail below, the head or top engaging structure 370 is designed such that the locking member 364 can interact with it to place the CPA assembly in a locked position $P_L$. In addition, the head or top engaging structure 370 is also designed to be accessible by the installer such that they can apply a force on the head or top engaging structure 370 to cause the elastically deformable male or exterior engaging member 360 to disengage with the female or interior coupling member 362. The projection 371 is designed to interact with the front wall 236 to ensure that the force the installer places on the locking member 364 does not damage the spacer 366 and that the bottom engaging structure 374 is in the proper position to interact with the female or internal engaging structure 362. Finally, the bottom engaging structure 374 extends horizontally away from the elongated body 368 and is designed to interact with the female or interior coupling member 362. Specifically, when the CPA assembly is in a locked position $P_L$, the bottom engaging structure 374 prevents: (i) the male connector assembly 200 from being able to be coupled with the female connector assembly 600 or (ii) the male connector assembly 200 from accidently being disconnected from the female connector assembly 600.

The female or interior coupling member 362 extends from the female housing assembly 620 and includes: (i) a sloped surface 362*a* that extends downward and away from the front wall 236 and is designed to interact with the bottom engaging structure 374 and (ii) a retaining surface 362*b* that is designed to retain the bottom engaging structure 374 when the connector system 10 is in the connected state $S_C$. Finally, the locking member 364 is designed to slide across an extent of the housing assembly 220 to move the CPA assembly 350 between a locked position $P_L$ and an unlocked position $P_U$. The locking member 364 is dimensioned to overlap a substantial majority of the male housing assembly 220 as the locking member 364 moves between the locked position $P_L$ and the unlocked position $P_U$. For example, the locking member 364 is configured with a top wall 364*a* and at least one side wall 364*b* that define a receptacle that is dimensioned to overlap a substantial majority of the male housing assembly 220. The configuration of the locking member 264 along with the configuration of the male and female housing assembles 220, 620 allows the connector system 10 to withstand approximately 1000 Newtons of force without causing the connector to move from a connected state $S_C$ to a disconnected state $S_{DC}$. Additionally, the sliding movement of the locking member 364 causes the indicia 354 to be: (i) accessible, unconcealed, or viewable and thus readable or (ii) inaccessible, concealed, and/or not viewable and not readable. In other words, the locking member 364 is designed to slide over the indicia 354 to move the indicia from an accessible, unconcealed, and/or viewable to an inaccessible, concealed, and/or not viewable and vice versa. It should be understood that the locking member 364 may be made from the same non-conductive plastic as the rest of the housing assembly 220 or may include other materials that are designed to block transmission of radio waves. For example, if the indicia 354 is a RFID tag then the locking member 364 will be designed to include a material that can block the RFID tag from being read when the indicia 354 is inaccessible and/or concealed.

It should also be understood that the configuration of the CPA assembly 350 may include a different arrangement, combination, or number of components. For example, the combination of CPA assembly 350 use magnetic forces, spring forces, require partial rotation, or require full rotation forces or a combination of these forces to place the CPA assembly in a locked or unlocked position $P_L$, $P_U$. In another embodiment: (i) the spacer may extend from the front wall of the CPA sidewall arrangement and (ii) the positional relationship of the female or interior coupling member and the elastically deformable male or exterior coupling member may be switched, such that the female is an exterior coupling member and the elastically deformable male is an interior coupling member. This alternative embodiment will allow the head or top engaging structure to deform away from the center of the connector. The location of the female or interior coupling member may be moved upwards (away from the bottom of the female housing) to reduce the amount of travel of the elastically deformable male or exterior coupling member.

Referring to FIG. 2 and the images of the connector system shown in FIGS. 3-22, the first step 990 in this process is installing the female connector assembly 600 within the application, component, or device. After the female connector assembly 600 is installed in the application, component, or device, the installer grasps the male connector assembly 200 that has previously been installed within the application, component, or device and makes sure that the locking member 364 is in the unlocked position $P_U$ in step 991. This is because if the locking member 364 is in the locked position $P_L$, the male connector assembly 200 cannot be coupled to the female connector assembly 600. Specifically, FIGS. 9-11B show the connect system in a disconnected state $S_{DC}$ and the locking member 364 is in the locked position $P_L$. In this configuration, the elastically deformable male or exterior engaging member 360 cannot deform into the first gap or space 363 because the locking member 364 is engaged with the head or top engaging structure 370. Without allowing the elastically deformable male or exterior engaging member 360 to deform into the first space 363, the bottom engaging structure 374 cannot deform outward and away from the center of the connector system 10 to allow the bottom engaging structure 374 to overcome female or interior coupling member 362. Accordingly, the interaction between the elastically deformable male or exterior engaging member 360 and the female or interior coupling member 362 prevents the male connector assembly 200 from being mechanically or electrically coupled to the female connector assembly 600.

As described above, when the locking member 364 is in this locked position $P_L$, the indicia 354 is accessible, unconcealed, and/or viewable. Accordingly, if the installer attempted to use the indicia reading device 4 to read the indicia 354 at this point, the installer may receive a false positive reading. Meaning that the indicia reading device 4 believes that the connector system 10 is properly coupled together. Nevertheless, the installer should recognize this false positive reading because it is clear that the male connector assembly 200 is not mechanically or electrically coupled to the female connector assembly 600. As discussed below, other embodiments have different configurations that address these false positive readings, but regardless it should be easy to identify when a false positive reading does occur.

To overcome the issues described above in connection with FIGS. 9-11B, the installer places the CPA assembly in an unlocked position $P_U$ thereby making the indicia 354 inaccessible, concealed and/or not viewable. Specifically, these steps are shown in connection with FIGS. 12-14B. Here, the installer has applied a downward and rearward unlocking force $F_U$ on the locking member 364 to: (i) cause an extent of the locking member 364 to overcome a locking projection 221 that extends from the top of the male housing assembly 220 and (ii) to move the locking member 364 towards the rear extent of the connector system 10. When the locking member 364 is in the rearward position, it is in an unlocked position $P_U$. In this configuration, the elastically deformable male or exterior engaging member 360 can deform into the first space 363 because the locking member 364 is not engaging with the head or top engaging structure 370. Allowing the elastically deformable male or exterior engaging member 360 to deform into the first space 363, the bottom engaging structure 374 can deform outward and away from the center of the connector system 10 to allow the bottom engaging structure 374 to overcome female or interior coupling member 362.

The next step in placing the connector system 100 in the connected state $S_C$ requires that the user apply a downwardly directed coupling force $F_C$ on the male connector assembly 200. This force $F_C$ first causes the contact arms 494*a*-494*h* to engage with the internal segment 651, which starts to compress the contact arms 494*a*-494*h* towards the center of the male terminal 470. This inward compression of the contact arms 494*a*-494*h* in turn causes the spring arms 452*a*-452*h* to deform inward towards the center of the male terminal 470. As discussed above, the spring member 440*a* resists this inward compression and applies an outwardly directed spring biasing force $F_{SB}$ on the contact arms 494*a*-494*h*. While the contact arms 494*a*-494*h* are being compressed, the coupling force $F_C$ also causes the elastically deformable male or exterior engaging member 360 to deform into the first space 363. Once the coupling force $F_C$, is sufficient to cause the bottom engaging structure 374 to overcome female or interior coupling member 362, the elastically deformable male or exterior engaging member 360 can return to its original or non-deformed position. The return of the elastically deformable male or exterior engaging member 360 may cause an audible sound (e.g., click) when it moves from the deformed position to the non-deformed position. This audible sound will inform the assembler that the elastically deformable male or exterior engaging member 360 is properly seated; thus meeting industry standards and/or requirements (e.g., USCAR). Once this coupling force $F_C$ causes the male terminal body 472 to be fully seated within the female terminal assembly 800, the contact arms 494*a*-494*h* are in mechanical and electrical engagement with the female terminal assembly 800 and the bottom engaging structure 374 is positioned under the retaining surface 362*b* of the female or interior coupling member 362. Thereby connecting the male connector assembly 200 to the female connector assembly 600 and forming a connected state $S_C$. As explained herein, the connector system 100 does not include a handle or lever that aids in the coupling of the male connector assembly 200, including the male housing assembly 220, to the female connector assembly 600, including the female housing assembly 620, to reach the connected state Sc.

Returning to FIG. 2, the next step in this process 993 is placing the CPA assembly 350 in the locked positon $P_L$ thereby making the indicia accessible, unconcealed, and/or viewable. Specifically, this is shown in connection with FIGS. 18-20B. Here, a locking force $F_L$ is applied to the locking member 364 to cause the locking member 364 to move from the rearward and unlocked position $P_U$ to the forward and locked position $P_L$. This locking force $F_L$ is substantially perpendicular with the coupling force $F_C$. Once the locking force $F_L$ has caused an extent of the locking member to be positioned in front of the locking projection 221 that extends from the top of the male housing assembly 220, the CPA assembly 350 is in the locked position $P_L$. As such, the elastically deformable male or exterior engaging member 360 cannot deform into the first space 363 because the locking member 364 is engaged with the head or top engaging structure 370. Without allowing the elastically deformable male or exterior engaging member 360 to deform into the first space 363, the bottom engaging structure 374 cannot deform outward and away from the center of the connector system 10 to allow the bottom engaging structure 374 to overcome the female or interior coupling member 362. Accordingly, the interaction between the elastically deformable male or exterior engaging member 360 and the female or interior coupling member 362 prevents the male connector assembly 200 from becoming mechanically or electrically uncoupled from the female connector assembly 600.

Returning to FIG. 2, the next step in this process 994 is the utilization of the indicia recording device 4 to read the indicia 534. To do such, the installer positions the indicia reading device 4 above the connector system 10 and points the indicia reading device 4 downwards such that it scans the top portion of the connector system 10. This downwards scanning direction $S_D$ is: (i) in the same general direction as the coupling force $F_C$ that is applied to the male connector assembly 200 in order to couple the male connector assembly 200 to the female connector assembly 600, and/or (ii) is substantially perpendicular to the spring biasing force $F_{SB}$ that is applied by the spring member 440*a* on the contact arm 494*a*-494*h* of the male terminal body 472. Here, the information that is obtained from the indicia (i.e., QR code) 354 is the connector type, materials contained within the connector, company that manufactured the connector, when the connector was manufactured, and where the connector was manufactured. As described above, other information may be obtained from the indicia 354 that is not associated with this specific embodiment.

Once the indicia 354 is read in step 994, the indicia reading device 4 informs the installer that the connector system is in the connected state $S_C$ and that the CPA assembly is in the locked position $P_L$. Once step 994 occurs, the information that has been obtained from the indicia 354 can be associated with information that is outside of or not contained within the indicia 354. For example, such information may include: (i) time including minutes, hours, day, year, (ii) location, (iii) installer's name or other factory information, (iv) production number for day, month year, (v) day the indicia reading device 4 was last calibrated, (vi) application information (e.g., vehicle identification number), (vii) component information (e.g., power distribution assembly) or (viii) device information (e.g., alternator). Once all information is associated in step 996, the associated connector data can be uploaded to the database 5 in step 997. In step 998, the associated connector data can be viewed locally or remotely using a device (e.g., computer) that can access the database 5.

Finally, the male connector assembly 200 can be moved from the connected state $S_C$ to the disconnected state $S_{DC}$ by applying a downward and rearward unlocking force $F_U$ on the locking member 364 to: (i) cause an extent of the locking member 364 to overcome a locking projection 221 that extends from the top of the male housing assembly 220 and (ii) to move the locking member 364 towards the rear extent of the connector system 10. Once the locking member 364 is in the unlocked position $P_U$, the installer applies a rearward on the elastically deformable male or exterior engaging member 360 and an upward force on the male connector assembly 200. This causes the elastically deformable male or exterior engaging member 360 to deform into the first space 363 and allows the bottom engaging structure 374 to overcome female or interior coupling member 362. The installer continues to apply the upward directed force to move the connector system to the disconnected state $S_{DC}$.

Overall, the indicia 354 is connected to the male housing assembly 220 and rearward of the female housing 620. The indicia 354 is not designed to be removed from the connector system 10 and is not formed on: (i) a movable extent of the connector system 10 (e.g., a handle or lever), (ii) on the sides of the male housing assembly 220, or (iii) on the bottom of the male housing assembly 220. Additionally, the downwards scanning direction ($S_D$) is: (i) in the same general direction as a coupling force $F_C$ that is applied to the male connector assembly 200 in order to couple the male connector assembly 200 to the female connector assembly 600, and/or (ii) is substantially perpendicular to the spring biasing force $F_{SB}$ that is applied by the spring member 440*a* on the contact arm 494*a*-494*h* of the male terminal body 472. Finally, the indicia 354 of the first embodiment can be: (i) inaccessible and/or concealed (shown in FIGS. 23A-23B), which makes the indicia 354 unreadable or (ii) accessible and/or unconcealed (shown in FIGS. 24A-24B), which makes the indicia 354 readable.

The male terminal 470, including the contact arms 494*a*-494*h*, may be formed from a first material such as copper, a highly-conductive copper alloy (e.g., C151 or C110), aluminum, and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% of IACS. In certain operating environments or technical applications, it may be preferable to select C151 because it has anti-corrosive properties desirable for high-stress and/or harsh weather applications. The first material for the male terminal 470 is C151 and is reported, per ASTM B747 standard, to have a modulus of elasticity (Young's modulus) of approximately 115-125 gigaPascals (GPa) at room temperature and a coefficient of thermal expansion (CTE) of 17.6 ppm/degree Celsius (from 20-300 degrees Celsius) and 17.0 ppm/degree Celsius (from 20-200 degrees Celsius). The spring member 440*a* may be formed from a second material such as spring steel, stainless steel (e.g., 301SS, ¼ hard), and/or another suitable material having greater stiffness (e.g., as measured by Young's modulus) and resilience than the first material of the male terminal 470. The second material preferably has an electrical conductivity that is less than the electrical conductivity of the first material. The second material also has a Young's modulus that may be approximately 193 GPa at room temperature and a coefficient of terminal expansion (CTE) of approximately 17.8 ppm/degree Celsius (from 0-315 degrees Celsius) and 16.9 ppm/degree Celsius (from 0-100 degrees Celsius).

Based on the above exemplary embodiment, the Young's modulus and the CTE of the spring member 440*a* is greater than the Young's modulus and the CTE of the male terminal 470. Thus, when the male terminal 470 is used in a high power application that subjects the connector system 10 to repeated thermal cycling with elevated temperatures (e.g., approximately 150° Celsius) then: (i) the male terminal 470 become malleable and loses some mechanical resilience, i.e., the copper material in the male terminal 470 softens and (ii) the spring member 440*a* does not become as malleable or lose as much mechanical stiffness in comparison to the male terminal 470. Thus, when utilizing a spring member 440*a* that is mechanically cold forced into shape (e.g., utilizing a die forming process) and the spring member 440*a* is subjected to elevated temperatures, the spring member 440*a* will attempt to at least return to its uncompressed state, which occurs prior to insertion of the male terminals assembly 430 within the female terminal assembly 800, and preferably to its original flat state, which occurs prior to the formation of the spring member 440*a*. In doing so, the spring member 440*a* will apply a generally outward directed thermal spring force, $S_{TF}$, (as depicted by the arrows labeled $F_{SB}$ in FIG. 22) on the free ends 488 of the male terminal 470. This thermal spring force, $F_{ST}$, is dependent upon local temperature conditions, including high and/or low temperatures, in the environment where the system 10 is installed. Accordingly, the combination of the spring biasing force, $F_{SB}$, and the thermal spring force, $F_{ST}$, provides a resultant biasing force, $F_{SRB}$, that ensures that the outer surface of the contact arms 494*a*-494*h* are forced into contact with the inner surface of the female terminal assembly 800 when the male terminal 470 is inserted into the female terminal assembly 800 and during operation of the system 10 to ensure an electrical and mechanical connection. Additionally, with repeated thermal cycling events, the male terminal assembly 430 will develop an increase in the outwardly directed resultant spring forces, $F_{SRB}$, that are applied to the female terminal assembly 800 during repeated operation of the system 10.

Similar to the connector system 10 as described above and shown in FIGS. 1-24B, FIGS. 25A-26B show a second embodiment of a connector system 1010. For sake of brevity, the above disclosure in connection with connector system 10 will not be repeated below, but it should be understood that across embodiments like numbers that are separated by 1000 represent like structures. For example, the disclosure relating to male terminal assembly 200 applies in equal force to male terminal assembly 1200. Further, it should be understood that the functionality of connector system 1010 is similar to, or identical to, the functionality disclosed in connection with connector system 10.

Like the first embodiment of the connector system 10, the indicia 1354 is disposed on the male housing assembly 1220 and rearward of the female housing 1620. The indicia 1354 is not designed to be removed from the connector system 1010 and is not formed on a movable extent of the connector system 1010 (e.g., a handle or lever). Unlike the first embodiment, multiple indicia 1354 are placed on different sides of the male housing assembly 1220 to ensure that the installer can properly read the indicia 1354 if objects obstruct the view of the top of the connector assembly 1010. For example, indicia 1354 may be placed on both sides and the top of the male housing to allow an installer to scan the indicia 1354 from any of these three directions. Thus, the scanning direction $S_D$ may be: (i) in the same general direction as a coupling force $F_C$ that is applied to the male connector assembly 1200 in order to couple the male connector assembly 1200 to the female connector assembly 1600, (ii) in a different direction then the coupling force $F_C$, (iii) substantially parallel with the biasing force $F_{SB}$ that is applied by the spring member 440*a* on the contact arms 1494*a*-1494*h*, and/or (iv) substantially perpendicular to the biasing force $F_{SB}$. Finally, the indicia 1354 of the second embodiment of the connector system 1010 can be: (i) inaccessible and/or concealed (shown in FIGS. 25A-25B), which makes the indicia 1354 unreadable or (ii) accessible and/or unconcealed (shown in FIGS. 26A-26B), which makes the indicia 1354 readable.

Similar to the connector system 10 as described above and shown in FIGS. 1-24B, FIGS. 27A-28B show a third embodiment of a connector system 2010. For sake of brevity, the above disclosure in connection with connector system 10 will not be repeated below, but it should be understood that across embodiments like numbers that are separated by 2000 represent like structures. For example, the disclosure relating to male terminal assembly 200 applies in equal force to male terminal assembly 2200. Further, it should be understood that the functionality of connector system 2010 is similar to, or identical to, the functionality disclosed in connection with connector system 10.

Unlike the first two embodiment of the connector system 10, 1010, the indicia 2354 is split into two portions, wherein a first portion 2354*b*, 2354*d* is disposed on the CPA assembly 2350 and the second portion 2354*a*, 2354*c* is disposed on the female housing 2620. This configuration ensures that a false positive reading cannot occur when the connector system 2010 is not in the connected state $S_C$ because the first and second extents of the indicia 2354 would not be aligned and thus not readable by the indicia reading device 4. Also, like the second embodiment, multiple indicia 2354 are placed on different sides of the male housing assembly 2200 to ensure that the installer can properly read the indicia 2354 from different angles. For example, indicia 2354 may be placed on both sides and the top of the male housing assembly 2220 to allow an installer to scan the indicia 2354 from any of these three directions. Thus, the scanning direction $S_D$ may be: (i) in the same general direction as a coupling force $F_C$ that is applied to the male connector assembly 1200 in order to couple the male connector assembly 1200 to the female connector assembly 1600, (ii) in a different direction then the coupling force $F_C$, (iii) substantially parallel with the biasing force $F_{SB}$ that is applied by the spring member 440*a* on the contact arms 1494*a*-1494*h*, and/or (iv) substantially perpendicular to the biasing force $F_{SB}$. Finally, the third embodiment of the connector system 2010 can be configured such that the indicia 2354a-2354d is unreadable (shown in FIGS. 27A-27B) or readable (shown in FIGS. 26A-26B). Regardless of whether the indicia 2354 is unreadable or readable, at least an extent of the indicia 2354 is always accessible and/or unconcealed.

Similar to the connector system 10 as described above and shown in FIGS. 1-24B, FIGS. 29-43B show a fourth embodiment of a connector system 3010. For sake of brevity, the above disclosure in connection with connector system 10 will not be repeated below, but it should be understood that across embodiments like numbers that are separated by 3000 represent like structures. For example, the disclosure relating to male terminal assembly 200 applies in equal force to male terminal assembly 3200. Further, it should be understood that the functionality of connector system 3010 is similar to, or identical to, the functionality disclosed in connection with connector system 10.

The primary function of the CPA assembly 3350 of the fourth embodiment is similar the CPA assemblies of the first three embodiments 350, 1350, 2350. However, there are a few structural difference between these CPA assemblies 350, 1350, 2350, 3350. These differences include: (i) the locking member 364 that is contained within the first embodiment has been removed and replaced with a sliding member 3365 that slides up and down within a set of rails that extend from the front wall 3236 and are housing within the CPA sidewall arrangement 3356, (ii) the indicia 3350 is not positioned on the male housing assembly 220 and instead is positioned on the sliding member 3356 that moves relative to the male and female housings 3220, 3620, and (iii) the indicia 3354 is accessible or unconcealed when it is aligned with a window 3223 that is formed in the front extent of the male connector assembly 3200. These structural changes require that the indicia be read by positioning the indicia reading device 4 in front of the connector system 3010 and angling the indicia reading device 4 rearwards such that it scans the front portion of the connector system 3010. This rearward scanning direction $S_D$ is: (i) in a different direction than the direction of a coupling force $F_C$ that is applied to the male connector assembly 3200 in order to couple the male connector assembly 3200 to the female connector assembly 3600, (ii) in a different direction then the coupling force $F_C$, (iii) substantially parallel to the biasing force $F_{SB}$ that is applied by the spring member 3440a on the contact arm 3494a-3494h, and (iv) substantially perpendicular to the biasing force $F_{SB}$ that is applied by the spring member 3440a. Finally, the indicia 3354 of the fourth embodiment of the connector system 3010 can be: (i) partially inaccessible or partially concealed (shown in FIG. 29), which makes the indicia 3354 unreadable or (ii) accessible or unconcealed (shown in FIG. 30), which makes the indicia 3354 readable.

Similar to the connector system 10 as described above and shown in FIGS. 1-24B, 44A-44B show a fifth embodiment of a connector system 4010. For sake of brevity, the above disclosure in connection with connector system 10 will not be repeated below, but it should be understood that across embodiments like numbers that are separated by 4000 represent like structures. For example, the disclosure relating to male terminal assembly 200 applies in equal force to male terminal assembly 4200. Further, it should be understood that the functionality of connector system 4010 is similar to, or identical to, the functionality disclosed in connection with connector system 10.

The fifth embodiment of the connector system 4010 utilizes a CPA assembly 4350 that closely resembles the CPA assembly 3350 of the fourth embodiment. However, unlike the fourth embodiment, the indicia 4354 is split into two portions, wherein a first portion is disposed on the CPA assembly 4350 and the second portion is disposed on the female housing 4620. Like the third embodiment, this configuration helps ensures that a false positive reading cannot occur when the connector system 4010 is not in the connected state $S_C$ because the first and second extents of the indicia 4354 would not be aligned to allow it to be read by the indicia reading device 4. Like the fourth embodiment, the scanning direction $S_D$ is: (i) in a different direction than the direction of a coupling force $F_C$ that is applied to the male connector assembly 4200 in order to couple the male connector assembly 4200 to the female connector assembly 4600, (ii) in a different direction then the coupling force $F_C$, (iii) substantially parallel to the biasing force $F_{SB}$ that is applied by the spring member 4440a on the contact arm 4494a-4494h, and (iv) substantially perpendicular to the biasing force $F_{SB}$ that is applied by the spring member 4440a. Finally, the fifth embodiment of the connector system 4010 can be configured such that the indicia 4354 is unreadable (not shown) or readable (shown in FIGS. 44A-44B). Regardless of whether the indicia 4354 is unreadable or readable, at least an extent of the indicia 4354 is always accessible and is unconcealed.

Similar to the connector system 10 as described above and shown in FIGS. 1-24B, 45A-47B show a sixth embodiment of a connector system 5010. For sake of brevity, the above disclosure in connection with connector system 10 will not be repeated below, but it should be understood that across embodiments like numbers that are separated by 5000 represent like structures. For example, the disclosure relating to male terminal assembly 200 applies in equal force to male terminal assembly 5200. Further, it should be understood that the functionality of connector system 5010 is similar to, or identical to, the functionality disclosed in connection with connector system 10.

Unlike the first five embodiments of the connector system 10, 1010, 2010, 3010, 4010, the indicia 5354 is only is disposed on the female housing 5620. The indicia 5354 can be read by positioning the indicia reading device 4 above the connector system 10 and angling the indicia reading device 4 downwards such that it scans the top portion of the connector system 10. In particular, this downwards scanning direction $S_D$ reads the indicia 5354 through an opening that is formed in the top of the sliding member 5365 that is disclosed in connection with the fourth embodiment of the connector system 3010. This downwards scanning direction $S_D$ is: (i) in the same general direction as a coupling force $F_C$ that is applied to the male connector assembly 5200 in order to couple the male connector assembly 5200 to the female connector assembly 5600 and/or (ii) is substantially perpendicular to the biasing force that is applied by the spring member 5440a on the contact arm 5494a-5949h. Finally, the indicia 5354 of the sixth embodiment of the connector system 5010 can be: (i) placed in a state that is inaccessible and/or concealed (shown in FIG. 45B), which makes the indicia 5354 unreadable or (ii) can be placed in an accessible and/or unconcealed (shown in FIG. 47B), which makes the indicia 5354 readable.

Similar to the connector system 10 as described above and shown in FIGS. 1-24B, 48A-48B show a seventh embodiment of a connector system 6010. For sake of brevity, the above disclosure in connection with connector system 10 will not be repeated below, but it should be understood that across embodiments like numbers that are separated by 6000 represent like structures. For example, the disclosure relating to male terminal assembly 200 applies in equal force to male terminal assembly 6200. Further, it should be understood that the functionality of connector system 6010 is similar to, or identical to, the functionality disclosed in connection with connector system 10. This embodiment is similar to the fourth embodiment of the connector system 3010. For example, the indicia 6354 of the seventh embodiment of the connector system 6010 can be: (i) placed in a state that is partially inaccessible and/or partially concealed (shown in FIG. 48A), which makes the indicia 6354 unreadable or (ii) can be placed in an accessible and/or unconcealed (shown in FIG. 48B), which makes the indicia 6354 readable. However, the primary difference between these embodiments is the fact that one CPA assembly 3350 is used in connection with the fourth embodiment 3010 and multiple CPA assemblies 6350 are used in connection with this seventh embodiment.

While the figures and disclosure contained herein discuss a few different embodiments of the connector system 10, 1010, 2010, 3010, 4010, 5010, 6010, it should be understood that these are only exemplary embodiments and that other embodiments are possible. For example, another possible embodiment include the utilization of multiple indicia 354, wherein: (i) in the locked position, a first indicia 354A is accessible and/or unconcealed and a second indicia 354B becomes inaccessible and/or concealed, and (ii) in the unlocked position, the first indicia 354A is inaccessible and/or concealed and the second indicia 354B becomes accessible and/or unconcealed. In another embodiment, the indicia 354 comprises a first indicia portion 354C and a second indicia portion 354D wherein the first indicia portion 354C is disposed on one of the female housing assembly 620 or the male housing assembly 220, and the second indicia portion 354D is formed on the other component.

Additionally, it should be understood that any of the above embodiments may be modified to include: (i) a shielding that fits within the housing, (ii) a housing that is partially made from conductive plastics, as disclosed within PCT/US2020/13757, (iii) an internal interlock that is disclosed within U.S. Provisional Applications No. 63/058,061, (iv) connector orientation keys disclosed within U.S. Provisional Applications No. 62/988,972.

Additionally, it should be understood that the connector system 10 is T4/V4/S3/D2/M2, wherein the system 10 meets and exceeds: (i) T4 is exposure of the system 100 to 150° C., (ii) V4 is severe vibration, (iii) S1 is sealed high-pressure spray, (iv) D2 is 200 k mile durability, and (v) M2 is less than 45 Newtons of force is required to connect the male connector assembly 200 to the female connector assembly 600. It should also be understood that the CPA assemblies 350, 1350, 2350, 3350, 4350, 5350, 6532 may be used in connection with different connector systems that are not shown within the figures contained in this application. In particular, the CPA assemblies disclosed herein may be used in connection with the connector systems disclosed within PCT/US2020/14484, PCT/US2020/13757, PCT/US2019/36127, PCT/US2019/36070, PCT/US2019/36010, and PCT/US2018/019787, U.S. patent application Ser. No. 16/194,891 and U.S. Provisional Applications Nos. 62/897,962, 62/988,972, 63/051,639 and 63/058,061. In addition, it should be understood that the male terminal assemblies 430, 3430 and the female terminal assemblies 800, 3800 disclosed within this application may be replaced with the male terminal assemblies and the female terminal assemblies disclosed within PCT/US2018/019787 or PCT/US2019/36010. In addition, the de-rating of some of these connectors is disclosed within PCT/US2020/14484.

Further, it should be understood that alternative configurations for connector systems 10, 1010, 2010, 3010, 4010, 5010, 6010 are possible. For example, any number of male terminal assemblies 430, 3430 may be positioned within a single male housing assembly 220, 1220, 2220, 3220, 4220, 5220, 6220. For example, the male housing assembly 220, 1220, 2220, 3220, 4220, 5220, 6220 may be configured to contain multiple (e.g., between 2-30, preferably between 2-8, and most preferably between 2-4) male terminal assemblies 430, 3430. The female connector assembly 600, 1600, 2600, 3600, 4600, 5600 6600 may be reconfigured to accept these multiple male terminal assemblies into a single female terminal assembly 800, 1800, 2800, 3800, 4800, 5800, 6800. Alternatively, the female connector assembly 600, 1600, 2600, 3600, 4600, 5600 6600 may be reconfigured to include multiple female terminal assemblies 800, 1800, 2800, 3800, 4800, 5800, 6800, where each female terminal assembly 800, 1800, 2800, 3800, 4800, 5800, 6800 receives a single male terminal assemblies 430, 3430. In other words, the system disclosed herein may include: (i) any number of male terminal assemblies 430, 3430 and CPA assemblies 350, 1350, 2350, 3350, 4350, 5350, 6532 and (ii) a number of female terminal assemblies 800, 1800, 2800, 3800, 4800, 5800, 6800 that is equal to or less than the number of male terminal assemblies 430, 3430.

Moreover, it should also be understood that the male terminal assemblies 430, 3430 may have any number of contact arms 1494 (e.g., between 2-100, preferably between 2-50, and most preferably between 2-8) and any number of spring arms 1452 (e.g., between 2-100, preferably between 2-50, and most preferably between 2-8). As discussed above, the number of contact arms 1494 may not equal the number of spring arms. For example, there may be more contact arms 1494 then spring arms 1452. Alternatively, there may be less contact arms 1494 then spring arms 1452.

MATERIALS AND DISCLOSURE THAT ARE INCORPORATED BY REFERENCE

PCT Application Nos. PCT/US2020/14484, PCT/US2020/13757, PCT/US2019/36127, PCT/US2019/36070, PCT/US2019/36010, and PCT/US2018/019787, U.S. patent application Ser. No. 16/194,891 and U.S. Provisional Applications 62/897,658 62/897,962, 62/897,962, 62/988,972, 63/051,639 and 63/058,061, each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935-18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc. Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof.

INDUSTRIAL APPLICABILITY

While some implementations have been illustrated and described, numerous modifications come to mind without significantly departing from the spirit of the disclosure; and the scope of protection is only limited by the scope of the accompanying claims. For example, the overall shape of the of the components described above may be changed to: a triangular prism, a pentagonal prism, a hexagonal prism, octagonal prism, sphere, a cone, a tetrahedron, a cuboid, a dodecahedron, an icosahedron, an octahedron, a ellipsoid, or any other similar shape.

It should be understood that the following terms used herein shall generally mean the following:

a. "High power" shall mean (i) voltage between 20 volts to 600 volts regardless of current or (ii) at any current greater than or equal to 80 amps regardless of voltage.

b. "High current" shall mean current greater than or equal to 80 amps regardless of voltage.

c. "High voltage" shall mean a voltage between 20 volts to 600 volts regardless of current.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A connector recording system comprising:
a connector system that includes:
a male housing assembly;
a female housing assembly coupled to the male housing assembly in a connected state;
a male terminal body and a spring member that are disposed within the male housing assembly, and wherein the spring member applies a biasing force on an extent of the male terminal body in the connected state; and
a connector position assurance assembly comprising a sliding member with an indicia disposed on the sliding member, the sliding member being movable between a locked position and an unlocked position,
wherein in the locked position, (a) the sliding member secures the male housing assembly to the female housing assembly when the connector system is in the connected state, and (b) the indicia is readable by a scanner, and
wherein in the unlocked position, the indicia is unreadable by the scanner due to the relative positioning of the connector position assurance assembly, the male housing assembly, and the female housing assembly.

2. The connector recording system of claim 1, wherein the male housing assembly includes an elastically deformable male engaging member that is coupled to a front wall of the male housing assembly, wherein the sliding member engages with the elastically deformable male engaging member to further define the connected state.

3. The connector recording system of claim 1, wherein the sliding member engages with an interior engaging member of the female housing assembly.

4. The connector recording system of claim 1, wherein the connector position assurance assembly comprises a connector position assurance sidewall arrangement that forms a connector position assurance receptacle, wherein the sliding member is insertable into the connector position assurance receptacle.

5. The connector recording system of claim 4, wherein, in the locked position, the sliding member is fully seated within the connector position assurance receptacle.

6. The connector recording system of claim 4, wherein when the sliding member is inserted into the connector position assurance receptacle, the sliding member engages with an elastically deformable exterior engaging member of the male housing assembly and an interior engaging member of the female housing assembly to further define the locked position.

7. The connector recording system of claim 4, wherein the sliding member slides into the connector position assurance receptacle along a set of rails that extend from a front wall of the connector position assurance sidewall arrangement.

8. The connector recording system of claim 4, wherein the connector position assurance assembly further comprises a window defined in a front portion of the male housing assembly.

9. The connector recording system of claim 8, wherein, in the locked position, the indicia on the sliding member is aligned with the window and viewable.

10. The connector recording system of claim 8, wherein, in the unlocked position, the indicia on the sliding member is partially concealed or unviewable.

11. The connector recording system of claim 1, wherein the scanner is oriented in a scanning direction, and the scanning direction is aligned rearwards such that the scanner scans a front portion of the connector system.

12. The connector recording system of claim 1, wherein the scanner is oriented in a scanning direction, and the scanning direction is substantially parallel to a direction of the biasing force that is applied by the spring member due to relative positioning of the scanner, the connector position assurance assembly, the male housing assembly, and the female housing assembly.

13. The connector recording system of claim 1, wherein the scanner is oriented in a scanning direction, and the scanning direction is substantially perpendicular to a direction of the biasing force that is applied by the spring member due to relative positioning of the scanner, the connector position assurance assembly, the male housing assembly, and the female housing assembly.

14. The connector recording system of claim 1, wherein in the locked position, the indicia is in a state that allows the scanner to obtain information from the indicia, said information capable of informing an installer that the connector system is in the connected state and the connector position assurance assembly is in the locked position.

15. The connector recording system of claim 14, wherein the scanner of the connector recording system is configured to associate the information obtained from the indicia with information that is not obtained from the indicia to form a connector dataset.

16. The connector recording system of claim 1, wherein the connector position assurance assembly includes a plurality of indicia that can be read from different directions by the scanner of the connector recording system.

17. The connector recording system of claim 1, wherein an audible sound is provided when the male housing assembly is coupled to the female housing assembly to reach the connected state.

18. The connector recording system of claim 1, wherein the connector system is PCTR compliant.

19. The connector recording system of claim 1, wherein the connector system is T4/V4/S3/D2/M2 compliant.

20. The connector recording system of claim 1, wherein the connector system does not include a handle or a lever that aids in the coupling of the male housing assembly to the female housing assembly to reach the connected state.

* * * * *